(12) United States Patent
Hosaka et al.

(10) Patent No.: US 11,902,696 B2
(45) Date of Patent: Feb. 13, 2024

(54) INFRARED IMAGING DEVICE INCLUDING DRIVE AND SIGNAL LINES CONFIGURED TO ELECTRICALLY CONNECT FIRST AND SECOND SUBSTRATES

(71) Applicant: SONY SEMICONDUCTOR SOLUTIONS CORPORATION, Kanagawa (JP)

(72) Inventors: Hajime Hosaka, Kanagawa (JP); Kenichi Okumura, Tokyo (JP); Yoshikazu Nitta, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 911 days.

(21) Appl. No.: 16/640,151

(22) PCT Filed: Aug. 10, 2018

(86) PCT No.: PCT/JP2018/030065
§ 371 (c)(1),
(2) Date: Feb. 19, 2020

(87) PCT Pub. No.: WO2019/069559
PCT Pub. Date: Apr. 11, 2019

(65) Prior Publication Data
US 2021/0160439 A1 May 27, 2021

(30) Foreign Application Priority Data
Oct. 3, 2017 (JP) .................................. 2017-193572

(51) Int. Cl.
*H04N 5/33* (2023.01)
*G01J 5/14* (2006.01)
(Continued)

(52) U.S. Cl.
CPC .................. *H04N 5/33* (2013.01); *G01J 5/14* (2013.01); *G01K 7/01* (2013.01); *G06V 40/1318* (2022.01);
(Continued)

(58) Field of Classification Search
CPC .......... G06V 40/1318; H01L 27/14649; H01L 27/1465; H01L 27/1467
(Continued)

(56) References Cited

U.S. PATENT DOCUMENTS

2011/0084385 A1    4/2011  Itaya et al.
2011/0266441 A1*  11/2011  Fagan, III ........... H01L 27/1465
                                                  257/E31.127
(Continued)

FOREIGN PATENT DOCUMENTS

CN    104469198 A    3/2015
CN    105940493 A    9/2016
(Continued)

OTHER PUBLICATIONS

Office Action for CN Patent Application No. 201880054712.8, dated Nov. 26, 2021, 07 pages of English Translation and 06 pages of Office Action.
(Continued)

*Primary Examiner* — Matthew E. Gordon
(74) *Attorney, Agent, or Firm* — CHIP LAW GROUP

(57) ABSTRACT

An imaging device includes a first structure 20, and a second structure 40, in which the first structure 20 includes a first substrate 21, a temperature detection element which is formed on the first substrate 21 and detects a temperature on the basis of an infrared ray, a signal line 71, and a drive line 72, the second structure 40 includes a second substrate 41, and a drive circuit provided on the second substrate 41 and covered with a covering layer 43, the first substrate 21 and (Continued)

a second electrode 41 are stacked, the signal line 71 is electrically connected with the drive circuit via a signal line connection portion 100, the drive line is electrically connected with the drive circuit via a drive line connection portion, and the signal line connection portion 100 includes a first signal line connection portion 102 formed in the first structure 20 and a second signal line connection portion 106 formed in the second structure 40.

16 Claims, 47 Drawing Sheets

(51) Int. Cl.
*G01K 7/01* (2006.01)
*G06V 40/13* (2022.01)
*H04N 23/62* (2023.01)
*G01J 5/00* (2022.01)

(52) U.S. Cl.
CPC ...... *H04N 23/62* (2023.01); *G01J 2005/0077* (2013.01)

(58) Field of Classification Search
USPC .......................................... 257/734
See application file for complete search history.

(56) References Cited

U.S. PATENT DOCUMENTS

2012/0267690 A1* 10/2012 Endo ............... H01L 27/1465
257/E27.15
2013/0134576 A1  5/2013  Hayashi
2017/0033144 A1  2/2017  Takahashi
2017/0214864 A1*  7/2017  Izuha .................. H04N 25/44
2017/0237911 A1*  8/2017  Won ..................... H04N 25/70
348/164

FOREIGN PATENT DOCUMENTS

| JP | 07-169931 A | | 7/1995 |
| JP | 2007-171170 A | | 7/2007 |
| JP | 2007171170 A | * | 7/2007 |
| JP | 2011-082450 A | | 4/2011 |
| JP | 2013-057582 A | | 3/2013 |
| JP | 2013057582 A | * | 3/2013 |
| JP | 2013-115289 A | | 6/2013 |
| JP | 2013-195313 A | | 9/2013 |
| JP | 2013195313 A | * | 9/2013 |
| JP | 2014-007201 A | | 1/2014 |
| JP | 2016-039393 A | | 3/2016 |
| WO | 2015/159766 A1 | | 10/2015 |

OTHER PUBLICATIONS

International Search Report and Written Opinion of PCT Application No. PCT/JP2018/030065, dated Oct. 16, 2018, 12 pages of ISRWO.

* cited by examiner

INFRARED IMAGING DEVICE INCLUDING DRIVE AND SIGNAL LINES CONFIGURED TO ELECTRICALLY CONNECT FIRST AND SECOND SUBSTRATES

CROSS REFERENCE TO RELATED APPLICATIONS

This application is a U.S. National Phase of International Patent Application No. PCT/JP2018/030065 filed on Aug. 10, 2018, which claims priority benefit of Japanese Patent Application No. JP 2017-193572 filed in the Japan Patent Office on Oct. 3, 2017. Each of the above-referenced applications is hereby incorporated herein by reference in its entirety.

TECHNICAL FIELD

The present disclosure relates to an imaging device, and more specifically to an imaging device including a temperature detection element that detects a temperature on the basis of an infrared ray.

BACKGROUND ART

A thermal infrared detection device is known in Japanese Patent Application Laid-Open No. 2007-171170, as a thermal infrared detection device including:
a thermal infrared detection element formed using a first wafer and in which an infrared detection unit insulated from surroundings is formed on one surface side; and
a package sealed on the thermal infrared detection element in a form surrounding the infrared detection unit on the one surface side of the thermal infrared detection element, in which
the package is formed using at least a second wafer,
a material of the second wafer is a semiconductor material,
a through hole wiring electrically connected with the infrared detection unit is formed on one of the thermal infrared detection element and the package,
external sizes of the thermal infrared detection element and the package are the same, and
a semiconductor lens unit including part of the second water is integrally formed with the package. Then, a signal processing circuit formed using the first water and including an amplifier circuit that amplifies an output signal from the infrared detection unit is formed on one surface side of the first wafer.

CITATION LIST

Patent Document

Patent Document 1: Japanese Patent Application Laid-Open No. 2007-171170

SUMMARY OF THE INVENTION

Problems to be Solved by the Invention

By the way, in the thermal infrared detection device disclosed in this patent application publication, a signal processing circuit 19 including an integrated circuit including the amplifier circuit that detects an output signal from the infrared detection unit is formed on the one surface side of the first wafer (see FIG. 11 in Japanese Patent Application Laid-Open No. 2007-171170). Therefore, it is difficult to further downsize the thermal infrared detection device disclosed in this patent application publication and it is also difficult to configure an element array in which a large number of infrared detection units are arrayed. Moreover, since the amplifier circuit is formed on the first wafer, it is difficult to enlarge the amplifier circuit or add a signal processing circuit.

Accordingly, an object of the present disclosure is to provide an imaging device having configuration and structure that can achieve further downsizing.

Solutions to Problems

An imaging device of the present disclosure for achieving the above objective includes
a first structure, and a second structure, in which
the first structure includes
a first substrate,
a temperature detection element provided on the first substrate and configured to detect a temperature on the basis of an infrared ray, and
a signal line and a drive line connected to the temperature detection element,
the second structure includes
a second substrate, and
a drive circuit provided on the second substrate and covered with a covering layer,
the first substrate and the second substrate are stacked,
the signal line is electrically connected with the drive circuit via a signal line connection portion,
the drive line is electrically connected with the drive circuit via a drive line connection portion,
the signal line connection portion includes a first signal line connection portion formed in the first structure and a second signal line connection portion formed in the second structure, and
the drive line connection portion includes a first drive line connection portion formed in the first structure and a second drive line connection portion formed in the second structure.

Effects of the Invention

In the imaging device of the present disclosure, the first structure including the temperature detection element that detects the temperature on the basis of the infrared ray and the second structure including the drive circuit are stacked, and the temperature detection element is electrically connected with the drive circuit via the signal line and the signal line connection portion and via the drive line and the drive line connection portion. Therefore, further downsizing of the imaging device can be achieved. Note that the effects described in the present specification are merely examples and are not limited, and additional effects may be exhibited.

MODE FOR CARRYING OUT THE INVENTION

Figure 1:
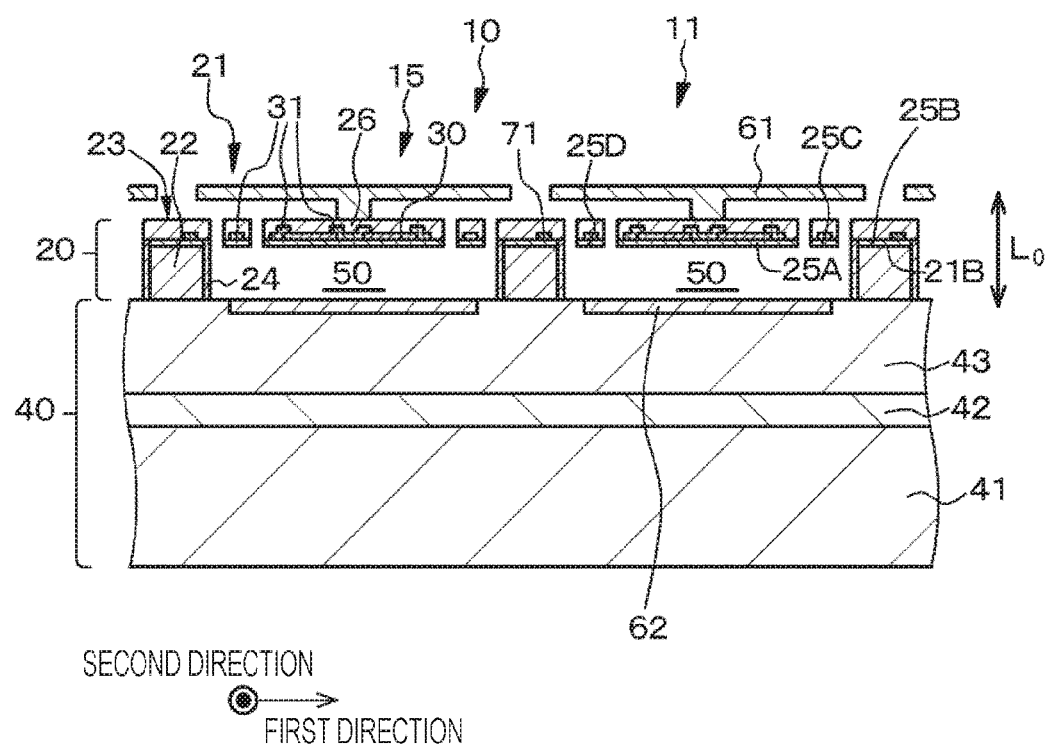
FIG. 1 is a schematic partial end view of a region (temperature detection element array region) including a temperature detection element of an imaging device according to Example 1.

Hereinafter, the present disclosure will be described on the basis of examples with reference to the drawings. The present disclosure is not limited to the examples, and various numerical values and materials in the examples are examples. Note that the description will be given in the following order.
1. General Description of Imaging Device of Present Disclosure
2. Example 1 (an imaging device in a first mode, an imaging device having a first configuration, and specifically, an imaging device having a face to back structure)
3. Example 2 (a modification of Example 1)
4. Example 3 (another modification of Example 1, an imaging device in a second mode, and an imaging device in a second A mode)
5. Example 4 (a modification of Example 3, and an imaging device in a second B mode)
6. Example 5 (modifications of Examples 1 to 4, an imaging device having a first configuration, and specifically, an imaging device having a face to back structure)
7. Example 6 (modifications of Examples 1 to 4, and specifically an imaging device having a face to face structure)
8. Example 7 (modifications of Example 1 to Example 6)
9. Example 8 (modifications of Example 1 to Example 7)
10. Example 9 (imaging devices having second and third configurations of the present disclosure)
11. Example 10 (an imaging device having a fifth configuration)
12. Example 11 (an imaging device having a sixth configuration)
13. Example 12 (a noise reduction method in an imaging device)
14. Example 13 (modifications of Example 1 to Example 12, and applications of the imaging devices of the present disclosure)
15. Others <General Description of Imaging Device of Present Disclosure>

In an imaging device according to the present disclosure, a mode in which
a first signal line connection portion includes a first A connection hole formed in a first structure,
a second signal line connection portion includes a first B connection hole formed in a second structure,
a first drive line connection portion includes a second A connection hole formed in the first structure,
a second drive line connection portion includes a second B connection hole formed in the second structure,
the first A connection hole and the first B connection hole are integrally connected to configure a first connection hole, and
the second A connection hole and the second B connection hole are integrally connected to configure a second connection hole
can be adopted. Note that the imaging device of the present disclosure in such a mode may be referred to as an "imaging device in a first mode" for convenience.

Examples of materials configuring the first A connection hole, the first B connection hole, the second A connection hole, and the second B connection hole (specifically, a material configuring a core portion to be described below) include copper (Cu), tungsten (W), aluminum (Al), titanium (Ti), tantalum (Ta), gold (Au), carbon such as carbon nanotubes and graphene, a titanium-tungsten alloy (TiW), and a poly silicon. The first A connection hole and the first B connection hole are integrally connected, and the second A connection hole and the second B connection hole are integrally connected. Specifically, the first A connection hole and the first B connection hole are simply formed together (at the same time) to obtain the first connection hole. Similarly, the second A connection hole and the second B connection hole are simply formed together (at the same time) to obtain the second connection hole. Examples of these forming methods include various CVD methods and various PVD methods. Note that these connection holes are also called through-chip vias (TCV) or through-silicon vias (TSV). Furthermore, materials similar to the above examples can be exemplified as materials configuring a wire and wire layers constituting a drive circuit.

Alternatively, in the imaging device according to the present disclosure, a mode in which
the first signal line connection portion includes the first A connection hole formed in the first structure, and a first A connection end portion provided on a surface of the first structure, the surface facing the second structure, and connected to the first A connection hole,
the second signal line connection portion includes the first B connection hole formed in the second structure, and a first B connection end portion provided on a surface of the second structure, the surface facing the first structure, and connected to the first B connection hole,
the first drive line connection portion includes the second A connection hole formed in the first structure, and a second A connection end portion provided on the surface of the first structure, the surface facing the second structure, and connected to the second A connection hole,
the second drive line connection portion includes the second B connection hole formed in the second structure, and a second B connection end portion provided on the surface of the second structure, the surface facing the first structure, and connected to the second B connection hole,
the first A connection end portion and the first B connection end portion are connected,
the second A connection end portion and the second B connection end portion are connected,
the first A connection hole and the first B connection hole configure a first connection hole, and
the second A connection hole and the second B connection hole configure a second connection hole
can be adopted. Note that the imaging device of the present disclosure in such a mode may be referred to as an "imaging device in a second mode" for convenience. Examples of materials configuring the first A connection end portion, the first B connection end portion, the second A connection end portion, and the second B connection end portion include the materials configuring the first A connection hole, the first B connection hole, the second A connection hole, and the second B connection hole (specifically, the material configuring the core portion to be described below). To connect the first A connection hole and the first A connection end portion, the first A connection end portion is only required to be formed on an end surface of the first A connection hole. Similarly, to connect the first B connection hole and the first B connection end portion, the first B connection end portion is only required to be formed on an end surface of the first B connection hole. To connect the second A connection hole and the second A connection end portion, the second A connection end portion is only required to be formed on an end surface of the second A connection hole. To connect the second B connection hole and the second B connection end portion, the second B connection end portion is only required to be formed on an end surface of the second B connection hole. Examples of these forming methods include various CVD methods and various PVD methods.

In the imaging device in the second mode, a mode in which the first A connection end portion, the first B connection end portion, the second A connection end portion, and the second B connection end portion include a metal layer or an alloy layer, the first A connection end portion and the first B connection end portion are bonded, and the second A connection end portion and the second B connection end portion are bonded can be adopted. Note that the imaging device of the present disclosure in such a second mode may be referred to as an "imaging device in a second A mode" for convenience.

Examples of a material configuring the metal layer or the alloy layer include copper (Cu), aluminum (Al), and gold (Au), and examples of a method of forming the metal layer or the alloy layer include various CVD methods and various PVD methods. An example of a method of bonding the first A connection end portion and the first B connection end portion and a method of bonding the second A connection end portion and the second B connection end portion includes a method (metal-metal bonding method) of applying a pressure (weight) and directly bonding the portions at room temperature or in a heated state.

Alternatively, in the imaging device in the second mode, a mode in which the first A connection end portion and the first B connection end portion are connected via a first bonding material layer, and the second A connection end portion and the second B connection end portion are connected via a second bonding material layer can be adopted. Note that the imaging device of the present disclosure in such a second mode may be referred to as an "imaging device in a second B mode" for convenience.

As materials configuring the first bonding material layer and the second bonding material layer, solder balls, solder paste, AuSn eutectic solder, bumps containing solder, indium, gold (Au), or the like, so-called low melting point metal (alloy) materials, solder materials, or brazing materials can be used, and examples include In (indium: melting point 157° C.; indium-gold-based low melting point alloys; Tin (Sn)-based high-temperature solders such as $Sn_{80}Ag_{20}$ (melting point 220 to 370° C.) and $Sn_{95}Cu_{5.5}$ (melting point 227 to 370° C.); lead (Pb)-based high-temperature solder such as $Pb_{97.5}Ag_{2.5}$ (melting point 304° C.), $Pb_{94.5}Ag_{5.5}$ (melting point 304 to 365° C.), and $Pb_{97.5}Ag_{1.5}Sn_{1.0}$ (melting point 309° C.); Zinc (Zn)-based high-temperature solder such as $Zn_{95}Al_5$ (melting point 380° C.); standard tin-lead-based solder such as $Sn_5Pb_{95}$ (melting point 300 to 314° C.) and $Sn_2Pb_{98}$ (melting point 316 to 322° C.); and brazing materials such as $Au_{88}Ga_{12}$ (melting point 381° C.) (all the above subscripts represent atomic %). Examples of a method of forming the first bonding material layer and the second bonding material layer can include various CVD methods, various PVD methods, and various printing methods. To connect the first A connection end portion and the first B connection end portion via the first bonding material layer, and to connect the second A connection end portion and the second B connection end portion via the second bonding material layer, the materials of these portions and layers are only required to be heated. Alternatively, examples of a connection method include a method using a bump containing solder, indium, gold (Au), or the like, or a method based on a chip-on-chip method.

Then, in the imaging device in the first mode or the imaging device in the second mode including the above-described favorable modes, a mode in which the first A connection hole includes a first A connection hole first segment connected to the signal line and extending in a direction away from the second structure, a first A connection hole second segment extending in a direction approaching the first B connection hole, and a first A connection hole third segment connecting the first A connection hole first segment and the first A connection hole second segment, and the second A connection hole includes a second A connection hole first segment connected to the drive line and extending in a direction away from the second structure, a second A connection hole second segment extending in a direction approaching the second B connection hole, and a second A connection hole third segment connecting the second A connection hole first segment and the second A connection hole second segment can be adopted.

Moreover, in the imaging device in the first mode or the imaging device in the second mode including the above-described favorable modes, a configuration in which a capacitance $C_1$ of the first connection hole is larger than a capacitance $C_2$ of the second connection hole ($C_1/C_2>1$) can be adopted. By making the capacitance $C_1$ of the first connection hole larger than the capacitance $C_2$ of the second connection hole as described above, a large capacitance can be added to the entire signal line connecting the temperature detection element and the drive circuit and can function as a low-pass filter. Therefore, noise in signal readout can be reduced. Furthermore, by using the capacitance $C_1$ of the first connection hole as a part of a capacitance used in an analog front end or a sample and hold circuit connected to each signal line, a circuit area can be reduced. Note that each signal line is connected to the analog front end and an analog-digital conversion circuit, and the analog front end can have a configuration including a differential integration circuit that functions as an amplifier (preamplifier). Here, the differential integration circuit corresponds to an integration circuit obtained by replacing a feedback resistor $R_f$ of an inverting amplifier circuit with a capacitor (having the above-described capacitance $C_1$).

Alternatively, in the imaging device in the first mode or the imaging device in the second mode including the above-described favorable modes and configurations, a configuration in which an average cross-sectional area of the first connection hole is larger than an average cross-sectional area of the second connection hole can be adopted. Alternatively, the number of the first connection holes and the number of the second connection holes may be made the same, and the average cross-sectional area of the first connection holes may be made larger than the average cross-sectional area of the second connection holes. Alternatively, the number of the first connection holes maybe made larger than the number of the second connection holes. In this case, the average cross-sectional area of the first connection holes and the average cross-sectional area of the second connection holes may be made the same. Alternatively, a configuration in which a length of the first connection hole is longer than a length of the second connection hole can be adopted. Alternatively, a configuration in which the first connection hole includes a first core portion and a first outer peripheral portion disposed between a sidewall of the first connection hole and the first core portion, the second connection hole includes a second core portion including a same material as a material that configures the first core portion, and a second outer peripheral portion disposed between a sidewall of the second connection hole and the second core portion, and including a same material as a material that configures the first outer peripheral portion, and the first outer peripheral portion is thinner than the second outer peripheral portion can be adopted. Alternatively, a configuration in which the first connection hole includes a first core portion and a first outer peripheral portion disposed between a sidewall of the first connection hole and the first core portion, the second connection hole includes a second core portion, and a second outer peripheral portion disposed between a sidewall of the second connection hole and the second core portion, and a value of a relative dielectric constant of the material that configures the first outer peripheral portion is larger than a value of a relative dielectric constant of the material that configures the second outer peripheral portion can be adopted.

The first connection hole is provided in at least the first substrate, and the second connection hole is provided in at least the second substrate. Then, the first connection hole includes the first core portion including a conductive material and the first outer peripheral portion (first outer peripheral layer) including an insulating material (dielectric material) disposed between the sidewall of the first connection hole and the first core portion. The second connection hole includes the second core portion including a conductive material and the second outer peripheral portion (second outer peripheral layer) including an insulating material (dielectric material) disposed between the sidewall of the second connection hole and the second core portion. Therefore, a kind of capacitor (referred to as "first capacitor" for convenience) includes the first core portion, the first outer peripheral portion, and the first substrate, and a kind of capacitor (referred to as "second capacitor" for convenience) includes the second core portion, the second outer peripheral portion, and the second substrate.

Therefore, by making the number $\alpha_1$ of the first connection holes and the number $\alpha_2$ of the second connection holes the same ($\alpha_1 = \alpha_2$) and making the average cross-sectional area $\beta_1$ of the first connection holes larger than the average cross-sectional area $\beta_2$ of the second connection hole ($\beta_1 > \beta_2$), the area of the first capacitor can be made larger than the area of the second capacitor, and as a result, the capacitance $C_1$ of the first capacitor can be made larger than the capacitance $C_2$ of the second capacitor.

Furthermore, by making the number $\alpha_1$ of the first connection holes larger than the number $\alpha_2$ of the second connection holes ($\alpha_1 > \alpha_2$) and making the average cross-sectional area $\beta_1$ of the first connection holes and the average cross-sectional area $\beta_2$ of the second connection holes the same ($\beta_1 = \beta_2$), the number of capacitors connected in parallel in the first connection hole can be made larger than the number of capacitors connected in parallel in the second connection hole, and as a result, the capacitance $C_1$ of the first capacitor can be made larger than the capacitance $C_2$ of the second capacitor.

Furthermore, by adopting a configuration in which the length of the first connection hole is longer than the length of the second connection hole, the area of the first capacitor can be made larger than the area of the second capacitor, and as a result, the capacitance $C_1$ of the first capacitor can be made larger than the capacitance $C_2$ of the second capacitor.

Furthermore, by making the first outer peripheral portion (first outer peripheral layer) thinner than the second outer peripheral portion (second outer peripheral layer), the capacitance $C_1$ of the first capacitor can be made larger than the capacitance $C_2$ of the second capacitor. By making the value of the relative dielectric constant of the material that configures the first outer peripheral portion (first outer peripheral layer) larger than the value of the relative dielectric constant of the material that configures the second outer peripheral portion (second outer peripheral layer), the capacitance $C_1$ of the first capacitor can be made larger than the capacitance $C_2$ of the second capacitor.

Furthermore, the imaging device according to the present disclosure including the above-described favorable modes and configurations can have a configuration in which a plurality of temperature detection elements arrayed in a first direction and a second direction different from the first direction is included, a plurality of drive lines disposed along the first direction and connected with the respective plurality of the temperature detection elements and a plurality of signal lines disposed along the second direction and connected with the respective plurality of the temperature detection elements are further included, the first structure includes a temperature detection element array region provided with the temperature detection elements and a peripheral region surrounding the temperature detection element array region, the signal lines are electrically connected with the drive circuit via the signal line connection portion in the peripheral region, and the drive lines are electrically connected with the drive circuit via the drive line connection portion in the peripheral region. Alternatively, the imaging device according to the present disclosure including the above-described favorable modes and configurations can have a configuration in which J (note that J≥1) temperature detection elements arrayed in a first direction are included, J drive lines and J signal lines disposed along the first direction and connected with the respective temperature detection elements are further included, the first structure includes a temperature detection element array region provided with the temperature detection elements and a peripheral region surrounding the temperature detection element array region, the signal lines are electrically connected with the drive circuit via the signal line connection portion in the peripheral region, and the drive lines are electrically connected with the drive circuit via the drive line connection portion in the peripheral region.

Furthermore, in the imaging device of the present disclosure including the above-described various favorable modes and configurations, a configuration in which a void is provided between the temperature detection element and the covering layer can be adopted. Note that such an imaging device of the present disclosure may be referred to as an "imaging device having a first configuration" for convenience. In the imaging device having the first configuration, the first substrate and the second substrate are stacked, and the void is provided between the temperature detection element and the covering layer. Therefore, the void can be provided in the temperature detection element with high accuracy. Then, in this case, a configuration in which an infrared absorption layer is formed on a side where an infrared ray enters, and an infrared reflective layer is formed in a region of the covering layer, the region being located at a bottom portion of the void can be adopted.

Alternatively, in the imaging device of the present disclosure including the above-described various favorable modes and configurations, a configuration in which
a temperature detection element unit configured to detect a temperature on the basis of an infrared ray is included,
the temperature detection element unit includes a plurality of temperature detection elements arranged in parallel, and wavelengths of the infrared ray detected by the temperature detection elements are different in the temperature detection element unit
can be adopted. Note that such an imaging device of the present disclosure may be referred to as an "imaging device having a second configuration" for convenience. In the imaging device having the second configuration or an imaging device having a third configuration to be described next, the temperature detection element unit is formed such that the plurality of temperature detection elements is arranged in parallel, and the wavelengths of the infrared ray detected by the temperature detection elements are different in the temperature detection element unit or the infrared ray absorption amounts of the temperature detection elements are different in the temperature detection element unit. Therefore, wavelength spectral characteristics or sensitivity of the infrared ray can be changed for each temperature detection element.

Alternatively, in the imaging device of the present disclosure including the above-described various favorable modes and configurations, a configuration in which
a temperature detection element unit configured to detect a temperature on the basis of an infrared ray is included,
the temperature detection element unit includes a plurality of temperature detection elements arranged in parallel, and infrared ray absorption amounts of the temperature detection elements are different in the temperature detection element unit
can be adopted. Note that such an imaging device of the present disclosure may be referred to as an "imaging device having a third configuration" for convenience.

Alternatively, in the imaging device of the present disclosure including the above-described various favorable modes and configurations, a configuration in which
a temperature detection element unit configured to detect a temperature on the basis of the infrared ray is included,
the temperature detection element unit includes two temperature detection elements disposed up and down along incidence of the infrared ray, and
in the temperature detection element unit, wavelengths of the infrared ray detected by the temperature detection elements are the same or different, or infrared ray absorption amounts of the temperature detection elements are different
can be adopted. Note that such an imaging device of the present disclosure may be referred to as an "imaging device having a fourth configuration" for convenience. The two temperature detection elements may be connected to the same signal line and drive line, or may be connected to different signal lines and drive lines.

Alternatively, in the imaging device of the present disclosure including the above-described various favorable modes and configurations, a configuration in which
$M_0 \times N_0$ (note that $M_0 \geq 2$ and $N_0 \geq 2$) temperature detection elements arrayed in a first direction and a second direction different from the first direction, and each configured to detect a temperature on the basis of an infrared ray,
a plurality of drive lines disposed along the first direction,
$N_0 \times P_0$ (note that $P_0 \geq 2$) signal lines disposed along the second direction,
a first drive circuit to which the plurality of drive lines is connected, and
a second drive circuit to which the $N_0 \times P_0$ signal lines are connected are included,
each of the temperature detection elements includes a first terminal portion and a second terminal portion,
the first terminal portion of the each temperature detection element is connected to a drive line, and
an (n, p)th signal line (note that n=1, 2, . . . , or $N_0$, and p=1, 2, . . . , or $P_0$) is connected to the second terminal portion of a $\{(q-1)P_0+p\}$th temperature detection element (note that q=1, 2, 3, . . . ) in a temperature detection element group including nth $N_0$ temperature detection elements disposed along the second direction
can be adopted. Note that such an imaging device of the present disclosure may be referred to as an "imaging device having a fifth configuration" for convenience. In the imaging device having the fifth configuration, the (n, p)th signal line is connected to the second terminal portion of the $\{(q-1)P_0+p\}$th temperature detection element in the temperature detection element group including the nth $N_0$ temperature detection elements disposed along the second direction. Therefore, a time required to integrate signals output from the temperature detection elements can be sufficiently secured, and high sensitivity and low noise of the imaging device can be achieved.

Alternatively, in the imaging device of the present disclosure including the above-described various favorable modes and configurations, a configuration in which
$S_0 \times T_0$ (note that $S_0 \geq 2$ and $T_0 \geq 2$) temperature detection elements arrayed in a first direction and a second direction different from the first direction, and each configured to detect a temperature on the basis of an infrared ray,
$S_0 \times U_0$ (note that $U_0 \geq 2$) drive lines disposed along the first direction,
a plurality of signal lines disposed along the second direction,
a first drive circuit to which the $S_0 \times U_0$ drive lines are connected, and a second drive circuit to which the plurality of signal lines is connected are included, each of the temperature detection elements includes a first terminal portion and a second terminal portion, the second terminal portion of the each temperature detection element is connected to a signal line, and an (s, u)th drive line (note that s=1, 2, . . . , or $S_0$ and u=1, 2, . . . , or $U_0$) is connected to the first terminal portion of a $\{(t-1)U_0+u\}$th temperature detection element (note that t=1, 2, 3, . . . ) in a temperature detection element group including sth $S_0$ temperature detection elements disposed along the first direction can be adopted. Note that such an imaging device of the present disclosure may be referred to as an "imaging device having a sixth configuration" for convenience. In the imaging device having the sixth configuration, the (s, u)th drive line is connected to the first terminal portion of the $\{(t-1)U_0+u\}$th temperature detection element in the temperature detection element group including the sth $S_0$ temperature detection elements disposed along the first direction. Therefore, power consumption in driving the temperature detection elements can be reduced.

In the imaging device having the first configuration, a configuration in which a partition wall is formed in a portion of the first substrate, the portion being located between the temperature detection element and the temperature detection element; and a bottom portion of the partition wall is bonded with the covering layer can be adopted. Note that the imaging device having such a configuration is called an "imaging device having a face to back structure" for convenience. In a case where the surface of the first substrate, the surface facing the second substrate, is called a "first surface of the first substrate", and the surface of the first substrate, the surface facing the first surface of the first substrate, is called "second surface of the first substrate", the temperature detection element is provided on the second surface side of the first substrate.

Then, in the imaging device having a face to back structure, a configuration in which an exposed surface of the covering layer, the exposed surface being exposed to the void, includes at least one type of material layer selected from a group including an insulating material layer, a metal material layer, an alloy material layer, and a carbon material layer; and a sidewall of the partition wall includes at least one type of material layer selected from a group including an insulating material layer, a metal material layer, an alloy material layer, and a carbon material layer can be adopted. The inside of the partition wall surrounded by the sidewall of the partition wall includes a part of the first substrate. In some cases, the inside of the partition wall may include the same material as the material configuring the sidewall of the partition wall or may include a material different from the material configuring the first substrate and the sidewall of the partition wall.

Alternatively, in the imaging device having a face to back structure, a configuration in which an exposed surface of the covering layer, the exposed surface being exposed to the void, includes at least one type of material layer selected from a group including an insulating material layer, a metal material layer, an alloy material layer, and a carbon material layer can be adopted. Then, in the imaging device having a face to back structure including such a configuration, a configuration in which the sidewall of the partition wall includes at least one type of material layer selected from a group including an insulating material layer, a metal material layer, an alloy material layer, and a carbon material layer can be adopted.

Examples of the insulating material layer configuring the exposed surface of the covering layer, the exposed surface being exposed in the void, include insulating material layers containing oxide (specifically, for example, $SiO_X$ ($1 \leq X \leq 2$), SiOF, and SiOC), an insulating material layer containing nitride (specifically, for example, SiN), an insulating material layer containing oxynitride (specifically, for example, SiON), and an adhesive material layer. Examples of the metal material layer configuring the exposed surface of the covering layer, the exposed surface being exposed to the void include gold (Au), copper (Cu), aluminum (Al), tungsten (W), and titanium (Ti). Examples of the alloy material layer configuring the exposed surface of the covering layer, the exposed surface being exposed to the void, include an alloy layer and a solder layer containing the aforementioned metals. Examples of the carbon material layer configuring the exposed surface of the covering layer, the exposed surface being exposed to the void, include a carbon film and a carbon nanotube.

Furthermore, as the insulating material layer, the metal material layer, the alloy material layer, and the carbon material layer configuring the sidewall of the partition wall, the above-described various materials can be exemplified.

Combinations of (the material of the insulating material configuring the exposed surface of the covering layer, the exposed surface being exposed to the void, and the material of the insulating material layer configuring the sidewall of the partition wall) include sixteen combinations of (the insulating material layer, the insulating material layer), (the insulating material layer, the metal material layer), (the insulating material layer, the alloy material layer), (the insulating material layer, the carbon material layer), (the metal material layer, the insulating material layer), (the metal material layer, the metal material layer), (the metal material layer, the alloy material layer), (the metal material layer, the carbon material layer), (the alloy material layer, the insulating material layer), (the alloy material layer, the metal material layer), (the alloy material layer, the alloy material layer), (the alloy material layer, the carbon material layer), (the carbon material layer, the insulating material layer), (the carbon material layer, the metal material layer), (the carbon material layer, the alloy material layer), and (the carbon material layer, the carbon material layer).

The insulating material layer configuring the exposed surface of the covering layer, the exposed surface being exposed to the void, and the insulating material layer configuring the sidewall of the partition wall may include the same material or may include different materials. The metal material layer configuring the exposed surface of the covering layer, the exposed surface being exposed to the void, and the metal material layer configuring the sidewall of the partition wall may include the same material or may include different materials. The alloy material layer configuring the exposed surface of the covering layer, the exposed surface being exposed to the void, and the alloy material layer configuring the sidewall of the partition wall may include the same material or may include different materials. The carbon material layer configuring the exposed surface of the covering layer, the exposed surface being exposed to the void, and the carbon material layer configuring the sidewall of the partition wall may include the same material or may include different materials. The above is similarly applied to the imaging device having a face to face structure to be described below. Note that "the sidewall of the partition wall" is read as "the partition wall".

In the imaging device having a face to back structure including the above-described various favorable configurations, a configuration in which an infrared absorption layer is formed on a side of the temperature detection element, where an infrared ray enters; and an infrared reflective layer is formed in a region of the covering layer, the region being located at a bottom portion of the void can be adopted. The infrared reflective layer may be formed in a portion of the covering layer, the portion being located at the bottom portion of the void, may be formed in a part of the portion of the covering layer, the portion being located at the bottom portion of the void, or may be formed to protrude from the portion of the covering layer, the portion being located at the bottom portion of the void. Then, in this case, the infrared absorption layer can be formed above the temperature detection element. Specifically, the infrared absorption layer may be formed on an insulating film formed on the temperature detection element, or the infrared absorption layer may be formed in a state where a gap (space) is present between the infrared absorption layer and the temperature detection element. Moreover, in these cases, the infrared reflective layer can be formed on a top surface of the covering layer (including on the top surface of the covering layer or a part of the top surface of the covering layer) or inside the covering layer. Furthermore, in these cases, a configuration in which an optical distance $L_0$ (the distance considering the thickness and refractive index of the material) between the infrared absorption layer and the infrared reflective layer satisfies $$0.75 \times \lambda_{IR}/2 \leq L_0 \leq 1.25 \times \lambda_{IR}/2$$

or $$0.75 \times \lambda_{IR}/4 \leq L_0 \leq 1.25 \times \lambda_{IR}/4$$

where a wavelength of an infrared ray to be absorbed by the infrared absorption layer is $\lambda_{IR}$ can be adopted. As $\lambda_{IR}$, 8 µm to 14 µm can be exemplified.

Alternatively, in the imaging device having a face to back structure including the above-described various favorable configurations, a configuration in which a first infrared absorption layer is formed on a side of the temperature detection element, where an infrared ray enters; an infrared reflective layer is formed in a region of the covering layer, the region being located at a bottom portion of the void; and a second infrared absorption layer is formed on a side of the temperature detection element, the side facing the void, can be adopted. The infrared reflective layer may be formed in a portion of the covering layer, the portion being located at the bottom portion of the void, may be formed in a part of the portion of the covering layer, the portion being located at the bottom portion of the void, or may be formed to protrude from the portion of the covering layer, the portion being located at the bottom portion of the void. Then, in this case, the first infrared absorption layer can be formed above the temperature detection element. Specifically, the first infrared absorption layer may be formed on an insulating film formed on the temperature detection element, or the first infrared absorption layer may be formed in a state where a gap (space) is present between the first infrared absorption layer and the temperature detection element. The second infrared absorption layer is simply formed on a surface of the temperature detection element, the surface facing the void, is only required to be formed on an insulating film formed on the temperature detection element, or is simply formed in a state where a gap (space) is present between the second infrared absorption layer and the temperature detection element. Moreover, in these cases, the infrared reflective layer can be formed on a top surface of the covering layer (including on the top surface of the covering layer or a part of the top surface of the covering layer) or inside the covering layer. Since not only does each infrared absorption layer absorb the infrared ray but also transmits part of the infrared ray and reflects part of the infrared ray, the sensitivity can be further improved by adopting a configuration in which transmission and reflection are reduced. That is, with such a configuration, part of the infrared ray transmitted through the first infrared absorption layer is further absorbed by the second infrared absorption layer. Therefore, the transmission can be reduced. Furthermore, the infrared ray reflected by the first infrared absorption layer and the infrared ray reflected by the second infrared absorption layer are canceled with opposite phases and can reduce the reflection. Furthermore, the infrared ray reflected by the second infrared absorption layer and the infrared ray reflected by the infrared reflective layer are canceled with opposite phases and can reduce the reflection. Furthermore, in these cases, a configuration that satisfies $$0.75 \times \lambda_{IR}/4 \leq L_1 \leq 1.25 \times \lambda_{IR}/4, \text{ and}$$

$$0.75 \times \lambda_{IR}/4 \leq L_2 \leq 1.25 \times \lambda_{IR}/4$$

where a wavelength of an infrared ray to be absorbed by the first infrared absorption layer and the second infrared absorption layer is $\lambda_{IR}$, an optical distance between the first infrared absorption layer and the second infrared absorption layer is $L_1$, and an optical distance between the second infrared absorption layer and the infrared reflective layer is $L_2$. As $\lambda_{IR}$, 8 µm to 14 µm can be exemplified.

Alternatively, in the imaging device having the first configuration including the above-described favorable mode, a configuration in which a partition wall is formed between a portion of the first substrate, the portion being located between the temperature detection element and the temperature detection element, and the covering layer, independently of the first substrate; and a bottom portion of the partition wall is bonded with the covering layer can be adopted. Note that the imaging device having such a configuration is called an "imaging device having a face to face structure" for convenience. The partition wall includes a material different from the first substrate. The temperature detection element is provided on the first surface side of the first substrate.

Then, in the imaging device having a face to face structure, a configuration in which an exposed surface of the covering layer, the exposed surface being exposed to the void, includes at least one type of material layer selected from a group including an insulating material layer, a metal material layer, an alloy material layer, and a carbon material layer; and the partition wall includes at least one type of material layer selected from a group including an insulating material layer, a metal material layer, an alloy material layer, and a carbon material layer can be adopted.

Alternatively, in the imaging device having a face to face structure, a configuration in which an exposed surface of the covering layer, the exposed surface being exposed to the void, includes at least one type of material layer selected from a group including an insulating material layer, a metal material layer, an alloy material layer, and a carbon material layer can be adopted. Then, in the imaging device having a face to face structure including such a configuration, a configuration in which the partition wall includes at least one type of material layer selected from a group including an insulating material layer, a metal material layer, an alloy material layer, and a carbon material layer can be adopted.

Note that a specific example and a combination of the insulating material layer, the metal material layer, the alloy material layer, and the carbon material layer configuring the exposed surface of the covering layer, the exposed surface being exposed to the void, and the insulating material layer, the metal material layer, the alloy material layer, and the carbon material layer configuring the partition wall can be made similar to those described regarding the materials configuring the exposed surface of the covering layer and the materials configuring the sidewall of the partition wall in the above-described imaging device having the face to back structure.

In the imaging device having a face to face structure including the above-described various favorable configurations, a configuration in which an infrared absorption layer is formed on a side of the temperature detection element, where an infrared ray enters; and an infrared reflective layer is formed in a region of the covering layer, the region being located at a bottom portion of the void can be adopted. The infrared reflective layer may be formed in a portion of the covering layer, the portion being located at the bottom portion of the void, may be formed in a part of the portion of the covering layer, the portion being located at the bottom portion of the void, or may be formed to protrude from the portion of the covering layer, the portion being located at the bottom portion of the void. Furthermore, the infrared absorption layer may be provided on the first surface side of the first substrate, may be provided on the second surface side of the first substrate, or may be provided on a protective substrate to be described next. Then, in this case, the infrared reflective layer can be formed on a top surface of the covering layer (including on the top surface of the covering layer or a part of the top surface of the covering layer) or inside the covering layer. Furthermore, in these cases, a configuration in which an optical distance $L_0$ between the infrared absorption layer and the infrared reflective layer satisfies $$0.75 \times \lambda_{IR}/2 \leq L_0 \leq 1.25 \times \lambda_{IR}/2$$

or $$0.75 \times \lambda_{IR}/4 \leq L_0 \leq 1.25 \times \lambda_{IR}/4$$

where a wavelength of an infrared ray to be absorbed by the infrared absorption layer is $\lambda_{IR}$ can be adopted. In some cases, the infrared absorption layer may be formed on an opposite side of the side of the temperature detection element, where the infrared ray enters.

Alternatively, in the imaging device having a face to face structure including the above-described various favorable configurations, a configuration in which a first infrared absorption layer is formed on a side of the temperature detection element, where an infrared ray enters; an infrared reflective layer is formed in a region of the covering layer, the region being located at a bottom portion of the void; and a second infrared absorption layer is formed on a side of the temperature detection element, the side facing the void, can be adopted. The infrared reflective layer may be formed in a portion of the covering layer, the portion being located at the bottom portion of the void, may be formed in a part of the portion of the covering layer, the portion being located at the bottom portion of the void, or may be formed to protrude from the portion of the covering layer, the portion being located at the bottom portion of the void. Then, in this case, the first infrared absorption layer may be provided on the first surface side of the first substrate, may be provided on the second surface side of the first substrate, or may be provided on a protective substrate to be described next. The second infrared absorption layer is only required to be formed on a surface of the temperature detection element, the surface facing the void, or may be formed on an insulating film formed on the temperature detection element, facing the void, or may be formed in a state where a gap (space) is present between the second infrared absorption layer and the temperature detection element. Moreover, in these cases, the infrared reflective layer can be formed on a top surface of the covering layer (including on the top surface of the covering layer or a part of the top surface of the covering layer) or inside the covering layer. Since not only does each infrared absorption layer absorb the infrared ray but also transmits part of the infrared ray and reflects part of the infrared ray, the sensitivity can be further improved by adopting a configuration in which transmission and reflection are reduced. That is, with such a configuration, part of the infrared ray transmitted through the first infrared absorption layer is further absorbed by the second infrared absorption layer. Therefore, the transmission can be reduced. Furthermore, the infrared ray reflected by the first infrared absorption layer and the infrared ray reflected by the second infrared absorption layer are canceled with opposite phases and can reduce the reflection. Furthermore, the infrared ray reflected by the second infrared absorption layer and the infrared ray reflected by the infrared reflective layer are canceled with opposite phases and can reduce the reflection. Furthermore, in these cases, a configuration that satisfies $$0.75 \times \lambda_{IR}/4 \leq L_1 \leq 1.25 \times \lambda_{IR}/4, \text{ and}$$

$$0.75 \times \lambda_{IR}/4 \leq L_2 \leq 1.25 \times \lambda_{IR}/4$$

where a wavelength of an infrared ray to be absorbed by the first infrared absorption layer and the second infrared absorption layer is $\lambda_{IR}$, an optical distance between the first infrared absorption layer and the second infrared absorption layer is $L_1$, and an optical distance between the second infrared absorption layer and the infrared reflective layer is $L_2$. As $\lambda_{IR}$, 8 μm to 14 μm can be exemplified.

Moreover, in the imaging device having a face to face structure including the above-described various favorable configurations, a configuration in which a protective substrate is disposed on the surface side of the first substrate, where the infrared ray enters (on the second surface side of the first substrate) can be adopted. Then, in this case, the protective substrate may be disposed on the surface of the first substrate (on the second surface of the first substrate) or may be disposed above the surface of the first substrate (above the second surface of the first substrate). Furthermore, in the imaging device having a face to back structure including the above-described various favorable configurations, a configuration in which a protective substrate is disposed above the surface of the first substrate, where the infrared ray enters (above the second surface side of the first substrate) can be adopted. Examples of a material configuring the protective substrate include a silicon semiconductor substrate, a quartz substrate, a plastic substrate, a plastic film, a germanium substrate, and substrates including materials transmitting the infrared ray (specifically, $CaF_2$, $BaF_2$, $Al_2O_3$, ZnSe, and the like). Furthermore, polyethylene can be exemplified as the plastic.

Moreover, in the imaging device having the first configuration including the above-described various favorable modes and configurations, a mode in which a heat conductive layer is formed in the covering layer can be adopted. The heat conductive layer may have high heat conductivity, and conversely, may have low heat conductivity. Examples of the material configuring the heat conduction layer having high heat conductivity include a metal material and carbon-based materials such as carbon films and carbon nanotubes, and examples of the material configuring the heat conduction layer having low heat conductivity include organic-based materials. The heat conductive layer is not limited but is favorably formed on the entire surface of the temperature detection element array region. Furthermore, the heat conductive layer is not limited but is desirably disposed below the infrared reflective layer inside the covering layer. In some cases, the heat conductive layer may also serve as an infrared reflective layer.

Moreover, in the imaging device having the first configuration including the above-described various favorable modes and configurations, a configuration in which a temperature control layer is formed in the covering layer and the temperature detection means is further included can be adopted, whereby the temperature and temperature distribution of the temperature detection elements can be controlled with high accuracy. Here, the temperature control layer can be configured to function as a heater (resistor or resistance member). For example, the temperature control layer can be configured to also serve as a wire. Specifically, examples of the temperature detection means include a silicon diode, a transistor, or a polysilicon thin film that detects a temperature by measuring a change in electric resistance value depending on the temperature. Examples of the material configuring the temperature control layer also serving as a wire include a metal-based material film such as a tungsten film, a polysilicon film, and a titanium film. Examples of the material configuring the temperature control layer include a laminated film using the Peltier effect and a carbon film. In some cases, the temperature control layer may be provided on the second substrate. Moreover, in these cases, a configuration in which the drive circuit controls the temperature control layer on the basis of a temperature detection result of the temperature detection means (specifically, controls a current to flow through the temperature control layer, thereby controlling the amount of heat generated by the temperature control layer) can be adopted. Then, in these configurations, the first structure includes the temperature detection element array region provided with the temperature detection element and the peripheral region surrounding the temperature detection element array region, and the temperature control layer can be formed in the temperature detection element array region, or the temperature control layer can be formed in a region of the covering layer, where an orthogonal projection image of the temperature detection element array region is present, or the drive circuit includes the analog-digital conversion circuit (ADC), and the analog-digital conversion circuit is not disposed in a region of the drive circuit, where the orthogonal projection image of the temperature detection element array region is present. Since the analog-digital conversion circuit generates a large amount of heat, the temperature can be made more uniform by adopting such a configuration. Note that such disposition of the temperature control layer can also be applied to a structure in which a known light receiving element (light receiving element that receives visible light) is formed instead of the temperature detection element. Furthermore, in some cases, the temperature control layer may also serve as an infrared reflective layer.

Moreover, in the imaging device having the first configuration including the above-described various favorable modes and configurations, a mode in which a plurality of temperature detection elements is provided, and the void is shared by adjacent 2×k temperature detection elements (note that k is an integer of 1 or larger) can be adopted.

In the imaging device having the second configuration, a mode in which each of the temperature detection elements includes an infrared absorption layer on an infrared ray incident side and an infrared reflective layer on an opposite side of the infrared ray incident side, optical distances $L_0$ between the infrared absorption layers and the infrared reflective layers in the temperature detection elements are different in the temperature detection element unit, and the optical distances $L_0$ in the temperature detection elements satisfy $$0.75 \times \lambda_{IR}/2 \leq L_0 \leq 1.25 \times \lambda_{IR}/2$$

or $$0.75 \times \lambda_{IR}/4 \leq L_0 \leq 1.25 \times \lambda_{IR}/4$$

where a wavelength of an infrared ray to be absorbed by the infrared absorption layer constituting the temperature detection element is $\lambda_{IR}$ can be adopted. Then, in the imaging device having the second configuration including such a favorable mode, a mode in which each of the temperature detection elements includes an infrared absorption layer on an infrared ray incident side and an infrared reflective layer on an opposite side of the infrared ray incident side, and materials, configurations, and structures constituting the infrared absorption layers, materials, configurations, and structures constituting the infrared reflective layers, or the materials, configurations, and structures constituting the infrared absorption layers and the materials, configurations, and structures constituting the infrared reflective layers, in the temperature detection elements, are different in the temperature detection element unit, can be adopted. That is, (Case A) a mode in which the materials, configurations, and structures of the infrared absorption layers are different, and the materials, configurations, and structures of the infrared reflective layers are the same, in the temperature detection elements, (Case B) a mode in which the materials, configurations, and structures of the infrared reflective layers are different, and the materials, configurations, and structures of the infrared absorption layers are the same, in the temperature detection elements, or (Case C) a mode in which the materials, configurations, and structures of the infrared absorption layers are different, and the materials, configurations, and structures of the infrared reflective layers are different, in the temperature detection elements can be adopted.

In the imaging device having the third configuration, a mode in which
- each of the temperature detection elements includes an infrared absorption layer on an infrared ray incident side and an infrared reflective layer on an opposite side of the infrared ray incident side, and
- materials constituting the infrared absorption layers, materials constituting the infrared reflective layers, or the materials constituting the infrared absorption layers and the materials constituting the infrared reflective layers, in the temperature detection elements are different in the temperature detection element unit can be adopted. Then, in the imaging device having the third configuration including such a favorable mode, a mode in which
- each of the temperature detection elements includes an infrared absorption layer on an infrared ray incident side and an infrared reflective layer on an opposite side of the infrared ray incident side, and
- the infrared absorption layers, the infrared reflective layers, or areas, thicknesses, or the areas and thicknesses, of the infrared absorption layers and the infrared reflective layers, in the temperature detection elements are different in the temperature detection element unit can be adopted. That is,
- (Case a) a mode in which the areas of the infrared absorption layers are different and the areas of the infrared reflective layers are the same in the temperature detection elements,
- (Case b) a mode in which the areas of the infrared reflective layers are different and the areas of the infrared absorption layers are the same in the temperature detection elements,
- (Case c) a mode in which the areas of the infrared absorption layers are different and the areas of the infrared reflective layers are different in the temperature detection elements,
- (Case d) a mode in which the thicknesses of the infrared absorption layers are different and the thicknesses of the infrared reflective layers are the same in the temperature detection elements,
- (Case e) a mode in which the thicknesses of the infrared reflective layers are different and the thicknesses of the infrared absorption layers are the same in the temperature detection elements,
- (Case f) a mode in which the thicknesses of the infrared absorption layers are different and the thicknesses of the infrared reflective layers are different in the temperature detection elements,
- (Case g) a mode in which the areas and thicknesses of the infrared absorption layers are different and the areas and thicknesses of the infrared reflective layers are the same in the temperature detection elements,
- (Case h) a mode in which the areas and thicknesses of the infrared reflective layers are different and areas and the thicknesses of the infrared absorption layers are the same in the temperature detection elements, or
- (Case i) a mode in which the areas and thicknesses of the infrared absorption layers are different and the areas and thicknesses of the infrared reflective layers are different in the temperature detection elements can be adopted.

In the imaging device having the second configuration or the imaging device having the third configuration, the number of temperature detection elements constituting the temperature detection element unit may be two or more.

In the imaging device having the fifth configuration, a mode in which
- the number of the plurality of drive lines is $M_0/P_0$, and
- an mth drive line (note that m=1, 2, . . . , or $M_0/P_0$) is common to a temperature detection element group including $\{(m-1)P_0+p'\}$th $M_0$ temperature detection elements (note that all values of p'=1, 2, . . . , or $P_0$) disposed along the first direction can be adopted.

Then, in the imaging device having the fifth configuration including the above-described favorable mode, a configuration in which each signal line is connected to an analog front end and an analog-digital conversion circuit, and the analog front end includes a differential integration circuit that functions as an amplifier (preamplifier), in the second drive circuit, can be adopted. Alternatively, in the imaging device having the fifth configuration including the above-described favorable mode, the configuration in which each signal line is connected to the analog front end and the analog-digital conversion circuit can be adopted in the second drive circuit. In this case, the analog front end can have the configuration including a differential integration circuit. The analog front end including the differential integration circuit and the analog-digital conversion circuit can have known circuit configurations.

Moreover, in the imaging device having the fifth configuration including the above-described various favorable modes and configurations, a mode in which
- the temperature detection element is disposed above a void provided in a temperature detection element substrate,
- a first connection portion provided in the temperature detection element substrate and the first terminal portion of the temperature detection element are connected via a first stud portion (support leg or long beam, and similarly applied to below), and
- a second connection portion provided in the temperature detection element substrate and the second terminal portion of the temperature detection element are connected via a second stud portion can be adopted. Then, in this case, a mode in which $P_0=2$,

- respective second terminal portions of two temperature detection elements adjacent in the second direction are connected to the second connection portion provided in the temperature detection element substrate via one second stud portion, and
- respective first terminal portions of total of four temperature detection elements, of two temperature detection elements adjacent in the first direction and two temperature detection elements adjacent in the second direction, are connected to the first connection portion provided in the temperature detection element substrate via one first stud portion can be adopted.

In the imaging device of the present disclosure including the above-described various favorable modes and configurations (hereinafter may be simply referred to as "imaging device in the present disclosure and the like"), the drive circuit or the second drive circuit can include at least the analog front end, the analog-digital conversion circuit, a horizontal scanning circuit, and a vertical scanning circuit. Then, each signal line can be connected to the horizontal scanning circuit via the analog front end and the analog-digital conversion circuit. In this case, the analog front end includes a differential integration circuit, and a switch means that controls a conductive state between the differential integration circuit and the signal line can be provided between the differential integration circuit and the signal line. Furthermore, in this case, the switch means can switch the signal line to a fixed potential to make the conductive state between the differential integration circuit and the signal line non-conductive. The analog front end including the differential integration circuit, the analog-digital conversion circuit, and the switch means can have known circuit configurations. Furthermore, each drive line can be connected to the vertical scanning circuit.

In the imaging device of the present disclosure and the like including the above-described various favorable modes and configurations, the temperature detection element can include various diodes such as a pn junction diode including an SOI diode, and a Schottky diode, a transistor, and a combination of a diode and an active element; resistance bolometer elements provided with a vanadium oxide film, an amorphous silicon film, a polysilicon film, a silicon carbide film, a titanium film, and the like; thermoelectric conversion elements using metals such as platinum, gold, and nickel, and thermistors; thermopile elements using the Seebeck effect; pyroelectric elements in which surface charge of dielectric changes; ferroelectric elements; diodes using the tunnel effect; and elements to which superconductivity is applied, and these elements have known configurations and structures. More specifically, the temperature detection element can include a pn junction diode, a bolometer element, a thermopile element, a metal film resistance element, a metal oxide resistance element, a ceramic resistance element, and a thermistor element. One temperature detection element can also include a plurality of diodes connected in series, for example. The temperature detection element can be formed on the basis of, for example, a so-called MEMS technology.

In the imaging device having the first configuration to the imaging device having the sixth configuration, the temperature detection element may be provided on the infrared ray incident side of the first substrate or the temperature detection element substrate or may be provided on the opposite side of the infrared ray incident side of the first substrate or the temperature detection element substrate.

In the imaging device of the present disclosure and the like, as the number of the plurality of temperature detection elements or the temperature detection element units arrayed in the first direction and the second direction different from the first direction (specifically, in a two-dimensional matrix manner, for example) and configured to detect the temperature on the basis of the infrared ray, 640×480 (VGA), 320×240 (QVGA), 160×120 (QQVGA), 612×512, 1980× 1080 (and its integral multiple), and 2048×1080 (and its integral multiple) can be exemplified. The first direction and the second direction are favorably orthogonal to each other. However, the configuration is not limited thereto. An array obtained by removing pixels in a checkered pattern and rotating pixels at an angle of 45 degrees in the pixel array having the above-described number of pixels may be adopted.

In the imaging device and the like of the present disclosure, the first substrate and the temperature detection element substrate can include a silicon semiconductor substrate or an SOI substrate, for example, and the second substrate can include a silicon semiconductor substrate, for example. The signal line and the drive line are only required to be formed using a known conductive material on the basis of a known method. The drive circuit provided in the second structure can also include a known drive circuit. Alternatively, the drive circuit can include a known readout integrated circuit (ROIC). The first substrate may be provided with not only the temperature detection element but also other circuits.

The covering layer covering the drive circuit in the second structure can include a silicon oxide-based material, a silicon nitride-based material, a silicon oxynitride-based material, or various organic materials. The covering layer may have a single layer configuration or may have a multilayer structure.

Examples of a method of bonding the first substrate and the covering layer, specifically, examples of a method of bonding the bottom portion of the partition wall and the covering layer include a method of forming a silicon-oxygen covalent bond by dehydration condensation (a room temperature bonding method based on Si—$SiO_2$) and a room temperature bonding method based on $SiO_2$—$SiO_2$.

Examples of the material configuring the infrared absorption layer include chromium (Cr) and its alloys, aluminum (Al) and its alloys, and a laminated structure of a layer containing the aforementioned materials and an $SiO_2$ film or a SiN film. Heat generated as a result of absorption of the infrared ray in the infrared absorption layer is desirably reliably transferred to the temperature detection element. Furthermore, the infrared absorption layer is desirably set to have the thickness such that a sheet resistance value of a conductor material or a resistor material configuring the infrared absorption layer falls within a range of 377Ω±30%. Examples of the material configuring the infrared reflective layer include aluminum (Al) and its alloys having different characteristics (for example, sheet resistivity and sheet resistance value) from the infrared absorption layer, gold (Au) and its alloys, silver (Ag) and its alloys, copper (Cu) and its alloys, platinum (Pt) and its alloys, and a laminated structure of layers containing the aforementioned materials. The infrared reflective layer may also serve as a metal material layer or an alloy material layer configuring the exposed surface of the covering layer.

A space in which the temperature detection element is disposed is favorably depressurized or evacuated (including a low pressure close to vacuum, and this is similarly applied to below). The void is also favorably depressurized or evacuated. Alternatively, the entire imaging device is favorably stored in a package or a container (case) that is depressurized or evacuated.

The imaging device on the infrared ray incident side may be provided with a structure for preventing reflection of infrared rays, an infrared filter for passing only an infrared ray of a specific frequency, a light condensing element such as a diffraction grating or a lens, as needed.

The imaging device having the first configuration to the imaging device having the sixth configuration including the above-described various favorable modes and configurations can be arbitrarily combined. The combination can be not only imaging devices of two types of configurations but also imaging devices of three or more types of configurations.

The imaging device or the like in the present disclosure can be applied to, for example, an infrared camera, a night vision camera, a thermograph, an in-vehicle camera (human detection), an air conditioner (human detection sensor), and a microwave oven. Note that, in some cases, the imaging device or the like in the present disclosure can be rephrased as a temperature detection sensor that detects a temperature on the basis of an infrared ray.

Example 1

Figure 2:
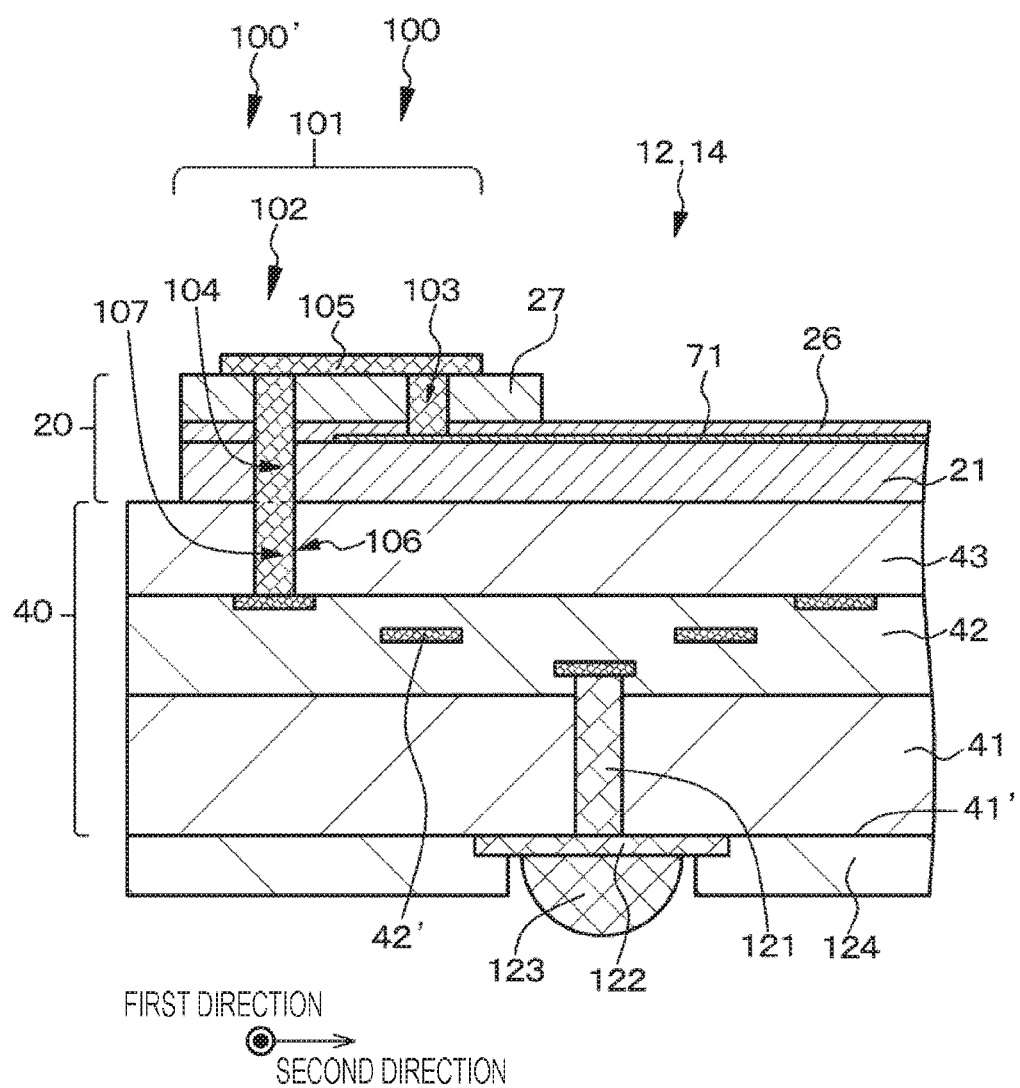
FIG. 2 is a schematic partial end view of a region (peripheral region) including a signal line connection portion of the imaging device according to Example 1.
Figure 3:
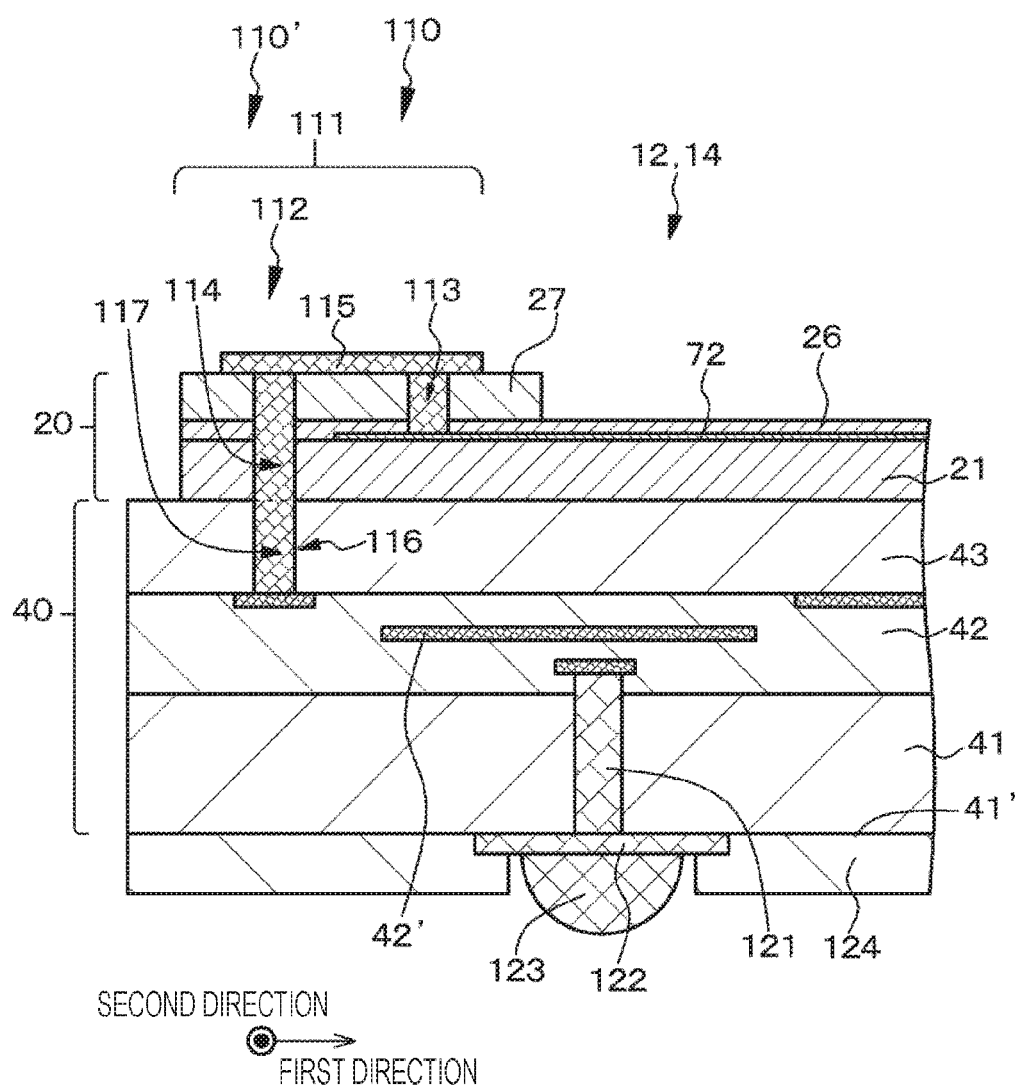
FIG. 3 is a schematic partial end view of a region (peripheral region) including a drive line connection portion of the imaging device according to Example 1.
Figure 4A:
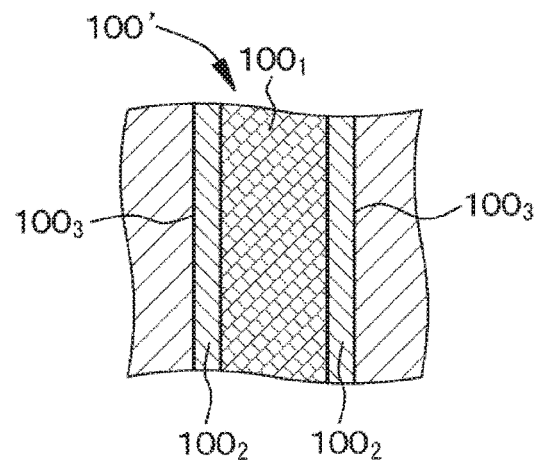
FIGS. 4A and 4B are respectively a schematic partial cross-sectional view in which a first connection hole is enlarged and a schematic partial cross-sectional view in which a second connection hole is enlarged, in the imaging device according to Example 1.
Figure 4B:
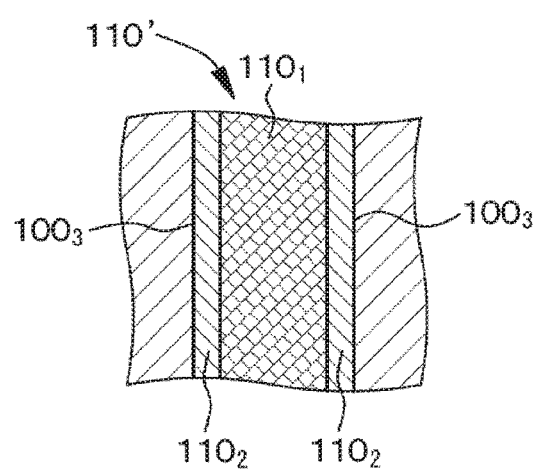
Figure 7:
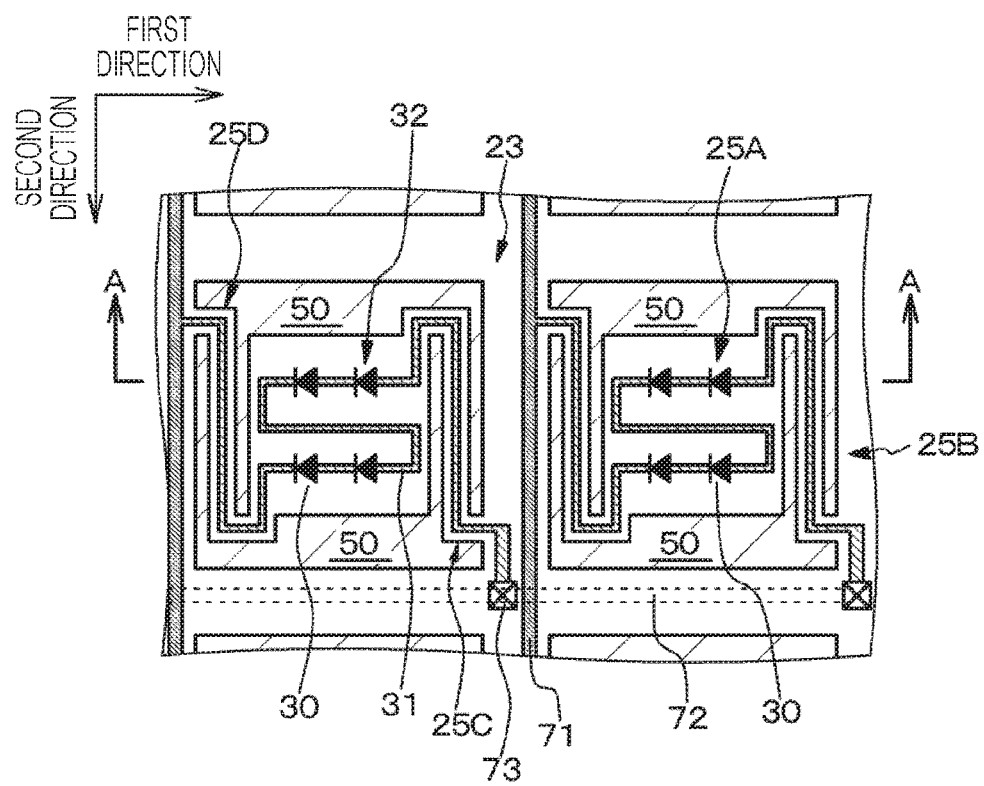
FIG. 7 is a schematic partial plan view of the imaging device according to Example 1.
Figure 8:
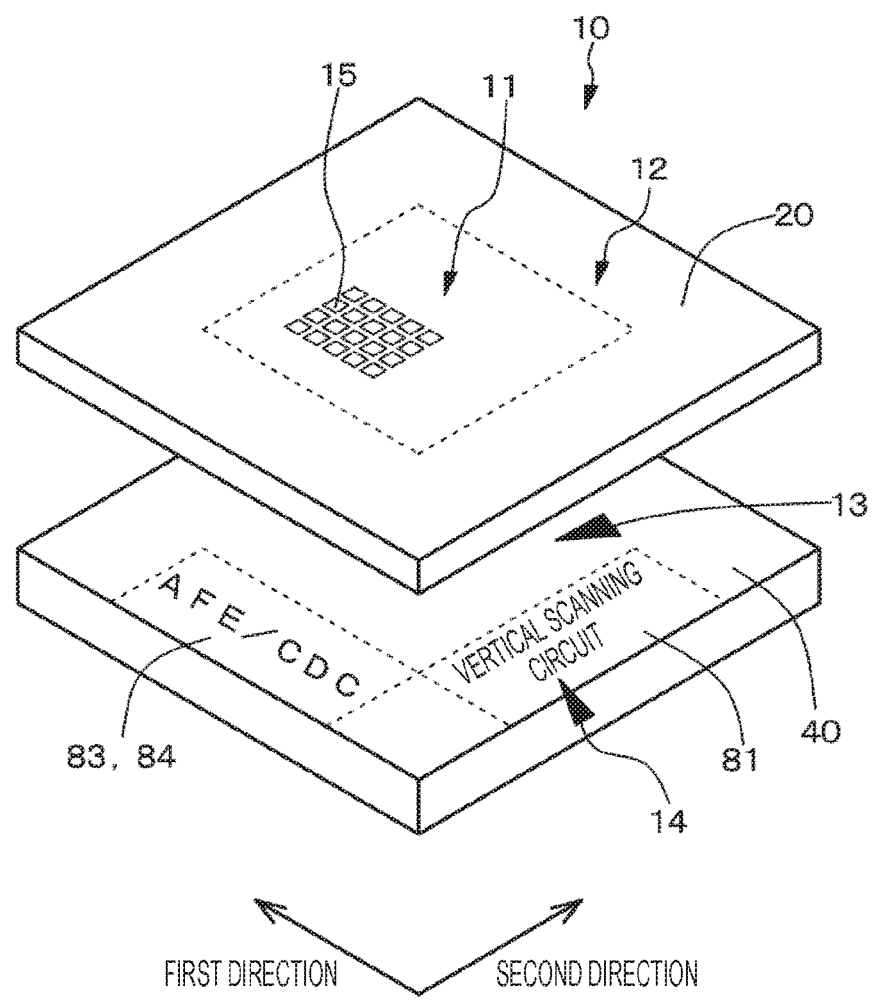
FIG. 8 is a schematic exploded perspective view of a first structure and a second structure in the imaging device according to Example 1.
Figure 9:
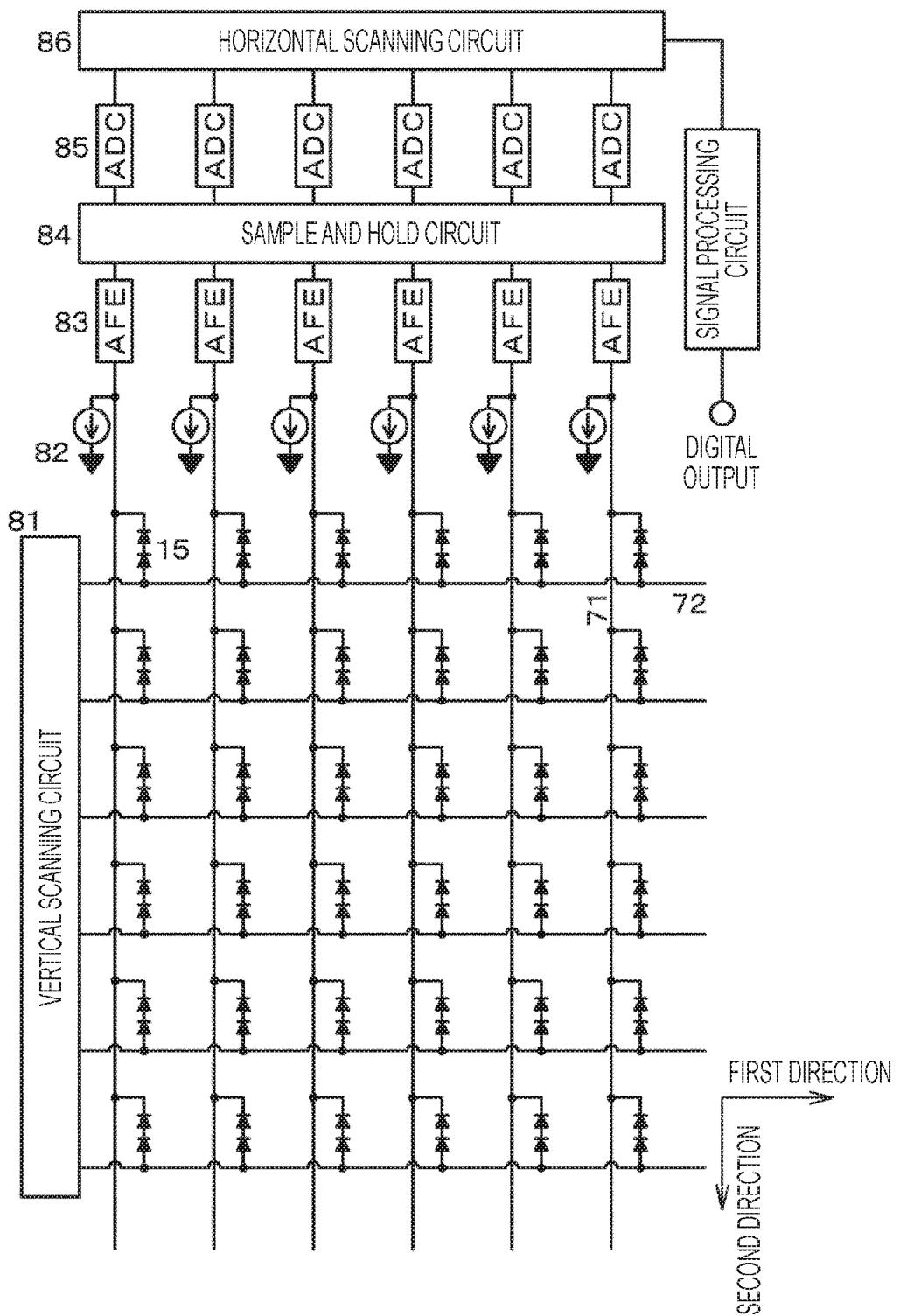
FIG. 9 is an equivalent circuit diagram of the imaging device according to Example 1.

Example 1 relates to the imaging device in the first mode, and specifically relates to the imaging device having the first configuration. FIG. 1 illustrates a schematic partial end view of the region (temperature detection element array region) including the temperature detection element of the imaging device according to Example 1, FIG. 2 illustrates a schematic partial end view of the region (peripheral region) including the signal line connection portion of the imaging device according to Example 1, FIG. 3 illustrates a schematic partial end view of the region (peripheral region) including the drive line connection portion of the imaging device according to Example 1, FIGS. 4A and 4B illustrate a schematic partial cross-sectional view in which the first connection hole is enlarged and a schematic partial cross-sectional view in which the second connection hole is enlarged, in the imaging device according to Example 1, and FIG. 7 illustrates a schematic partial plan view. Furthermore, FIG. 8 illustrates a schematic exploded perspective view of the first structure and the second structure in the imaging device according to Example 1, and FIG. 9 illustrates an equivalent circuit diagram of the imaging device according to Example 1. Specifically, the imaging device according to Example 1 is an imaging device having a face to back structure. Here, FIG. 1 is a schematic partial end view along arrow A-A in FIG. 7. Furthermore, in FIG. 7, illustration of the insulating film and the infrared absorption layer is omitted, the void, signal lines, and wires are hatched for the sake of clarity, the drive lines are illustrated as dotted lines, and the pn junction diodes are denoted by symbols.

An imaging device 10 according to Example 1 or an imaging device according to any one of Example 2 to Example 13 to be described below includes
  a first structure 20 and a second structure 40, in which
  the first structure 20 includes
    a first substrate 21,
    a temperature detection element 15 provided on the first substrate 21, and which detects a temperature on the basis of an infrared ray, and
    a signal line 71 and a drive line 72 connected to the temperature detection element 15,
  the second structure 40 includes
    a second substrate 41, and
    a drive circuit provided on the second substrate 41 and covered with a covering layer (interlayer insulating layer) 43, and
  the first substrate 21 and the second substrate 41 are stacked.
Then, the signal line 71 is electrically connected with the drive circuit via a signal line connection portion 100,
  the drive line 72 is electrically connected with the drive circuit via a drive line connection portion 110,
  the signal line connection portion 100 includes a first signal line connection portion 101 formed in the first structure 20 and a second signal line connection portion 106 formed in the second structure 40, and
  the drive line connection portion 110 includes a first drive line connection portion 111 formed in the first structure 20 and a second drive line connection portion 116 formed in the second structure 40.
Furthermore, a void 50 is provided between the temperature detection element 15 and the covering layer 43. The first substrate 21 and the second substrate 41 are stacked, and the void 50 is provided between the temperature detection element 15 and the covering layer 43 as described above, so that the void can be provided in the temperature detection element 15 with high accuracy. Moreover, as will be described below, an infrared absorption layer 61 is formed on a side where an infrared ray enters, and an infrared reflective layer 62 is formed in a region of the covering layer 43, the region being located at a bottom portion of the void.

Note that, in Example 1 or Example 2 to Example 13 to be described below,
  a plurality of temperature detection elements 15 or 215 arrayed in the first direction and the second direction different from the first direction is provided, and
  a plurality of drive lines 72 disposed along the first direction and to which the plurality of temperature detection elements 15 or 215 is connected, and a plurality of signal lines 71 disposed along the second direction and to which the plurality of temperature detection elements 15 or 215 is connected are further provided. In the drawings, the layer in which the drive circuit is formed is schematically indicated by reference numeral 42, and various wires or wire layers provided in the layer 42 in which the drive circuit is formed (in the illustrated example, there are three layers, but the number of layers is not limited to three) are schematically indicated by reference numeral 42'. Here, the first structure 20 includes, as illustrated in FIG. 8, a temperature detection element array region 11 (illustrated by being surrounded with a dotted line) provided with the temperature detection element 15, and a peripheral region 12 surrounding the temperature detection element array region 11. The signal line 71 is electrically connected with the drive circuit via the signal line connection portion 100 in the peripheral region 12 and a peripheral region 14 to be described next, and the drive line 72 is electrically connected with the drive circuit via the drive line connection portion 110 in the peripheral regions 12 and 14. Note that a central region in the second structure 40 is indicated by reference numeral 13, and a peripheral region in the second structure 40 is indicated by reference numeral 14.

In the peripheral region 14 in the second structure 40, for example, a region where an analog front end (AFE) 83 including a differential integration circuit constituting the drive circuit, a sample and hold circuit 84, and an analog-digital conversion circuit (ADC) 85 are provided, a constant current circuit 82, and a vertical scanning circuit 81 are arranged. The differential integration circuit has a function as an amplifier (preamplifier). Furthermore, in the central region 13 in the second structure 40, for example, a horizontal scanning circuit 86 constituting the drive circuit, a CPU (or DSP), a signal processing circuit, a storage device (for example, a memory or a nonvolatile memory), and the like are arranged. Note that illustration of the CPU (or DSP), the signal processing circuit, and the storage device is omitted. The drive circuit provided in the second structure 40 can include a known drive circuit.

The imaging device according to Example 1 relates to the imaging device in the first mode, and
  the first signal line connection portion 101 includes a first A connection hole 102 formed in the first structure 20,
  the second signal line connection portion 106 includes a first B connection hole 107 formed in the second structure 40,
  the first drive line connection portion 111 includes a second A connection hole 112 formed in the first structure 20,
  the second drive line connection portion 116 includes a second B connection hole 117 formed in the second structure 40, the first A connection hole 102 and the first B connection hole 107 are integrally connected to configure a first connection hole 100', and the second A connection hole 112 and the second B connection hole 117 are integrally connected to configure a second connection hole 110'.

Here, in the imaging device according to Example 1, the first A connection hole 102 includes a first A connection hole first segment 103 connected to the signal line 71 and extending in a direction away from the second structure 40, a first A connection hole second segment 104 extending in a direction approaching the first B connection hole 107, and a first A connection hole third segment 105 connecting the first A connection hole first segment 103 and the first A connection hole second segment 104. Furthermore, the second A connection hole 112 includes a second A connection hole first segment 113 connected to the drive line 72 and extending in a direction away from the second structure 40, a second A connection hole second segment 114 extending in a direction approaching a second B connection hole 117, and a second A connection hole third segment 115 connecting the second A connection hole first segment 113 and the second A connection hole second segment 114. The first A connection hole third segment 105 and the second A connection hole third segment 115 are formed on an insulating film 27 formed on an insulating film 26.

Connection wires 121 and 122 are formed from the drive circuit to a lower surface 41' of the second substrate 41. Then, a solder ball 123 is provided on the connection wire 122. Furthermore, a solder resist layer 124 is formed on the lower surface 41' of the second substrate 41 so as to cover the connection wire 122 and surround the solder balls 123.

Here, the capacitance $C_1$ of the first connection hole 100' is larger than the capacitance $C_2$ of the second connection hole 110' ($C_1/C_2>1$).

FIGS. 2 and 3 illustrate the first connection hole 100' and the second connection hole 110' in a simplified manner. FIGS. 4A and 4B illustrate schematic enlarged partial cross-sectional views of the first connection hole 100' and the second connection hole 110'. The first connection hole 100' includes a first core portion $100_1$, and a first outer peripheral portion (first outer peripheral layer) $100_2$ disposed between a sidewall $100_3$ of the first connection hole 100' and the first core portion $100_1$. Similarly, the second connection hole 110' includes a second core portion $110_1$, and a second outer peripheral portion (second outer peripheral layer) $110_2$ disposed between a sidewall $110_3$ of the second connection hole 110' and the second core portion $110_1$.

Figure 5A:
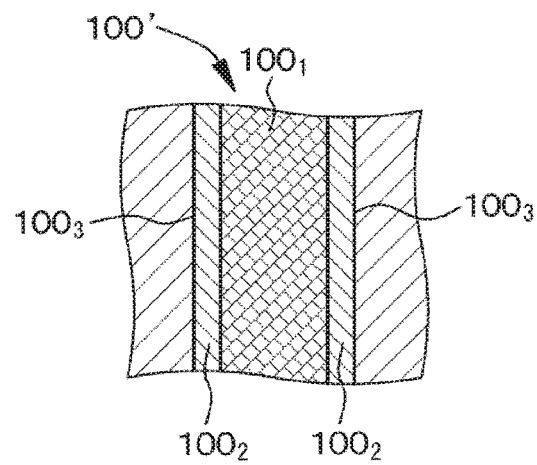
FIGS. 5A and 5B are schematic partial cross-sectional views of examples of the first connection hole and the second connection hole in the imaging device according to Example 1.
Figure 5B:
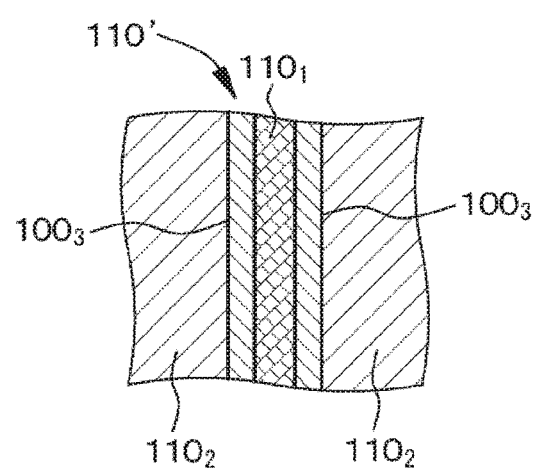

Then, the average cross-sectional area of the first connection hole 100' can be configured to be larger than the average cross-sectional area of the second connection hole 110'. In this case, as FIGS. 5A and 5B illustrate schematic partial cross-sectional views of the first connection hole 100' and the second connection hole 110', the number $α_1$ of the first connection holes 100' and the number $α_2$ of the second connection holes 110' are simply made the same ($α_1=α_2$) and an average cross-sectional area $β_1$ of the first connection holes 100' is only required to be made larger than an average cross-sectional area $β_2$ of the second connection holes 110' ($β_1>β_2$). Thereby, the area of the first capacitor including the first core portion $100_1$, the first outer peripheral portion $100_2$, and the first substrate 21 can be made larger than the area of the second capacitor including the second core portion $110_1$, the second outer peripheral portion $110_2$, and the first substrate 21. As a result, the capacitance $C_1$ of the first capacitor can be made larger than the capacitance $C_2$ of the second capacitor.

Figure 6:
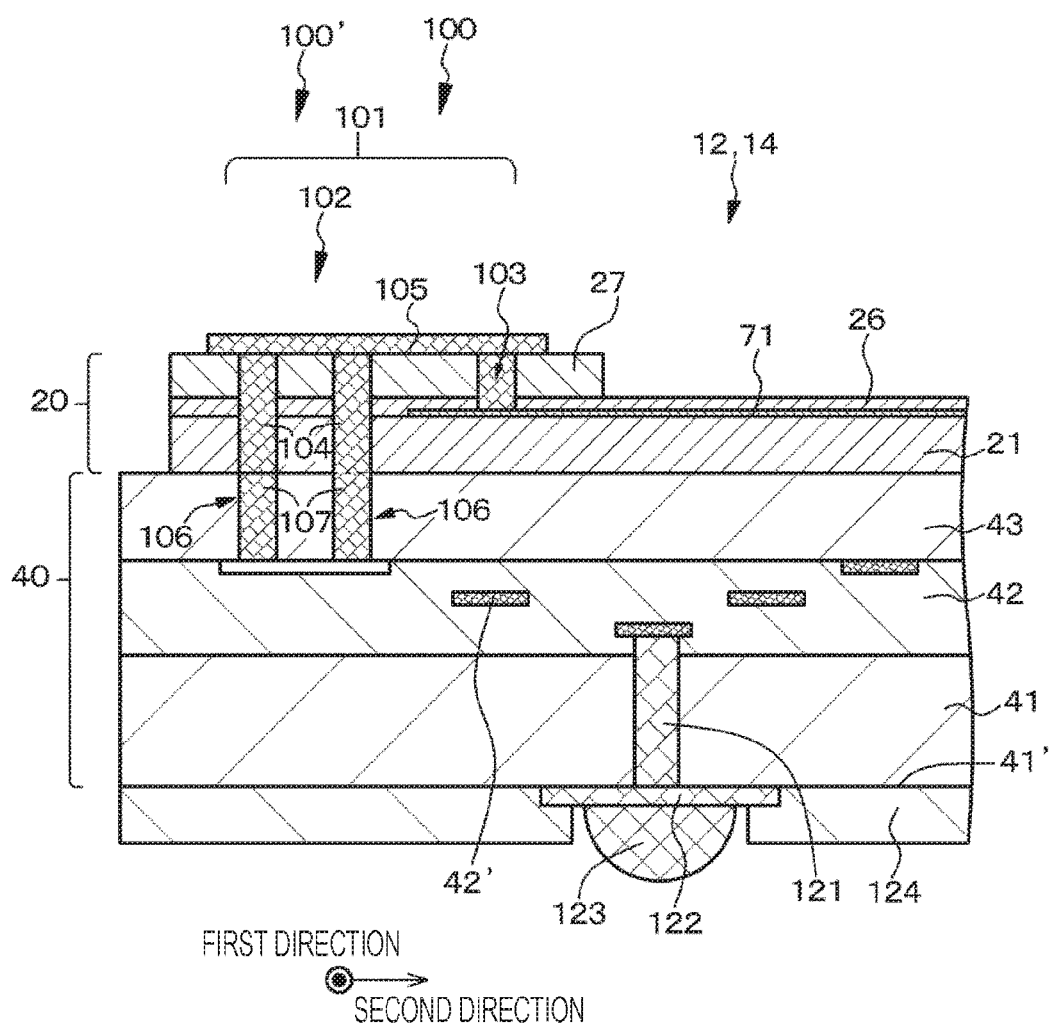
FIG. 6 is a schematic partial end view of a region (peripheral region) including a signal line connection portion in a modification of the imaging device according to Example 1.

Alternatively, as FIG. 6 illustrates a schematic partial end view of the region including the signal line connection portion (peripheral region), the number $α_1$ of the first connection holes 100' may be configured to be larger than the number $α_2$ of the second connection holes 110' ($α_1>α_2$, and $α_1=2$ and $α_2=1$ in the illustrated example) and the average cross-sectional area $β_1$ of the first connection holes 100' may be made the same as the average cross-sectional area $β_2$ of the second connection holes 110' ($β_1=β_2$) Thereby, the number of capacitors connected in parallel in the first connection hole 100' can be made larger than the number of capacitors connected in parallel in the second connection hole 110'. As a result, the capacitance $C_1$ of the first capacitor can be made larger than the capacitance $C_2$ of the second capacitor.

Alternatively, the length of the first connection hole 100' (for example, the length of the first A connection hole first segment 103 and the first A connection hole second segment 104 in the example illustrated in FIG. 2) can be configured to be larger than the length of the second connection hole 110' (for example, the length of the second A connection hole first segment 113 and the second A connection hole second segment 114 in the example illustrated in FIG. 3). Then, thereby, the area of the first capacitor can be made larger than the area of the second capacitor, and as a result, the capacitance $C_1$ of the first capacitor can be made larger than the capacitance $C_2$ of the second capacitor. Specifically, for example, the thickness of the insulating film 27 in a region where the first connection hole 100' is to be formed is only required to be made larger than the thickness of the insulating film 27 in a region where the second connection hole 110' is to be formed.

Alternatively, the first outer peripheral portion $100_2$ and the second outer peripheral portion $110_2$ can include the same material, and the first outer peripheral portion $100_2$ can be configured to be thinner than the second outer peripheral portion $110_2$. Thus, by making the first outer peripheral portion $100_2$ thinner than the second outer peripheral portion $110_2$, the capacitance $C_1$ of the first capacitor can be made larger than the capacitance $C_2$ of the second capacitor. Alternatively, a relative dielectric constant value $ε_1$ of the material configuring the first outer peripheral portion $100_2$ can be configured to be larger than a relative dielectric constant value $ε_2$ of the material configuring the second outer peripheral portion $110_2$. Thereby, the capacitance $C_1$ of the first capacitor can be made larger than the capacitance $C_2$ of the second capacitor.

Note that the first core portion $100_1$ and the second core portion $110_2$ may be only required to include, for example, copper (Cu) or a material containing copper, tungsten (W) or a material containing tungsten, or polysilicon, and the first outer peripheral portion $100_2$ and the second outer peripheral portion $110_2$ are only required to include, for example, $SiO_2$ or SiN. Note that, in a case of changing the relative dielectric constant of the materials configuring the first outer peripheral portion $100_2$ and the second outer peripheral portion $110_2$, SiN is only required to be adopted as the material configuring the first outer peripheral portion $100_2$, and $SiO_2$ is only required to be adopted as the material configuring the second outer peripheral portion $110_2$. The first A connection hole 102 and the first B connection hole 107 are integrally connected, and the second A connection hole 112 and the second B connection hole 117 are integrally connected.

Specifically, the first A connection hole 102 and the first B connection hole 107 are simply formed together (at the same time) to obtain the first connection hole 100', and similarly, the second A connection hole 112 and the second B connection hole 117 are simply formed together (at the same time) to obtain the second connection hole 110'. As these forming methods, a known CVD method can be exemplified. More specifically, after formation of the insulating films 26 and 27, a through hole reaching the wire 42' is formed in the insulating films 26 and 27, the first substrate 21, and the covering layer 43, and a through hole reaching the signal line 71 and the drive line 72 is formed in the insulating films 26 and 27. The first outer peripheral portion 100$_2$ and the second outer peripheral portion 110$_2$ are formed on side surfaces of the through holes on the basis of a known method. Next, the first core portion 100$_1$ and the second core portion 110$_2$ are only required to be formed inside the through holes on the basis of a known method.

In the imaging device according to Example 1, the first structure including the temperature detection element that detects the temperature on the basis of the infrared ray and the second structure including the drive circuit are stacked, and the temperature detection element is electrically connected with the drive circuit via the signal line and the signal line connection portion and via the drive line and the drive line connection portion. Therefore, further downsizing of the imaging device can be achieved. Moreover, since the capacitance of the first connection hole is made larger than the capacitance of the second connection hole, a voltage value of an output signal output from the temperature detection element to the drive circuit can be made high. As a result, the output signal from the temperature detection element can be more largely amplified in the drive circuit, and an imaging device having higher sensitivity can be provided. Moreover, since the capacitance of the first connection hole is made larger than the capacitance of the second connection hole, noise of the output signal output from the temperature detection element to the drive circuit can be decreased. As a result, the output signal from the temperature detection element can be more largely amplified in the drive circuit, and an imaging device having higher sensitivity can be provided. Furthermore, since the capacitance of the first connection hole is used as a part of the capacitance used in the analog front end or the sample and hold circuit connected to each signal line, the circuit area can be reduced.

Figure 10:
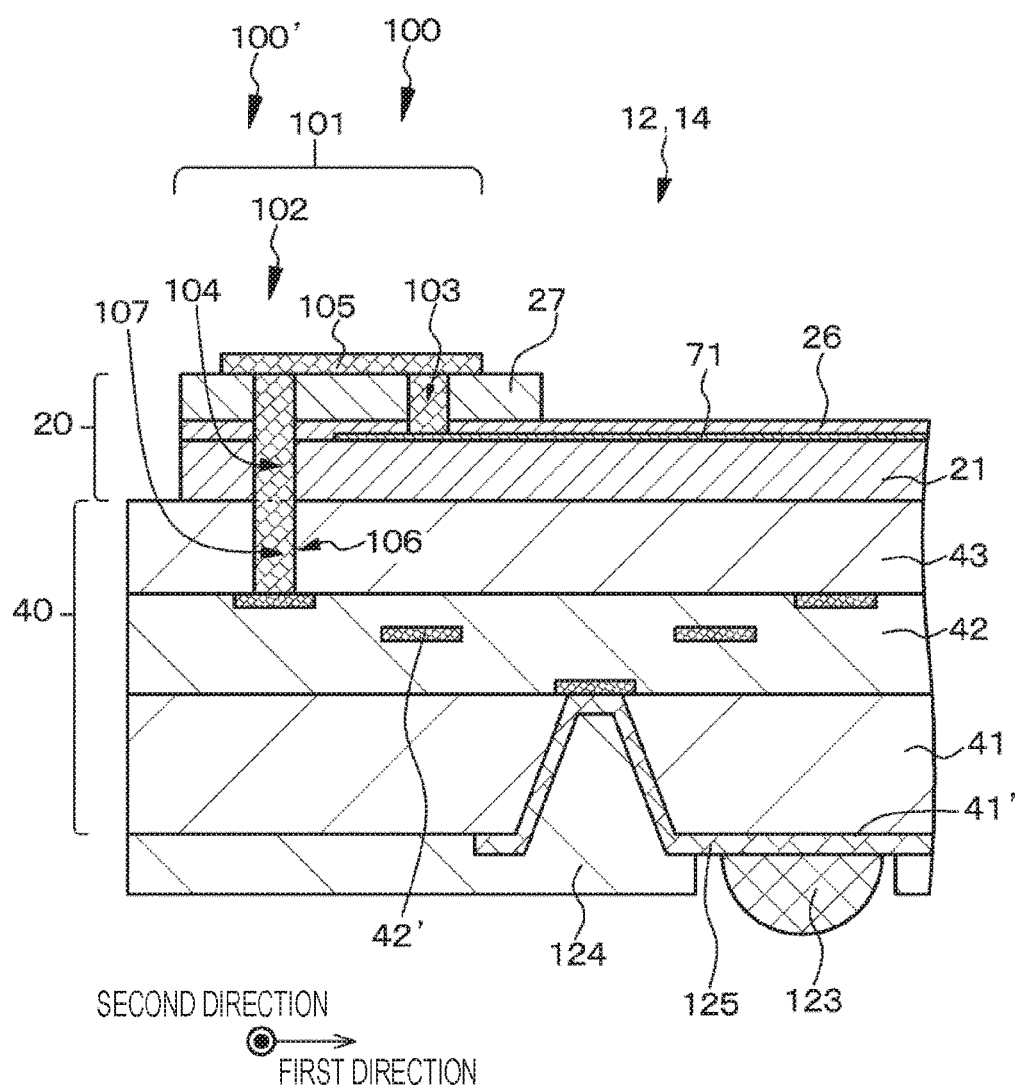
FIG. 10 is a schematic partial end view of a region (peripheral region) including a signal line connection portion of another modification of the imaging device according to Example 1.

As FIG. 10 illustrates a schematic partial end view of a region including a signal line connection portion (peripheral region) of a modification of the imaging device according to Example 1, a configuration in which a rewire 125 is formed from the drive circuit to the lower surface 41' of the second substrate 41, and the solder ball 123 is provided on the rewire 125 can be adopted. The solder resist layer 124 is formed on the lower surface 41' of the second substrate 41 so as to cover the rewire 125 and surround the solder balls 123. Note that such a configuration and structure can be applied to other examples.

Example 2

Figure 11:
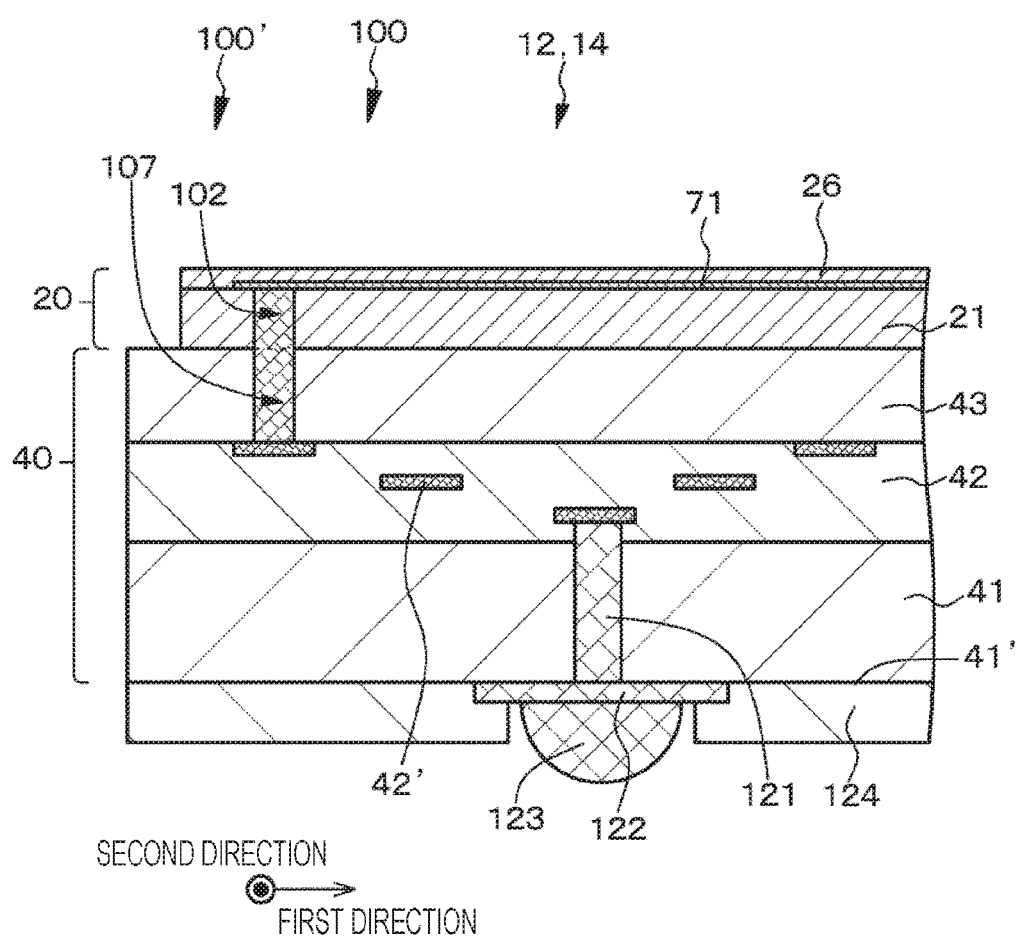
FIG. 11 is a schematic partial end view of a region (peripheral region) including a signal line connection portion of an imaging device according to Example 2.
Figure 12:
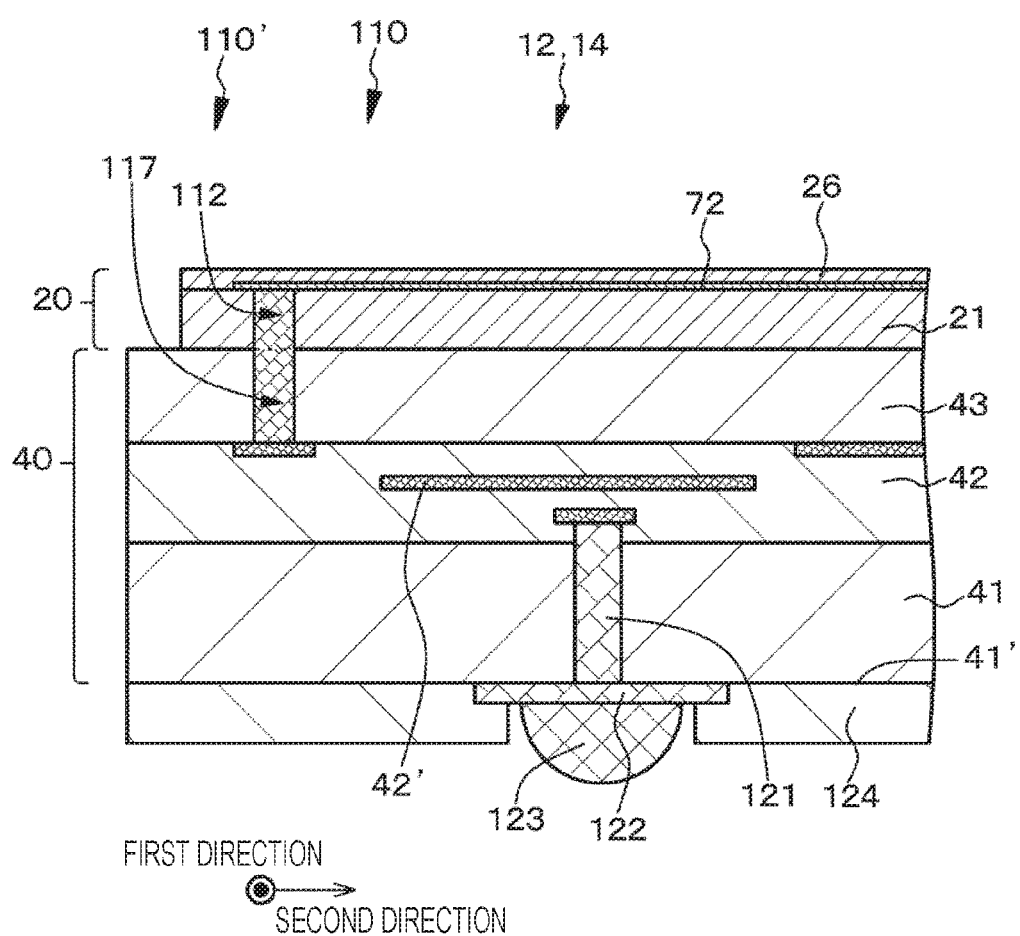
FIG. 12 is a schematic partial end view of a region (peripheral region) including a drive line connection portion of the imaging device according to Example 2.

Example 2 is a modification of Example 1. As FIG. 11 illustrates a schematic partial end view of the region (peripheral region) including the signal line connection portion, and FIG. 12 illustrates a schematic partial end view of the region (peripheral region) including the drive line connection portion, of the imaging device according to Example 2, the first A connection hole 102 is connected to the signal line 71 and extending in the direction approaching the second structure 40 in the imaging device according to Example 2. The first B connection hole 107 is connected to the drive circuit and extends in the direction approaching the first structure 20. An end surface of the first A connection hole 102 and an end surface of the first B connection hole 107 integrally configure the first connection hole 100'. Furthermore, the second A connection hole 112 is connected to the drive line 72 and extends in the direction approaching the second structure 40. The second B connection hole 117 is connected to the drive circuit and extends in the direction approaching the first structure 20. An end surface of the second A connection hole 112 and an end surface of the second B connection hole 117 integrally configure the second connection hole 110'.

Note that FIGS. 11, 12, 13, 14, 15, and 16 illustrate the first connection hole and the second connection hole in a simplified manner.

Since the configuration and structure of the imaging device according to Example 2 can be similar to the configuration and structure of the imaging device according to Example 1 except for the above points, detailed description is omitted.

Example 3

Figure 13:
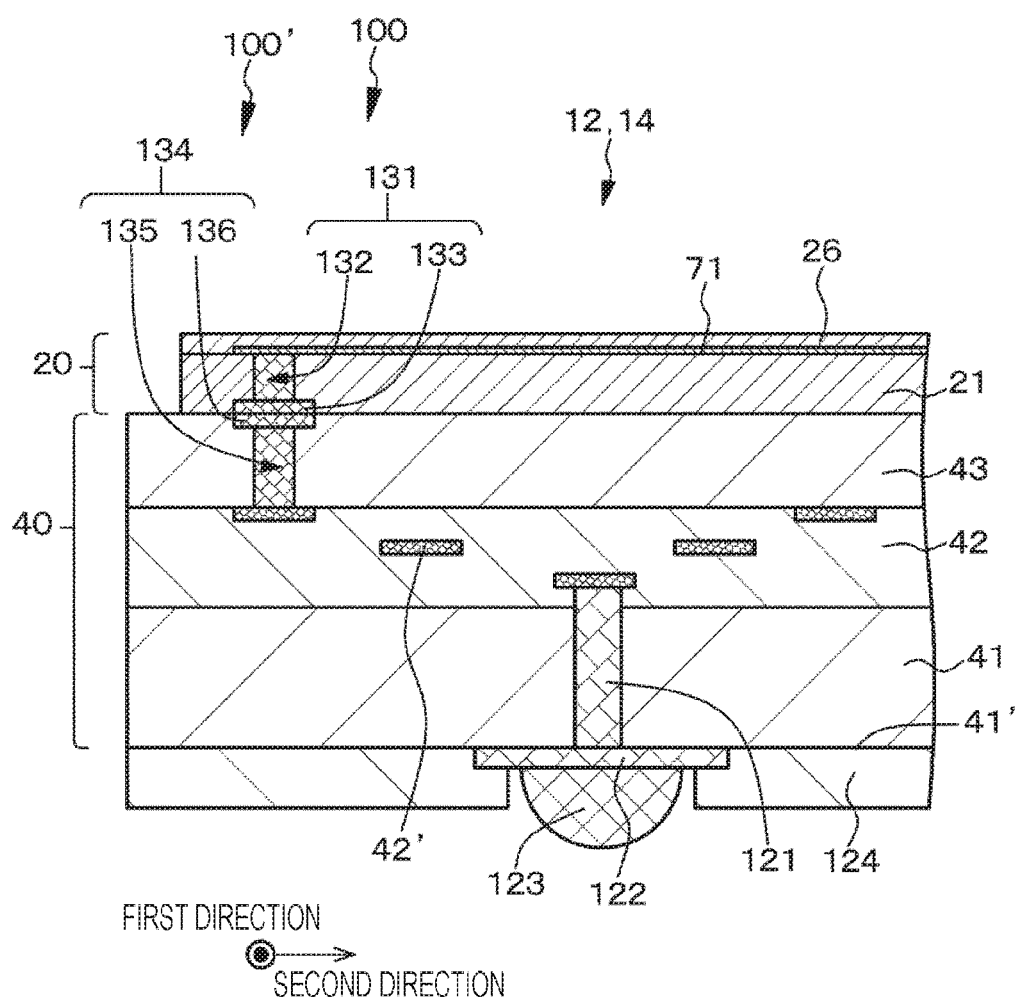
FIG. 13 is a schematic partial end view of a region (peripheral region) including a signal line connection portion of an imaging device according to Example 3.
Figure 14:
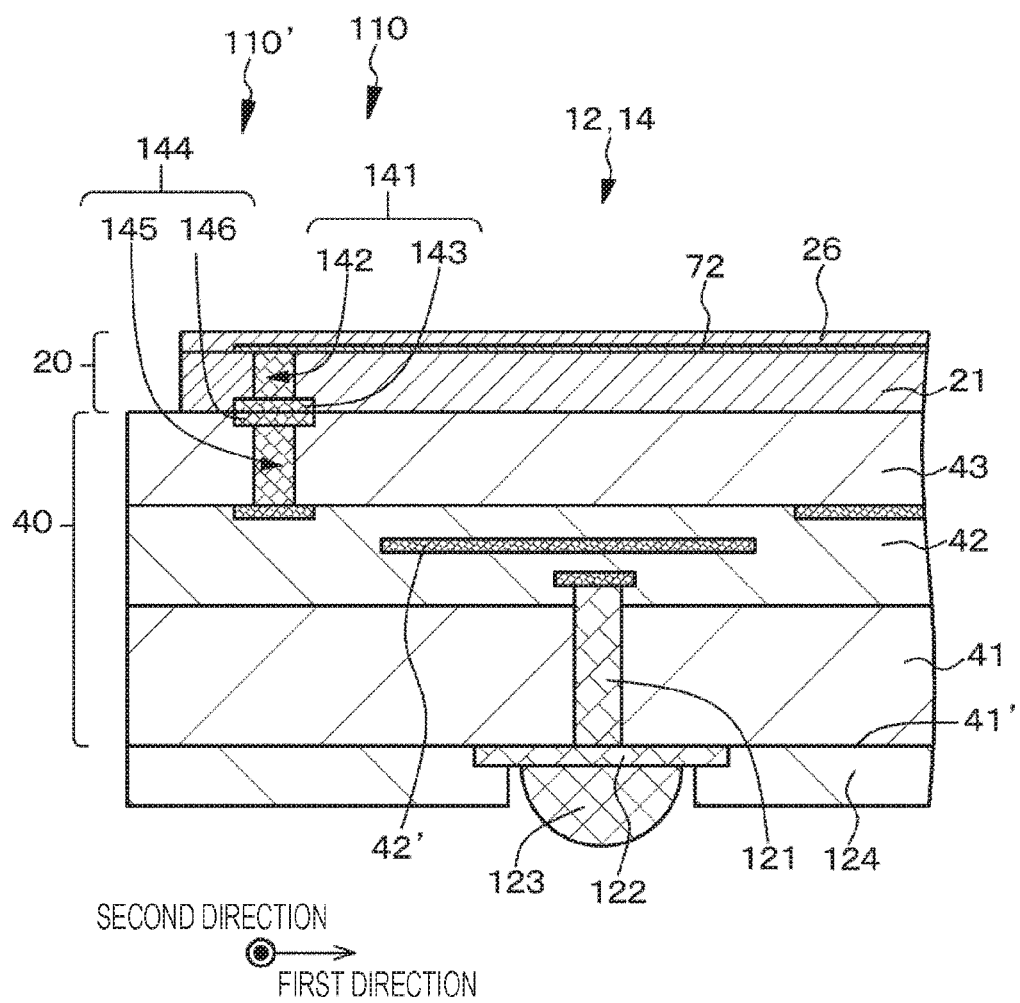
FIG. 14 is a schematic partial end view of a region (peripheral region) including a drive line connection portion of the imaging device according to Example 3.

Example 3 is also a modification of Example 1, and relates to the imaging device in the second mode, and more specifically relates to the imaging device in the second A mode. As FIG. 13 illustrates a schematic partial end view of the region (peripheral region) including the signal line connection portion, and FIG. 14 illustrates a schematic partial end view of the region (peripheral region) including the drive line connection portion, of the imaging device according to Example 3, a first signal line connection portion 131 includes a first A connection hole 132 formed in the first structure 20, and a first A connection end portion 133 provided on a surface of the first structure 20, the surface facing the second structure 40, and connected to the first A connection hole 132, a second signal line connection portion 134 includes a first B connection hole 135 formed in the second structure 40, and a first B connection end portion 136 provided on a surface of the second structure 40, the surface facing the first structure 20, and connected to the first B connection hole 135, a first drive line connection portion 141 includes a second A connection hole 142 formed in the first structure 20, and a second A connection end portion 143 provided on the surface of the first structure 20, the surface facing the second structure 40, and connected to the second A connection hole 142, a second drive line connection portion 144 includes a second B connection hole 145 formed in the second structure 40, and a second B connection end portion 146 provided on the surface of the second structure 40, the surface facing the first structure 20, and connected to the second B connection hole 145, the first A connection end portion 133 and the first B connection end portion 136 are connected, the second A connection end portion 143 and the second B connection end portion 146 are connected, the first A connection hole 132 and the first B connection hole 135 configure the first connection hole 100', and the second A connection hole 142 and the second B connection hole 145 configure the second connection hole 110'.

An example of the material configuring the first A connection end portion 133, the first B connection end portion 136, the second A connection end portion 143, and the second B connection end portion 146 includes copper (Cu). To connect the first A connection hole 132 and the first A connection end portion 133, the first A connection end portion 133 is only required to be formed on the end surface of the first A connection hole 132. Similarly, to connect the first B connection hole 135 and the first B connection end portion 136, the first B connection end portion 136 is only required to be formed on the end surface of the first B connection hole 135. To connect the second A connection hole 142 and the second A connection end portion 143, the second A connection end portion 143 is only required to be formed on the end surface of the second A connection hole 142. To connect the second B connection hole 145 and the second B connection end portion 146, the second B connection end portion 146 is only required to be formed on the end surface of the second B connection hole 145. Examples of these forming methods include various CVD methods and various PVD methods.

The first A connection end portion 133, the first B connection end portion 136, the second A connection end portion 143, and the second B connection end portion 146 include a metal layer or an alloy layer (specifically, a copper layer), the first A connection end portion 133 and the first B connection end portion 136 are bonded, and the second A connection end portion 143 and the second B connection end portion 146 are bonded. The first A connection end portion 133, the first B connection end portion 136, the second A connection end portion 143, and the second B connection end portion 146 can be bonded on the basis of a method (metal-metal bonding method) of applying a pressure (weight) and directly bonding the portions at room temperature or in a heated state.

Since the configuration and structure of the imaging device according to Example 3 can be similar to the configuration and structure of the imaging device according to Example 1 or 2 except for the above points, detailed description is omitted.

Example 4

Figure 15:
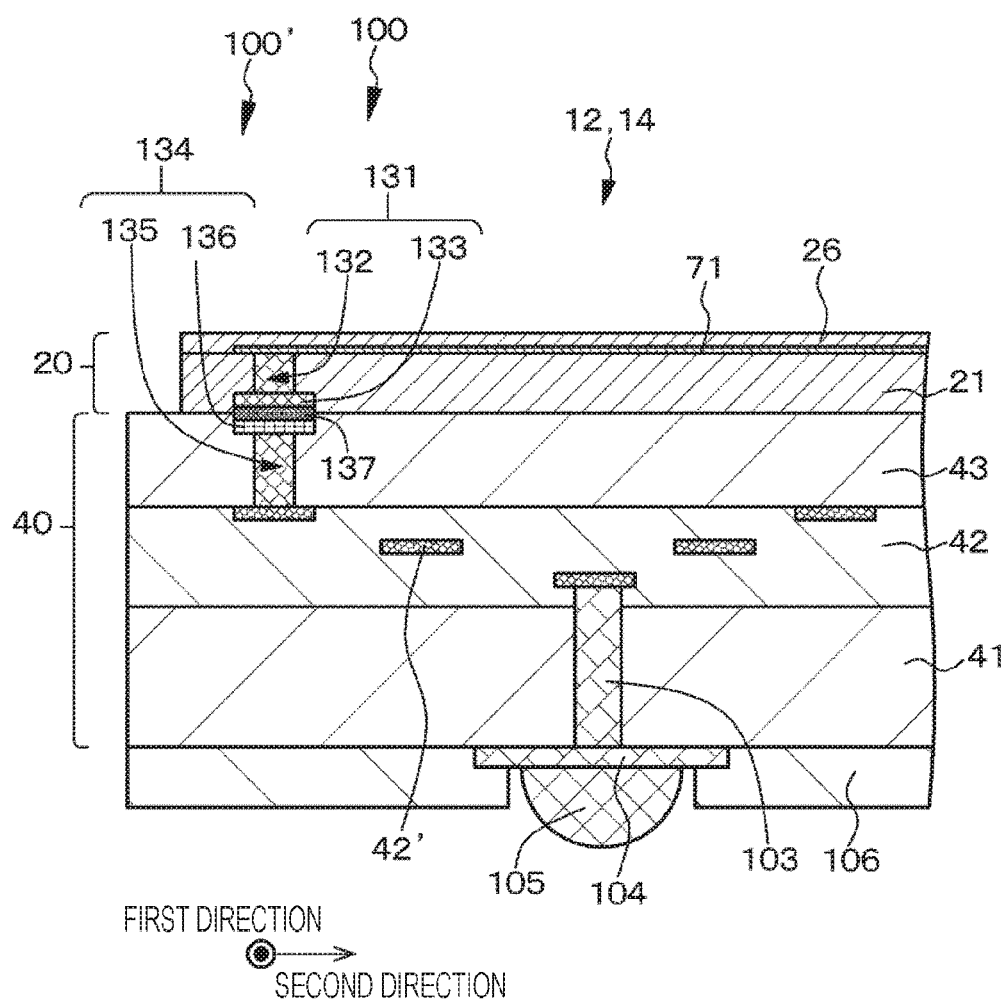
FIG. 15 is a schematic partial end view of a region (peripheral region) including a signal line connection portion of an imaging device according to Example 4.
Figure 16:
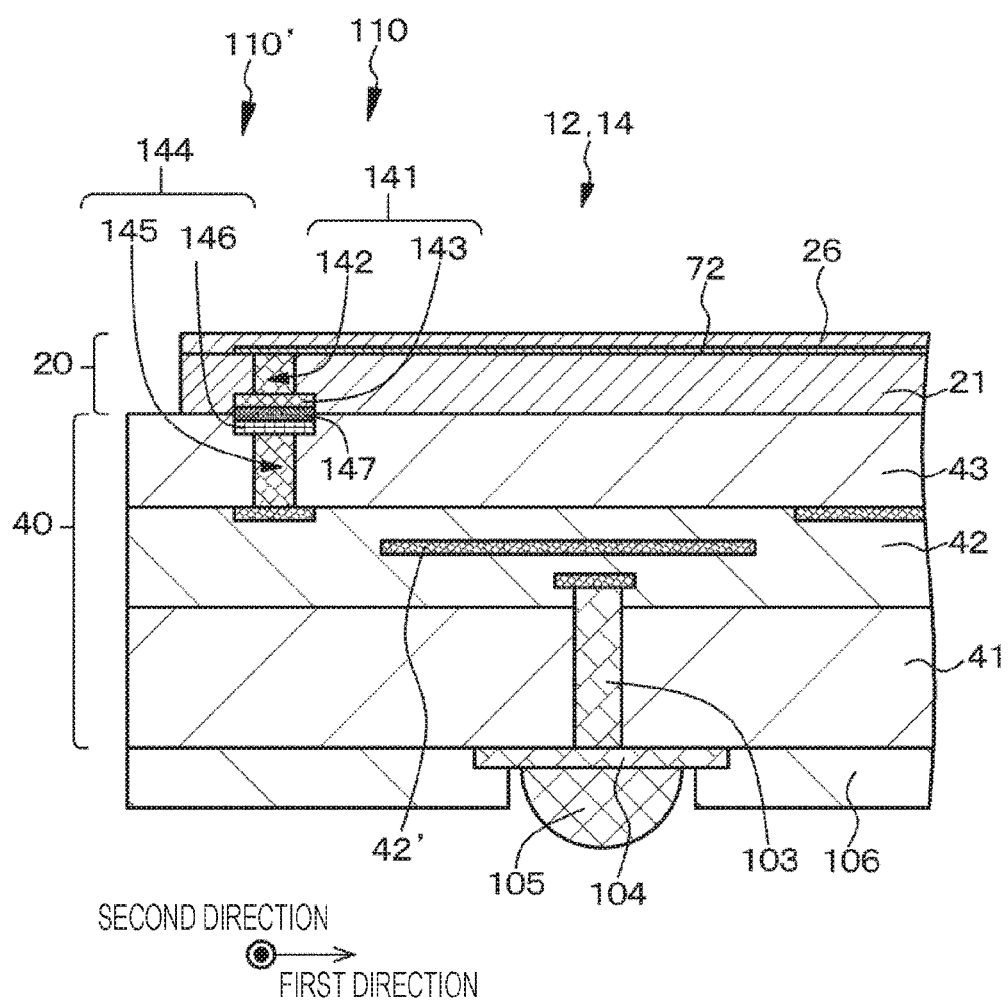
FIG. 16 is a schematic partial end view of a region (peripheral region) including a drive line connection portion of the imaging device according to Example 4.

Example 4 relates to a modification of Example 3, and relates to the imaging device in the second B mode. As FIG. 15 illustrates a schematic partial end view of the region (peripheral region) including the signal line connection portion, and FIG. 16 illustrates a schematic partial end view of the region (peripheral region) including the drive line connection portion, of the imaging device according to Example 4, the first A connection end portion 133 and the first B connection end portion 136 are connected via a first bonding material layer 137, and the second A connection end portion 143 and the second B connection end portion 146 are connected via a second bonding material layer 147. Examples of the first bonding material layer 137 and the second bonding material layer 147 include a solder material (for example, solder), an indium (In) bump, and a gold (Au) bump.

Since the configuration and structure of the imaging device according to Example 4 can be similar to the configuration and structure of the imaging device according to Example 1 or 2 except for the above points, detailed description is omitted.

Example 5

In Example 5, the temperature detection element 15 used in the imaging device described in Example 1 to Example 4 will be described. Note that the imaging device according to Example 5 is an imaging device having a face to back structure, as illustrated in FIG. 1.

In the imaging device 10 described in Example 1 to Example 4, a partition wall 23 is formed in a portion of the first substrate 21, the portion being located between the temperature detection element 15 and the temperature detection element 15, and a bottom portion of the partition wall 23 is bonded with the covering layer 43. Here, the bottom portion of the partition wall 23 and the covering layer 43 are bonded on the basis of a method of forming a silicon-oxygen covalent bond by dehydration condensation. A sidewall 24 of the partition wall 23 includes at least one type of material layer selected from a group including an insulating material layer, a metal material layer, an alloy material layer, and a carbon material layer. Specifically, in Example 5, the sidewall 24 of the partition wall 23 includes the insulating material layer such as a $SiO_2$ layer. Furthermore, an inside of the partition wall 23 surrounded by the sidewall 24 of the partition wall 23 includes a part of the first substrate 21, specifically, a silicon layer 22. The exposed surface of the covering layer 43, the exposed surface being exposed to the void 50, includes at least one type of material layer selected from a group including an insulating material layer, a metal material layer, an alloy material layer, and a carbon material layer. Specifically, in Example 5, the exposed surface of the covering layer 43, the exposed surface being exposed to the void 50, includes the insulating material layer such as an $SiO_2$ layer, and an interlayer insulating layer (not specifically illustrated) containing SiN constituting the covering layer 43 and the like is formed below the $SiO_2$ layer. Note that if the sidewall 24 of the partition wall 23 includes a material that reflects infrared rays, the incident infrared rays can be effectively reflected.

In Example 5, the temperature detection element 15 is formed such that a plurality of (four in the illustrated example) pn junction diodes 30 is connected in series via a wire 31. However, the configuration is not limited thereto, and the temperature detection element 15 can include a resistance bolometer element, a thermoelectric conversion element, a thermopile element, a pyroelectric element, or a ferroelectric element having known configuration and structure. The pn junction diode has known configuration and structure. The temperature detection element 15 is formed on the basis of a so-called MEMS technology, as will be described below. The temperature detection element 15 is provided on the infrared ray incident side of the first substrate 21 (a second surface 21B of the first substrate 21).

The temperature detection element 15 (specifically, the pn junction diode 30) is formed on a diaphragm portion (fictitious portion or fictitious thin layer portion) 25A including an insulating material layer containing $SiO_2$. An insulating material layer 25B containing $SiO_2$ is formed on a top surface of the partition wall 23. The diaphragm portion 25A and the insulating material layer 25B are integrally formed via a first stud portion 25C (support leg or long beam, similarly applied to below) and a second stud portion 25D corresponding to extending portions of the diaphragm portion 25A and the insulating material layer 25B. The void 50 is located below the diaphragm portion 25A, the first stud portion 25C, and the second stud portion 25D.

One end of the temperature detection element 15 (the pn junction diode 30 located at one end of the plurality of pn junction diodes 30) is connected to the signal line 71 provided on the insulating material layer 25B formed on the partition wall 23 via the wire 31 formed on the diaphragm portion 25A and the second stud portion 25D. Furthermore, the other end of the temperature detection element 15 (the pn junction diode 30 located at the other end in the plurality of pn junction diodes 30) is connected to the drive line 72 formed above the partition wall 23 via the wire 31 formed on the diaphragm portion 25A and the first stud portion 25C and via a contact hole 73. The diaphragm portion 25A, the first stud portion 25C, the second stud portion 25D, the pn junction diode 30, the wire 31, the signal line 71, and the drive line 72 are covered with the insulating film 26 containing $SiO_2$.

The temperature detection element 15 (specifically, the pn junction diode 30) can be formed by ion-implanting n-type impurities and p-type impurities into the silicon layer, for example. The number of temperature detection elements 15 is, for example, 640×480 (VGA). The first direction and the second direction are orthogonal to each other. The first substrate 21 entirely or partly includes an SOI substrate, and the second structure 40 includes the second substrate 41 including a silicon semiconductor substrate. The wire 31, the signal line 71, the drive line 72, and the contact hole 73 include, for example, an aluminum alloy.

The infrared absorption layer 61 including an aluminum thin film is formed on the side (the second surface 21B of the first substrate 21) of the temperature detection element 15, where the infrared ray enters, and the infrared reflective layer 62 including a copper thin film is formed in the region of the covering layer 43, the region being located at the bottom portion of the void 50. In the illustrated example, the infrared reflective layer 62 is formed on a part of a portion of the covering layer 43, the portion being located at the bottom portion of the void 50. Furthermore, the infrared absorption layer 61 is formed above the temperature detection element 15. Specifically, the infrared absorption layer 61 partly in contact with the insulating film 26 and partly spaced (partly provided with a space) from the insulating film 26 is formed on the insulating film 26. The infrared reflective layer 62 is formed on the top surface of the covering layer 43. Then, the optical distance $L_0$ between the infrared absorption layer 61 and the infrared reflective layer 62 satisfies $$0.75 \times \lambda_{IR}/2 \leq L_0 \leq 1.25 \times \lambda_{IR}/2$$

or $$0.75 \times \lambda_{IR}/4 \leq L_0 \leq 1.25 \times \lambda_{IR}/4$$

where a wavelength of an infrared ray to be absorbed by the infrared absorption layer 61 is $\lambda_{IR}$. In Example 5, specifically, $$L_0 = \lambda_{IR}/4$$

is satisfied. The value of $\lambda_{IR}$ is 8 μm to 14 μm. In Example 5, $\lambda_{IR}$=10 μm has been adopted although not specifically limited. The wing-shaped infrared absorption layer 61 may be partly connected between adjacent temperature detection elements 15.

Each drive line 72 is connected to the vertical scanning circuit 81. Then, in the operation of the imaging device, one drive line 72 is selected under the control of the vertical scanning circuit 81. Meanwhile, a constant current flows to all the signal lines 71 from a constant current circuit 82. The selected temperature detection element 15 changes in temperature depending on the incident infrared ray, and this temperature change causes a change in electric resistance value of the temperature detection element 15 (specifically, the pn junction diode 30). As a result, a voltage appearing on each signal line 71 changes. Each signal line 71 is connected to the horizontal scanning circuit 86 via the analog front end (AFE) 83 and the analog-digital conversion circuit (ADC) 85, and the voltage in each signal line 71 is input to one input unit of the differential integration circuit constituting the analog front end (AFE) 83. Meanwhile, a reference voltage (reference voltage) is input to the other input unit of the differential integration circuit. The differential integration circuit amplifies the output of the temperature detection element 15. Then, after a predetermined time has elapsed, an integration value of the difference of the voltage is sent from the differential integration circuit to the sample and hold circuit 84, an analog value held in the sample and hold circuit 84 is output to the analog-digital conversion circuit (ADC) 85, the integration value of the difference of the voltage is converted into a digital value in the analog-digital conversion circuit 85 and is sent to the horizontal scanning circuit 86. Then, the digital value is sequentially output to a signal processing circuit for each temperature detection element, and is finally output as a digital output, by activation of the horizontal scanning circuit 86.

Note that, as described in Example 1 to Example 4, since the capacitance $C_1$ of the first connection hole 100' is made larger than the capacitance $C_2$ of the second connection hole 110', the noise of the output signal (the signal input to one input unit of the differential integration circuit constituting the analog front end 83) output from the temperature detection element 15 to the drive circuit can be reduced. As a result, the output signal from the temperature detection element 15 can be more largely amplified in the drive circuit, and an imaging device having higher sensitivity can be provided.

Hereinafter, a method of manufacturing the imaging device according to Example 5, in particular, an outline of a method of manufacturing the first structure 20 will be described with reference to FIGS. 42A, 42B, 42C, 42D, 43A, 43B, 43C, 44A, 44B, 45A, and 45B, which are schematic partial end views of an SOI substrate and the like.

[Process-500]

An SOI substrate 90 having a first silicon layer 91 formed on a surface and an $SiO_2$ layer 92 formed below the first silicon layer 91 is prepared. The portion of the silicon semiconductor substrate that constitutes the SOI substrate 90 located below the $SiO_2$ layer 92 is referred to as "second silicon layer 93" for convenience. Then, first, a portion of the second silicon layer 93 of the SOI substrate 90, where the sidewall 24 of the partition wall 23 is to be formed, is etched to form a groove, and the groove is embedded with the material constituting the sidewall 24 (see FIG. 42A). Thereafter, the first silicon layer 91 on the surface of the SOI substrate 90 is patterned to leave a region of the first silicon layer 91, where the pn junction diode 30 is to be formed. Next, the pn junction diode 30 is formed on the first silicon layer 91 on the basis of a known method (see FIG. 42B).

[Process-510]

Figure 42A:
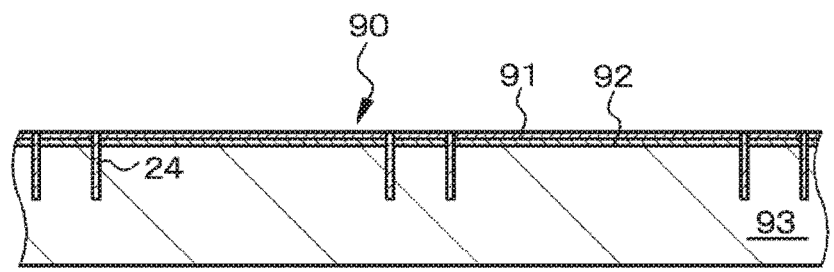
FIGS. 42A, 42B, 42C, and 42D are schematic partial end views of an SOI substrate and the like for describing a method of manufacturing the imaging device according to Example 5.
Figure 42B:
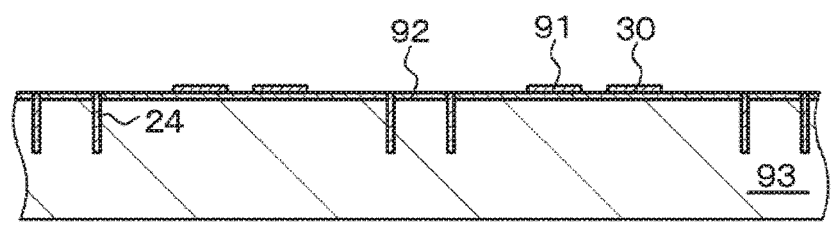
Figure 42C:
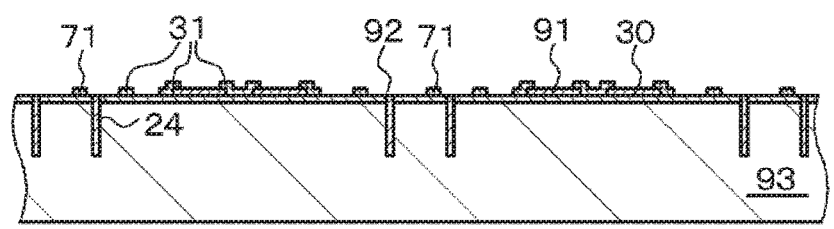
Figure 42D:
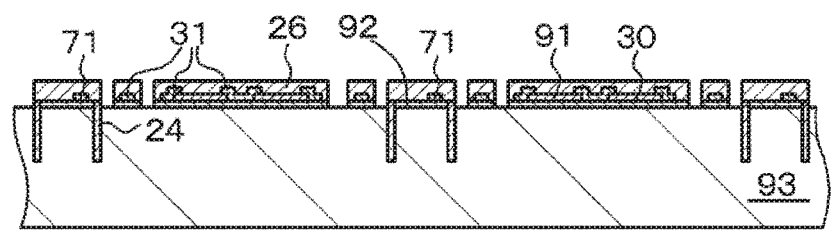

Thereafter, the wire 31 and the signal line 71 are formed on the $SiO_2$ layer 92 and a part of the pn junction diode 30 on the basis of a known method (see FIG. 42C). Next, the insulating film 26 containing $SiO_2$, the contact hole 73, and the drive line 72 are formed on the entire surface, and then the insulating film 26 is patterned (see FIG. 42D). Note that the contact hole 73 and the drive line 72 are not illustrated in FIG. 42D and the subsequent drawings.

[Process-520]

Then, after formation of a first sacrificial layer 94 (see FIG. 43A), formation of the infrared absorption layer 61, and formation of a second sacrificial layer 95 (see FIG.

Figure 43A:
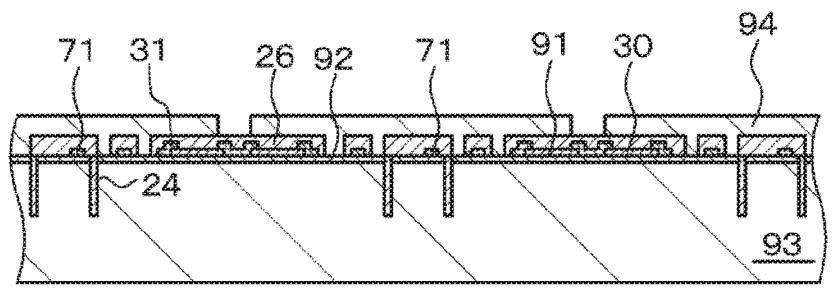
FIGS. 43A, 43B, and 43C are schematic partial end views of an SOI substrate and the like for describing a method of manufacturing the imaging device according to Example 5, following FIG. 42D.
Figure 43B:
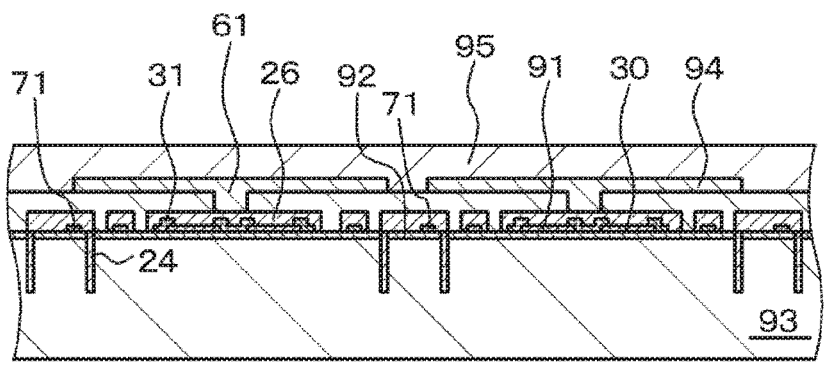
Figure 43C:
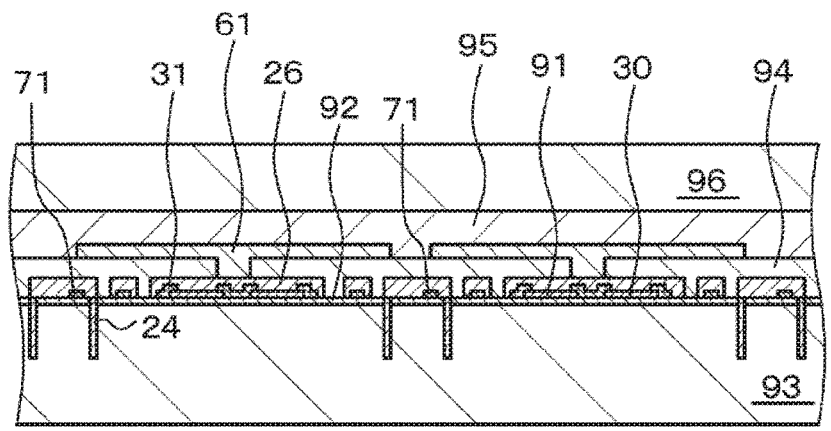

43B), a support substrate 96 is attached to the second sacrificial layer 95 (see FIG. 43C).

[Process-530]

Figure 44A:
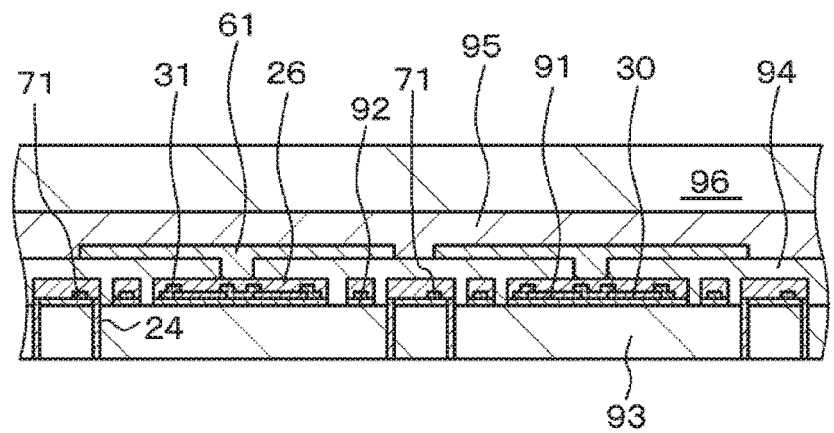
FIGS. 44A and 44B are schematic partial end views of an SOI substrate and the like for describing a method of manufacturing the imaging device according to Example 5, following FIG. 43C.
Figure 44B:
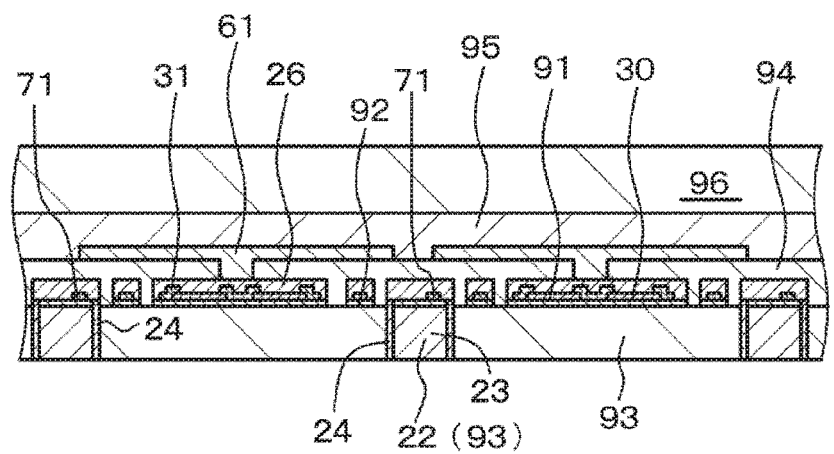

Next, the second silicon layer 93 of the SOI substrate 90 is thinned by the CMP method (see FIG. 44A). $L_0$ is defined by the thickness of the second silicon layer 93. Therefore, the value of $L_0$ can be accurately defined. Thus, the structure illustrated in FIG. 44B can be obtained. The second silicon layer 93 in an inner portion of the sidewall 24 corresponds to the partition wall 23, and the hatched portion is differentiated from the hatched second silicon layer 93 for convenience.

[Process-540]

The second structure 40 provided with the drive circuit is prepared. Note that the infrared reflective layer 62 is formed on the covering layer 43. Then, the second silicon layer 93 and the covering layer 43 are bonded by a known method (see FIG. 45A). Then, in the peripheral regions 12 and 14, the drive line 72 and the signal line 71, and the drive circuit are electrically connected by the signal line connection portion 100 and the drive line connection portion 110.

[Process-550]

Figure 45A:
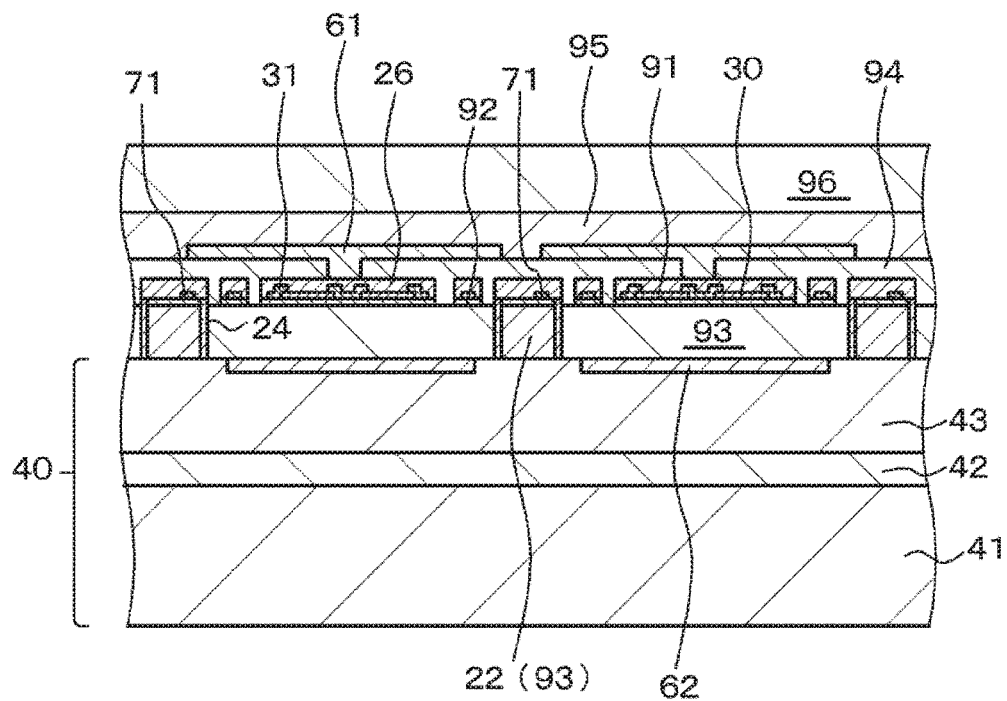
FIGS. 45A and 45B are schematic partial end views of an SOI substrate and the like for describing a method of manufacturing the imaging device according to Example 5, following FIG. 44B.
Figure 45B:
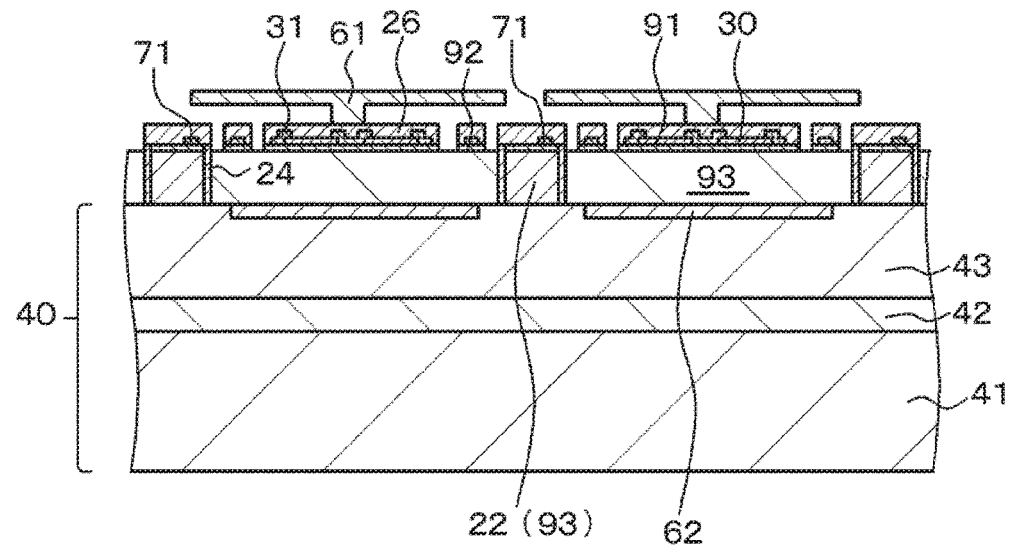
Figure 46A:
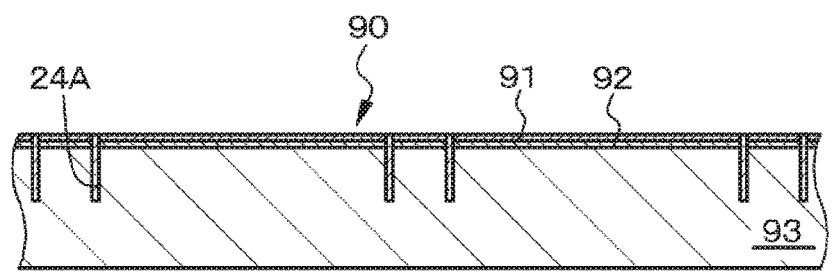
FIGS. 46A, 46B, and 46C are schematic partial end views of an SOI substrate and the like for describing a method of manufacturing the imaging device according to Example 6.
Figure 46B:
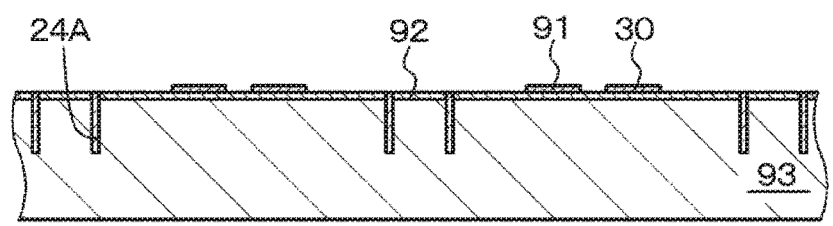
Figure 46C:
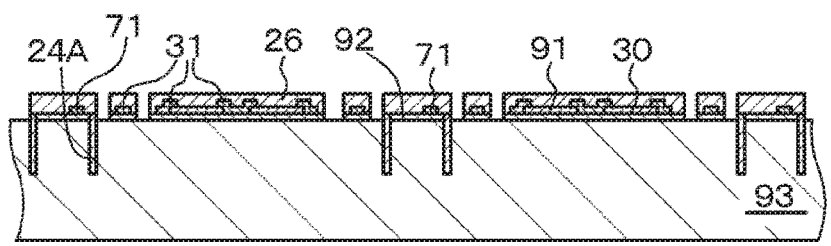
Figure 47A:
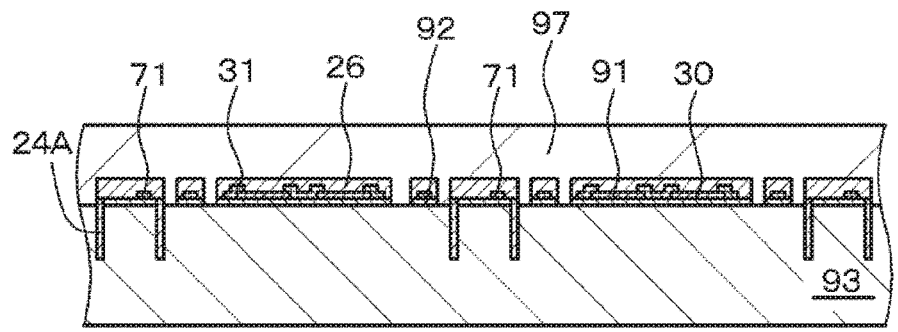
FIGS. 47A, 47B, 47C, and 47D are schematic partial end views of an SOI substrate and the like for describing a method of manufacturing the imaging device according to Example 6, following FIG. 46C.
Figure 47B:
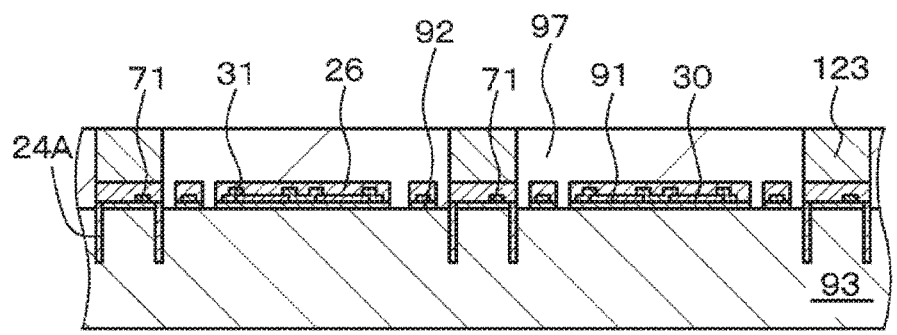
Figure 47C:
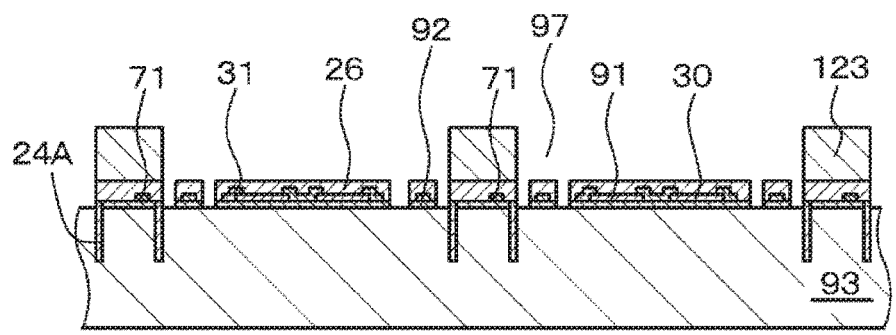
Figure 47D:
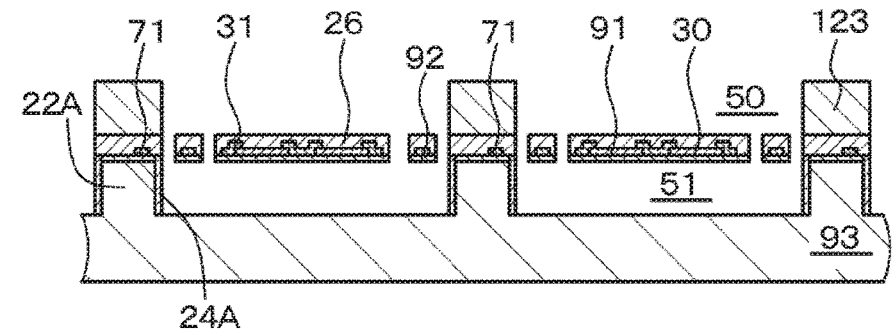

Thereafter, the support substrate 96 is removed, and the second sacrificial layer 95 and the first sacrificial layer 94 are removed on the basis of an etching method (see FIG. 45B). Furthermore, the second silicon layer 93 located below the pn junction diode 30 is removed on the basis of an etching method. In this way, the imaging device 10 illustrated in FIG. 1 can be obtained. The $SiO_2$ layer 92 constitutes the diaphragm portion 25A, the insulating material layer 25B, the first stud portion 25C, and the second stud portion 25D. Note that the second silicon layer 93 located below the pn junction diode 30 may not be completely removed.

Thereafter, the obtained imaging device 10 is packaged in a vacuum atmosphere. As a result, the space in which the temperature detection element 15 is arranged is depressurized or evacuated. The void 50 is also depressurized or evacuated.

In the imaging device according to Example 5, the first substrate is bonded with the covering layer formed on the second substrate, and the silicon layer located below the temperature detection element is surrounded by the covering layer and the sidewall of the partition wall that are less easily etched than the silicon layer. Therefore, the void can be reliably provided with high accuracy between the temperature detection element and the covering layer. As a result, the infrared ray having a desired wavelength can be reliably absorbed with high efficiency by the infrared absorption layer, and the detection sensitivity in the temperature detection element can be improved. Furthermore, since the second structure provided with any known drive circuit and signal processing circuit can be combined, the manufacturing cost of the imaging device can be reduced, the degree of design freedom can be increased, and design time can be shortened. In addition, the number of input/output pins and input/output signal bandwidth can be reduced.

Figure 17A:
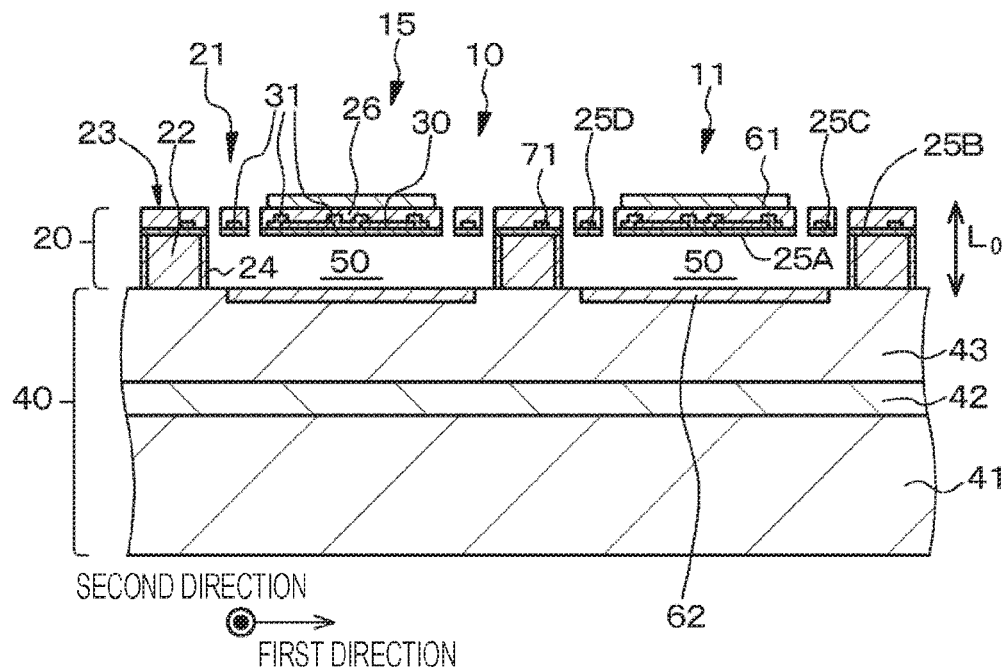
FIGS. 17A and 17B are schematic partial end views of a modification of an imaging device according to Example 5.
Figure 17B:
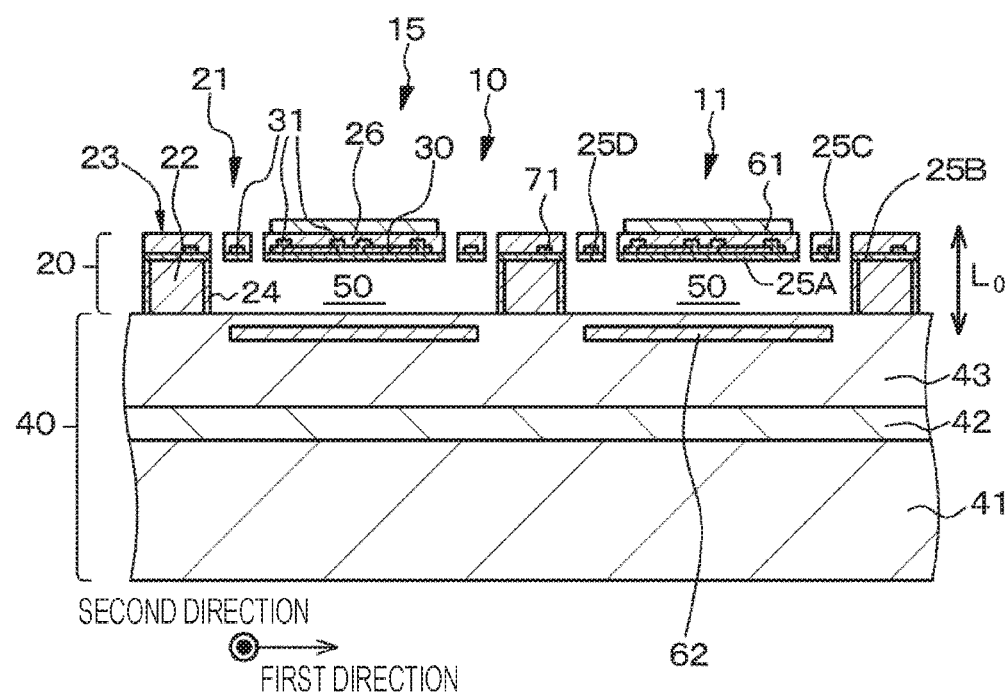

A modification of the imaging device according to Example 5 illustrated in FIG. 1 is illustrated in FIGS. 17A and 17B. In the modification of the imaging device according to Example 5 illustrated in FIG. 17A, the infrared absorption layer 61 is formed on the insulating film 26. In the modification of the imaging device according to Example 5 illustrated in FIG. 17B, the infrared reflective layer 62 is formed inside the covering layer 43. In FIG. 17B, the infrared absorption layer 61 has the structure illustrated in FIG. 17A. However, the infrared absorption layer 61 can have the structure illustrated in FIG. 1. Furthermore, the infrared absorption layer 61 may be formed inside the insulating film 26, or the infrared reflective layer 62 may be formed on a top surface of the covering layer 43.

Example 6

Figure 18A:
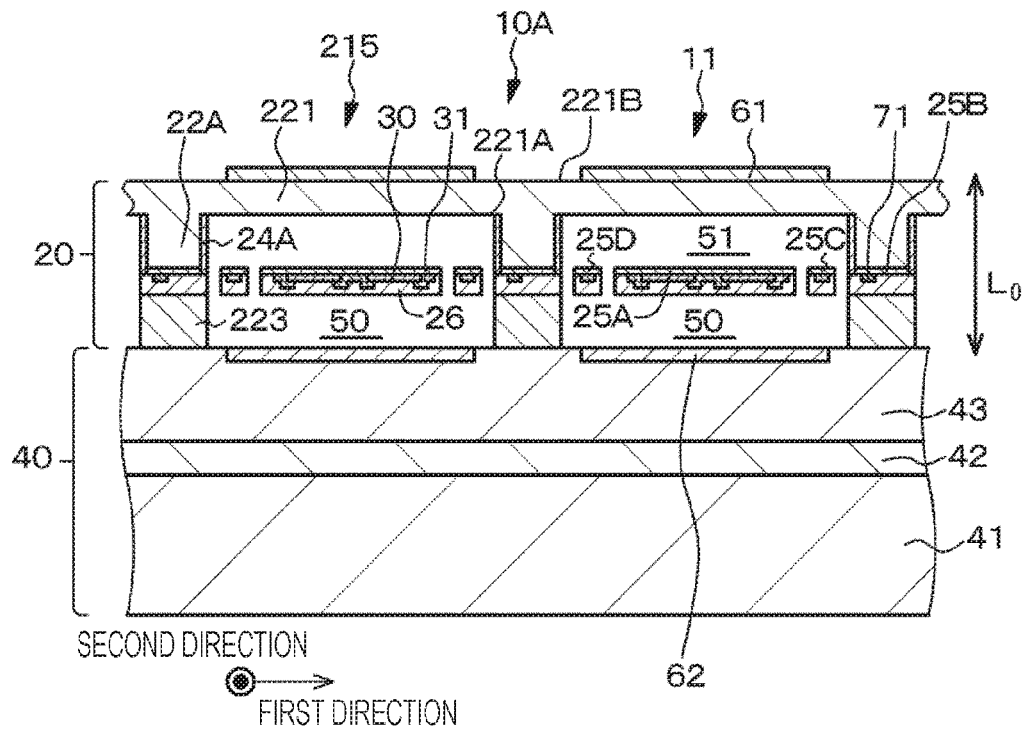
FIGS. 18A and 18B are schematic partial end views of an imaging device according to Example 6 and its modification.

Example 6 is a modification of Example 1 to Example 5, and relates to an imaging device having a face to face structure. FIG. 18A illustrates a schematic partial end view of the imaging device according to Example 6.

In an imaging device 10A according to Example 6, a partition wall 223 is formed between a portion of a first substrate 221 and the covering layer 43 located between the temperature detection element 215 and the temperature detection element 215, independently of the first substrate 221, and a bottom portion of the partition wall 223 is bonded with the covering layer 43. The exposed surface of the covering layer 43, the exposed surface being exposed to the void 50, includes at least one type of material layer selected from a group including an insulating material layer, a metal material layer, an alloy material layer, and a carbon material layer. Specifically, in the imaging device 10A according to Example 6, the exposed surface of the covering layer 43, the exposed surface being exposed to the void 50, contains $SiO_2$. Furthermore, the partition wall 223 includes at least one type of material layer selected from a group including an insulating material layer, a metal material layer, an alloy material layer, and a carbon material layer. Specifically, the partition wall 223 contains $SiO_2$. Reference numeral 22A indicates a protrusion extending from a silicon layer to be described below, and reference numeral 24A indicates a sidewall of a protrusion 22A.

The infrared absorption layer 61 is formed on a side of the temperature detection element 215, where an infrared ray enters, and the infrared reflective layer 62 is formed in a region of the covering layer 43, the region being located at a bottom portion of the void 50. The infrared reflective layer 62 is formed on a top surface of the covering layer 43 or inside the covering layer 43. Furthermore, the infrared reflective layer 62 may be formed in a portion of the covering layer 43, the portion being located at the bottom portion of the void 50, may be formed in a part of the portion of the covering layer 43, the portion being located at the bottom portion of the void 50, or may be formed to protrude from the portion of the covering layer 43, the portion being located at the bottom portion of the void 50. Specifically, the infrared reflective layer 62 has a similar configuration and structure as in Example 5. The infrared absorption layer 61 may be provided on a first surface side of the first substrate 221 or may be provided on a second surface side of the first substrate 221. In Example 6 illustrated in FIG. 18A, specifically, the infrared absorption layer 61 is provided on the second surface side of the first substrate 221 (on a second surface 221B of the first substrate 221). Even in Example 6, the optical distance $L_0$ between the infrared absorption layer 61 and the infrared reflective layer 62 satisfies $$0.75 \times \lambda_{IR}/2 \leq L_0 \leq 1.25 \times \lambda_{IR}/2$$

or $$0.75 \times \lambda_{IR}/4 \leq L_0 \leq 1.25 \times \lambda_{IR}/4$$

where a wavelength of an infrared ray to be absorbed by the infrared absorption layer 61 is $\lambda_{IR}$. In some cases, the infrared absorption layer 61 may be formed on the temperature detection element 15 side facing the void 50.

Hereinafter, a method of manufacturing the imaging device according to Example 6, in particular, an outline of a method of manufacturing the first structure 20 will be described with reference to FIGS. 46A, 46B, 46C, 47A, 47B, 47C, and 47D, which are schematic partial end views of an SOI substrate and the like.

[Process-600]

First, the SOI substrate 90 is prepared as in Example 5. Then, after a recess is formed in the SOI substrate 90 from the first silicon layer side, the recess is embedded with an insulating material, for example, to form a sidewall 24A of the protrusion 22A (see FIG. 46A). Next, the first silicon layer 91 on the surface of the SOI substrate 90 is patterned to leave a region of the first silicon layer 91, where the pn junction diode 30 is to be formed. Next, the pn junction diode 30 is formed on the first silicon layer 91 on the basis of a known method (see FIG. 46B).

[Process-610]

Thereafter, the wire 31 and the signal line 71 are formed on the SiO$_2$ layer 92 and a part of the pn junction diode 30 on the basis of a known method, similarly to [Process-510] of Example 5. Next, the insulating film 26 containing SiO$_2$, the contact hole 73, and the drive line 72 are formed on the entire surface, and then the insulating film 26 is patterned (see FIG. 46C). Note that the contact hole 73 and the drive line 72 are not illustrated in FIG. 46C and the subsequent drawings.

[Process-620]

Thereafter, a sacrificial layer 97 including an insulating material is formed on the entire surface (see FIG. 47A), a portion of the sacrificial layer 97 where the partition wall 223 is to be formed is etched to form a groove, and the groove is embedded with the material constituting the partition wall 223. Thus, the partition wall 223 is obtained (see FIG. 47B). L$_0$ is defined by the thickness of the sacrificial layer 97. Therefore, the value of L$_0$ can be accurately defined. Moreover, an etching mask layer (not illustrated) is formed on a portion of the sacrificial layer 97, where the partition wall 223 is to be formed.

[Process-630]

Next, the sacrificial layer 97 is removed on the basis of an etching method (see FIG. 47C), and further, etchant is changed to remove a part of the second silicon layer 93 on the basis of the etching method (see FIG. 47D), to provide a cavity 51 between the diaphragm portion 25A and the second silicon layer. Thereafter, the etching mask layer formed on the partition wall 223 is removed. Note that the cross-sectional shape of the cavity 51 is not limited to the illustrated shape.

[Process-640]

The second structure 40 provided with the drive circuit is prepared. Note that the infrared reflective layer 62 is formed on the covering layer 43. Then, the partition wall 223 and the covering layer 43 are bonded together in a vacuum atmosphere by a known method. Next, in the peripheral regions 12 and 14, the drive line 72 and the signal line 71, and the drive circuit are electrically connected by the signal line connection portion 100 and the drive line connection portion 110. In this way, the imaging device 10A illustrated in FIG. 18A can be obtained. Thereafter, the obtained imaging device 10 is packaged.

Figure 18B:
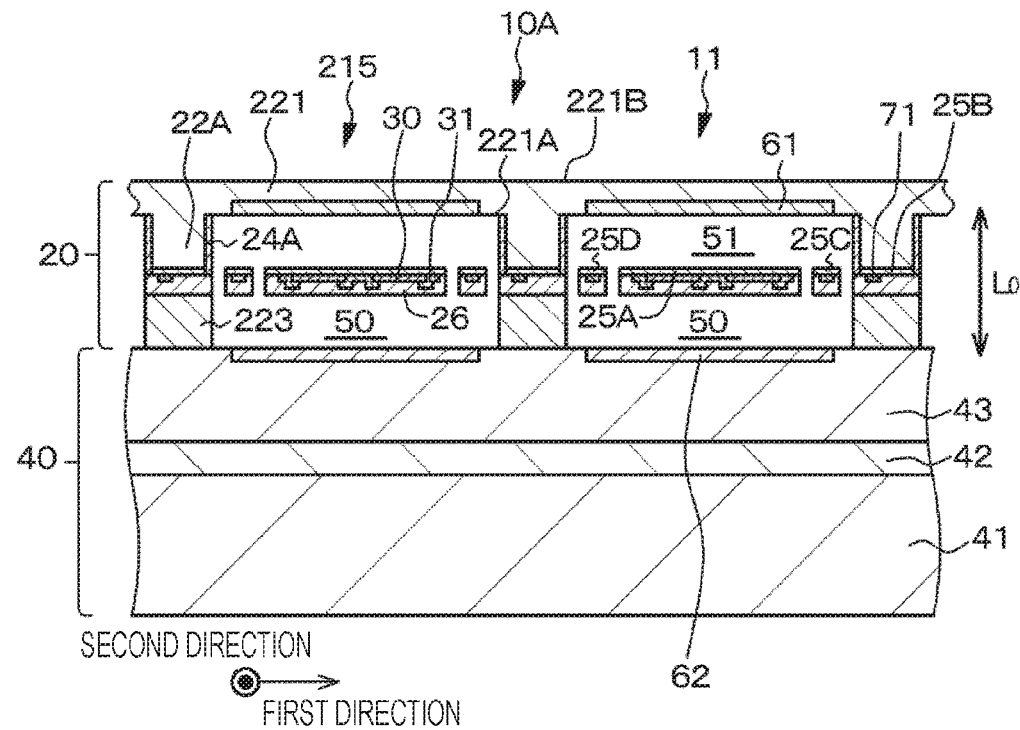
Figure 19A:
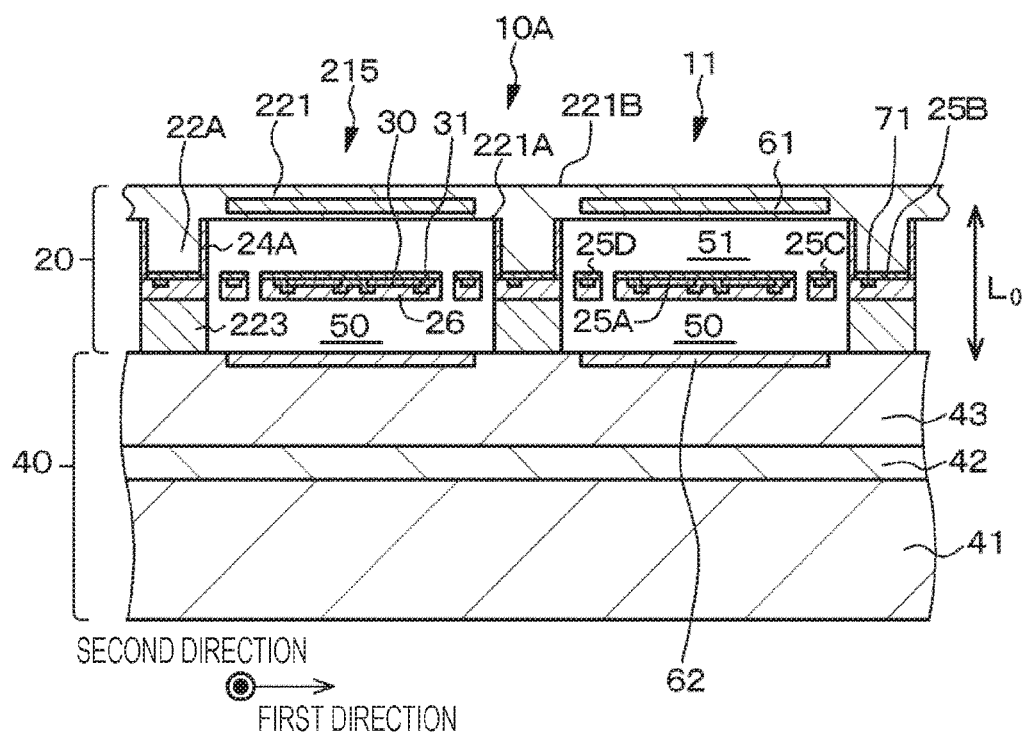
FIGS. 19A and 19B are schematic partial end views of another modification of the imaging device according to Example 6.
Figure 19B:
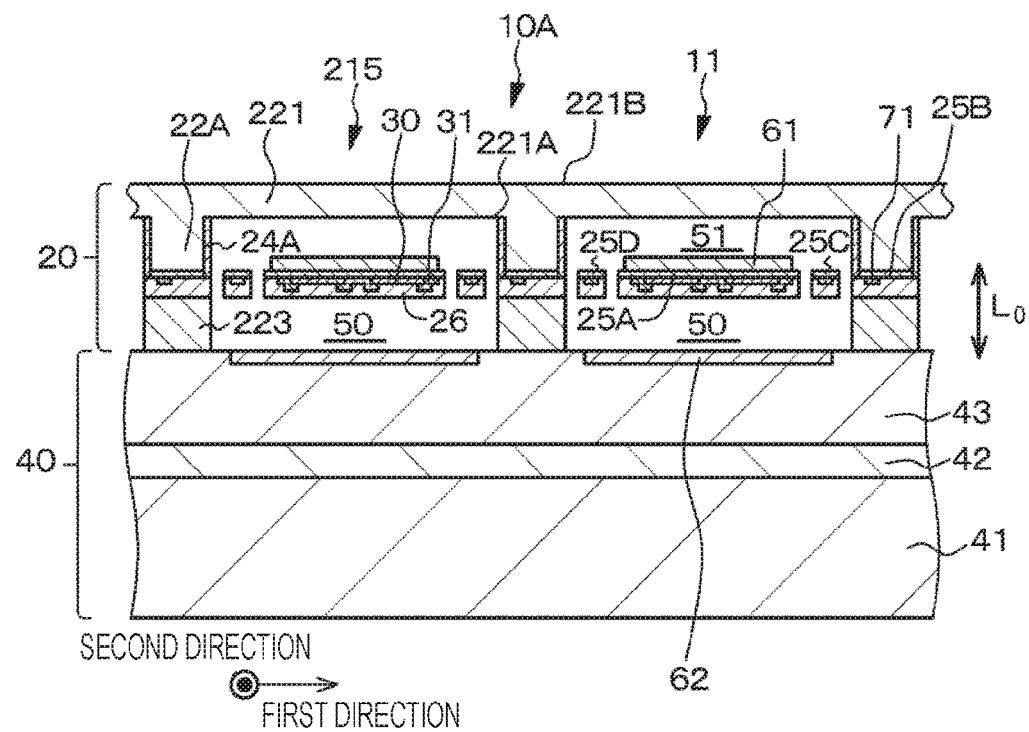

As FIG. 18B illustrates a schematic partial end view, the infrared absorption layer 61 may be provided on a first surface 221A of the first substrate 221. Alternatively, as FIG. 19A illustrates a schematic partial end view, the infrared absorption layer 61 may be provided inside the first substrate 221. Alternatively, as FIG. 19B illustrates a schematic partial end view, the infrared absorption layer 61 may be provided on the infrared ray incident side of the diaphragm portion 25A.

Figure 20:
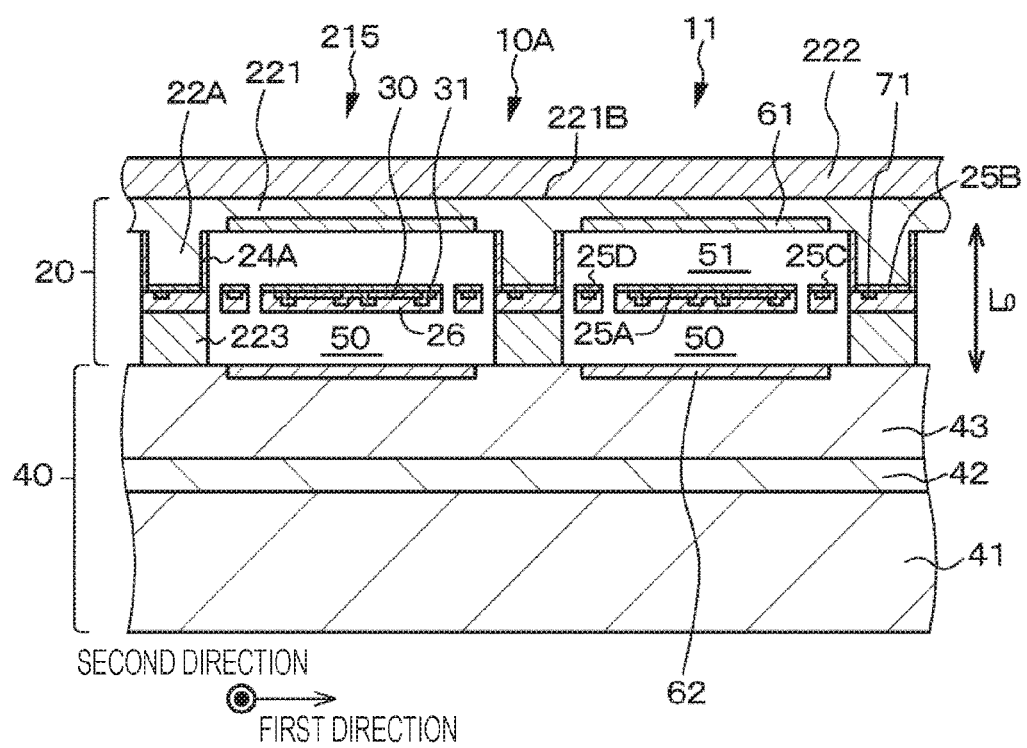
FIG. 20 is a schematic partial end view of still another modification of the imaging device according to Example 6.

Furthermore, as FIG. 20 illustrates a schematic partial end view, in the imaging device according to Example 6, a protective substrate 222 including a silicon semiconductor substrate may be attached (pasted) to the surface of the first substrate 221, where the infrared ray enters (the second surface 221B of the first substrate 221).

Example 7

Figure 21A:
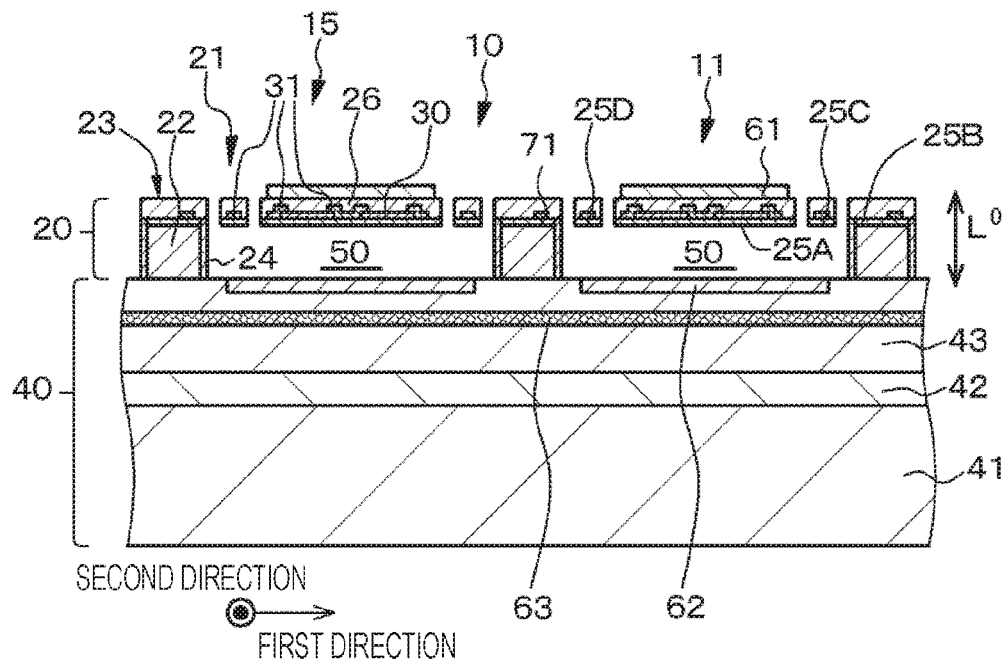
FIGS. 21A and 21B are schematic partial end views of an imaging device according to Example 7 and its modification.
Figure 21B:
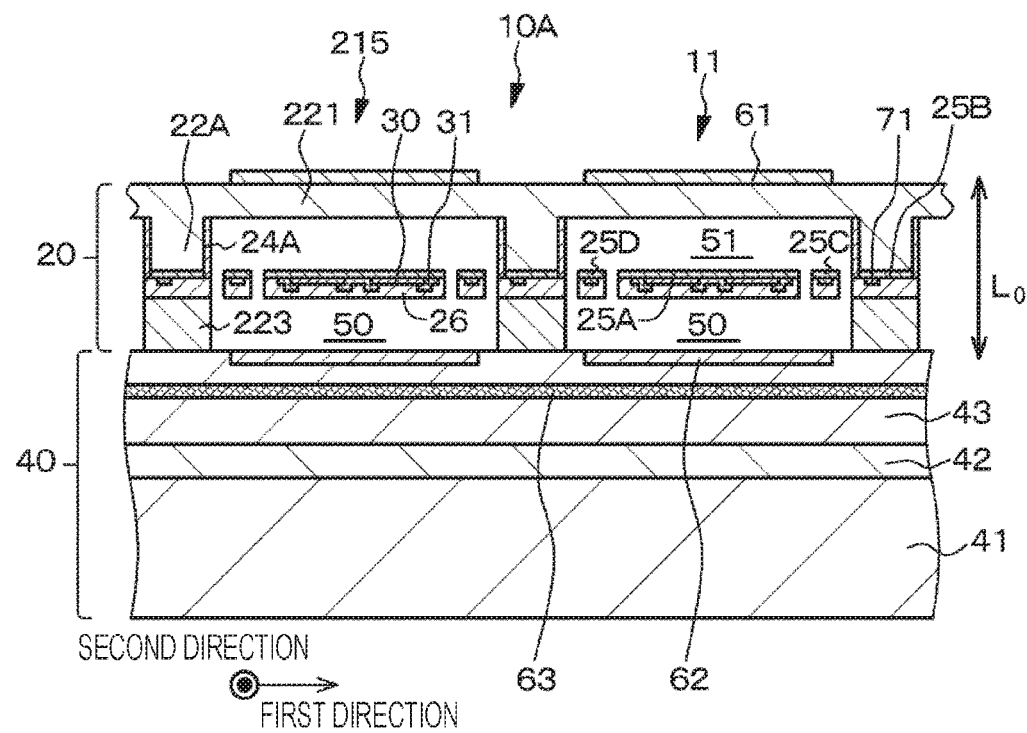

Example 7 is a modification of Example 1 to Example 6. In Example 7, as FIG. 21A (a modification of Example 5) and FIG. 21B (a modification of Example 6) illustrate schematic partial end views, a heat conductive layer (heat uniformizing layer) 63 including a metal material, a carbon-based material such as a carbon film or a carbon nanotube, or an organic-based material is formed in the covering layer 43. Specifically, the heat conductive layer 63 is disposed inside the covering layer 43 and below the infrared reflective layer 62. By the formation of the heat conductive layer 63, the temperature can be made more uniform, and temperature distribution can be made more uniform. In some cases, the heat conductive layer (heat uniformizing layer) 63 can include a vacuum layer. Furthermore, the configuration of the heat conductive layer (heat uniformizing layer) 63 can be changed depending on the region of the temperature detection element array region 11.

Since the configuration and structure of the imaging device according to Example 7 can be similar to the configuration and structure of the imaging device according any one of Examples 1 to 6 except for the above points, detailed description is omitted. Note that the heat conductive layer (heat uniformizing layer) can be applied to an imaging device (for example, an imaging device that performs imaging on the basis of visible light) other than the imaging devices of Example 1 to Example 6.

Example 8

Figure 22A:
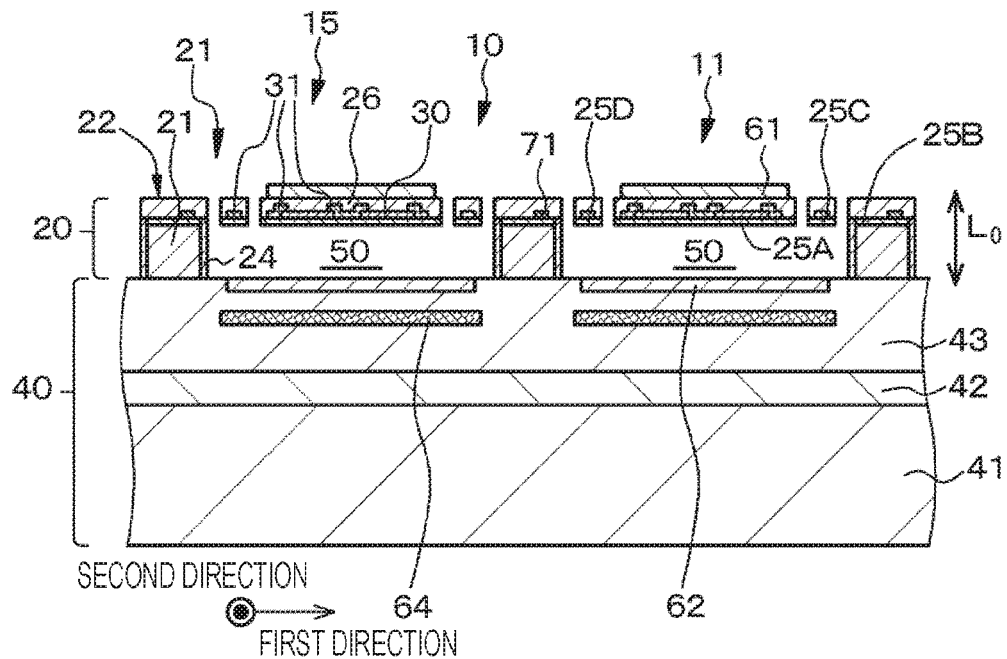
FIGS. 22A and 22B are schematic partial end views of an imaging device according to Example 8 and its modification.
Figure 22B:
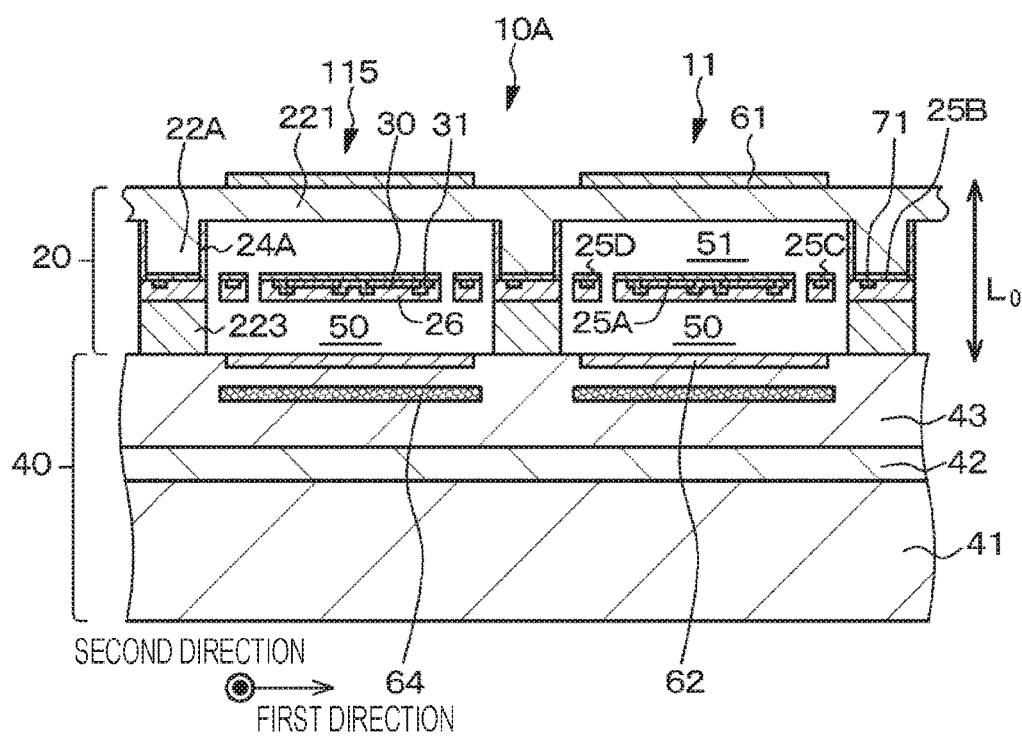

Example 8 is a modification of Example 1 to Example 7. As FIG. 22A (a modification of Example 5) and FIG. 22B (a modification of Example 6) illustrate schematic partial end views, in Example 8, a temperature control layer 64 containing tungsten (W) is formed in the covering layer 43 (specifically, inside the covering layer 43), and a temperature detection means (not illustrated) including a silicon diode is provided in the covering layer 43. The temperature control layer 64 functions as a heater (resistor or resistance member). Note that the temperature control layer can serve as a wire. Then, the drive circuit controls the temperature control layer 64 on the basis of a temperature detection result of the temperature detection means. Specifically, for example, the amount of heat generated by the temperature control layer 64 is controlled by controlling the current flowing through the temperature control layer 64. Note that illustration of a wire connecting the temperature control layer 64 and the drive circuit to control the temperature control layer 64 is omitted.

That is, the drive circuit (specifically, CPU or DSP) that has received a temperature detection result of the temperature detection means obtains temperature distribution of the covering layer 43 on the basis of the received temperature detection result. Then, the drive circuit calculates a required amount of heat and individually controls a value of a current to flow through the temperature control layer 64, thereby making the temperature and temperature distribution of the covering layer 43 uniform (suppressing in-plane temperature variation), and furthermore suppressing the temperature and temperature distribution of the first substrate 21 or 221 uniform, and the temperature and temperature distribution of the temperature detection element 15 uniform. Therefore, for example, even in a case where the amount of current in an analog logic block changes and the amount of heat generated in the analog logic block changes, temperature control can be easily performed. In a case of deviating the temperature control range by the temperature control layer 64, the drive circuit controls the amount of current in the analog logic block and controls an operation clock in the analog logic block, thereby making the temperature and temperature distribution uniform. Note that the drive circuit can control the amount of current in the analog logic block and controls an operation clock in the analog logic block, thereby making the temperature and temperature distribution uniform, without including the temperature control layer 64. By setting the temperature controlled by the temperature control layer 64 to be higher than room temperature, for example, the temperature control layer 64 performs a kind of ON/OFF operation, and power consumption of the temperature control layer 64 can be reduced. Furthermore, by combining the temperature control layer 64 with the heat conductive layer 63 described in Example 7, the temperature and temperature distribution can be further made uniform. In this case, the heat conductive layer 63 is favorably disposed above the temperature control layer 64. In some cases, the temperature control layer 64 may also serve as the infrared reflective layer 62.

Figure 23:
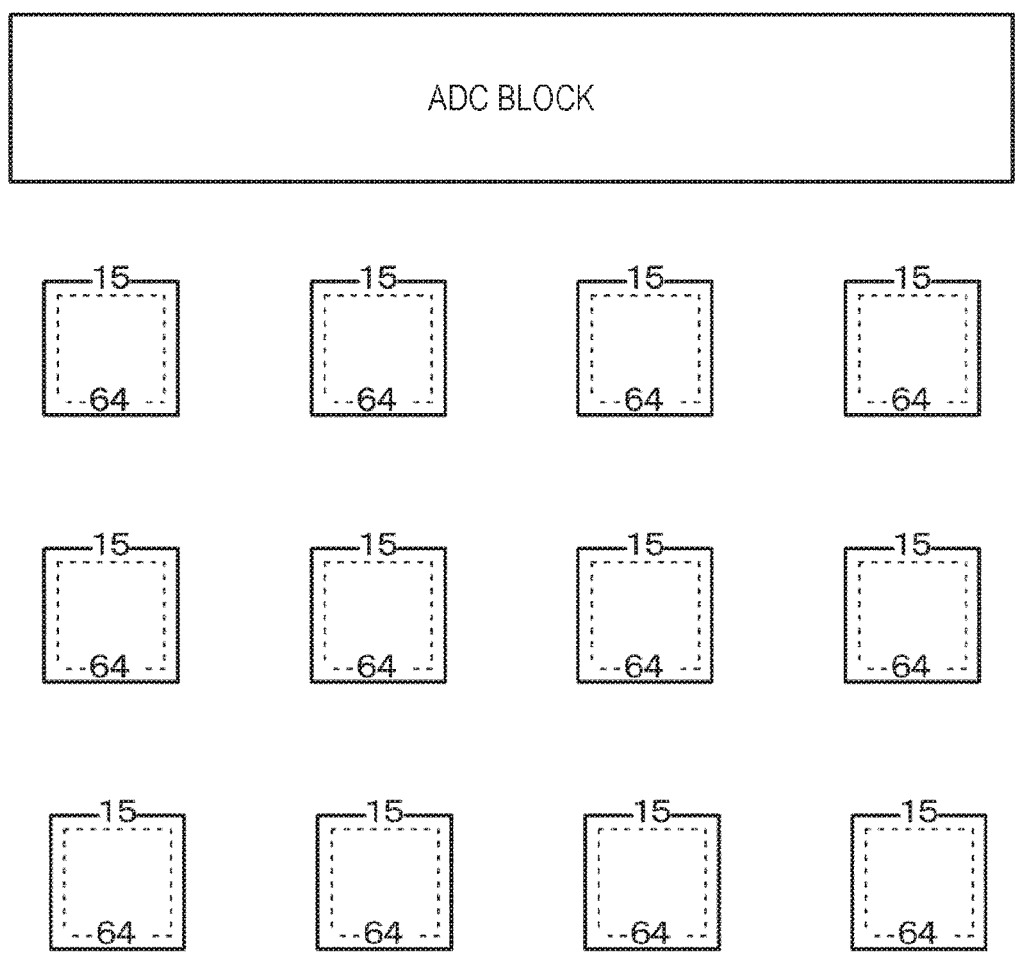
FIG. 23 is a diagram schematically illustrating an arrangement state of temperature detection elements and a temperature control layer in the imaging device according to Example 8.
Figure 24:
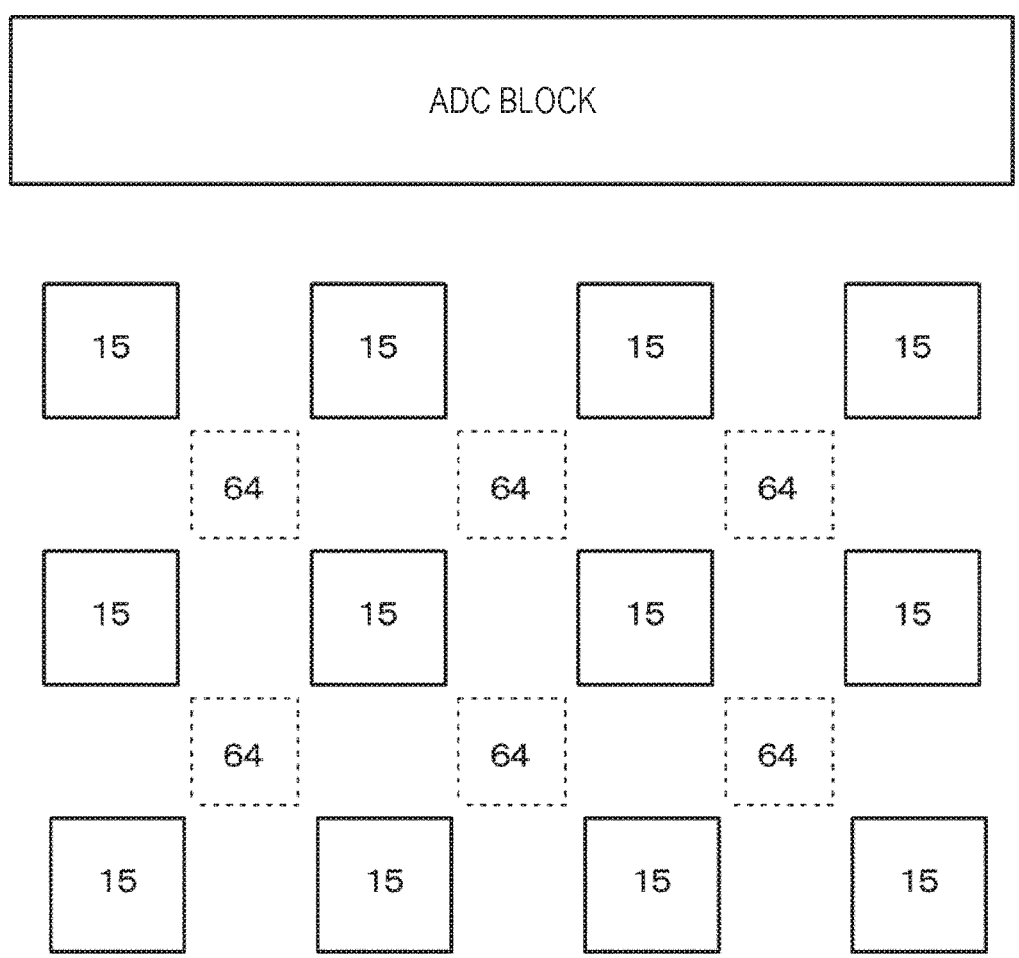
FIG. 24 is a diagram schematically illustrating an arrangement state of temperature detection elements and a temperature control layer in another modification of the imaging device according to Example 8.

Arrangement states of the temperature detection element 15 and the temperature control layer 64 are schematically illustrated in FIGS. 23 and 24. An orthogonal projection image of the temperature detection element 15 may overlap an orthogonal projection image of the temperature control layer 64 (see FIG. 23), or an orthogonal projection image of the temperature control layer 64 may be located between an orthogonal projection image of the temperature detection element 15 and an orthogonal projection image of the temperature detection element 15 (see FIG. 24). The area, arrangement position, and arrangement density of the temperature control layer 64 are only required to be set to make the temperature and temperature distribution uniform. Note that, since the temperature control layer 64 is located below the temperature detection element 15, FIGS. 23 and 24 illustrate the temperature control layer 64 as a dotted line.

Here, the first structure 20 favorably includes the temperature detection element array region 11 provided with a plurality of temperature detection elements 15 and the peripheral region 12 surrounding the temperature detection element array region 11, and the temperature control layer 64 is favorably formed in the temperature detection element array region 11. Alternatively, the temperature control layer 64 is favorably formed in a region of the covering layer 43, where an orthogonal projection image of the temperature detection element array region exists. Alternatively, the drive circuit favorably includes the analog-digital conversion circuit (ADC), and the analog-digital conversion circuit is favorably not disposed in a region of the drive circuit, where an orthogonal projection image of the temperature detection element array region exists.

Since the configuration and structure of the imaging device according to Example 8 can be similar to the configuration and structure of the imaging device according any one of Examples 1 to 7 except for the above points, detailed description is omitted. Note that the temperature control layer can be applied to an imaging device (for example, an imaging device that performs imaging on the basis of visible light) other than the imaging devices of Example 1 to Example 7.

Example 9

Example 9 relates to the imaging device having the second configuration and the imaging device having the third configuration of the present disclosure.

Figure 27:
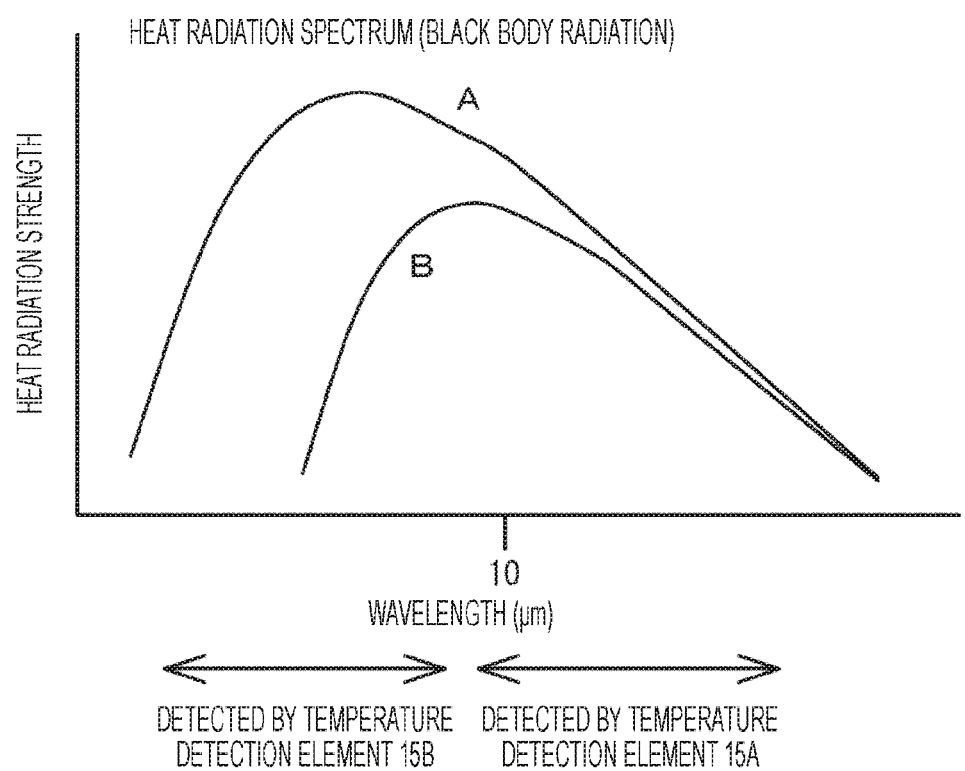
FIG. 27 is a graph schematically illustrating a relationship between a radiation spectrum from an object and an infrared wavelength.

A radiation spectrum from an object at a temperature around the room temperature has a peak around a wavelength of 10 μm (see the radiation spectrum "B" in FIG. 27). Note that the radiation spectrum "A" in FIG. 27 indicates a radiation spectrum from an object at a temperature higher than the room temperature. Then, for example, by combining a temperature detection element having a sensitivity wavelength shorter than the peak wavelength and a temperature detection element having a sensitivity wavelength longer than the peak wavelength in the same pixel, the temperature of the object can be measured with high accuracy from a ratio of signal intensities from the two temperature detection elements.

In the imaging device according to Example 9,
a temperature detection element unit configured to detect a temperature on the basis of an infrared ray is provided,
the temperature detection element unit includes a plurality of temperature detection elements 15A and 15B arranged in parallel, and
wavelengths of the infrared ray detected by the temperature detection elements 15A and 15B are different in the temperature detection element unit. Note that, in Example 9, a plurality of temperature detection element units is arrayed in the first direction and the second direction different from the first direction (specifically, in a two-dimensional matrix manner).

Then, in the imaging device according to Example 9,
the temperature detection elements 15A and 15B include infrared absorption layers 61, 61A, and 61B on the infrared ray incident side and infrared reflective layers 62, 62A, and 62B on the opposite side of the infrared ray incident side,
optical distances $L_0$ and $L_0'$ between the infrared absorption layers 61, 61A, and 61B and the infrared reflective layers 62, 62A, and 62B in the temperature detection elements 15A and 15B are different in the temperature detection element unit, and
the optical distances $L_0$ and $L_0'$ in the temperature detection elements 15A and 15B satisfy $$0.75 \times \lambda_{IR-A}/2 \leq L_0 \leq 1.25 \times \lambda_{IR-A}/2$$

or $$0.75 \times \lambda_{IR-A}/4 \leq L_0 \leq 1.25 \times \lambda_{IR-A}/4, \text{ and satisfy}$$

$$0.75 \times \lambda_{IR-B}/2 \leq L_0' \leq 1.25 \times \lambda_{IR-B}/2$$

or $$0.75 \times \lambda_{IR-B}/4 \leq L_0' \leq 1.25 \times \lambda_{IR-B}/4$$

where wavelengths of an infrared ray to be absorbed by the infrared absorption layers 61, 61A, and 61B constituting the temperature detection elements 15A and 15B are $\lambda_{IR-A}$ and $\lambda_{IR-B}$. Furthermore, the temperature detection elements 15A and 15B include the infrared absorption layers 61, 61A, and 61B on the infrared ray incident side and the infrared reflective layers 62, 62A, and 62B on the opposite side of the infrared ray incident side, and materials, configurations, and structures constituting the infrared absorption layers 61, 61A, and 61B, materials, configurations, and structures constituting the infrared reflective layers 62, 62A, and 62B, or the materials, configurations, and structures constituting the infrared absorption layers 61, 61A, and 61B and the materials, configurations, and structures constituting the infrared reflective layers 62, 62A, and 62B, in the temperature detection elements 15A and 15B are different in the temperature detection element unit. That is, specifically, as described in (Case A), (Case B), and (Case C).

Alternatively, in the imaging device according to Example 9, the temperature detection element unit configured to detect a temperature on the basis of an infrared ray is provided, the temperature detection element unit includes the plurality of temperature detection elements 15A and 15B arranged in parallel, and the infrared ray absorption amounts of the temperature detection elements 15A and 15B are different in the temperature detection element unit. Note that, even in Example 9, a plurality of temperature detection element units is arrayed in the first direction and the second direction different from the first direction (specifically, in a two-dimensional matrix manner).

Then, in the imaging device according to Example 9, the temperature detection elements 15A and 15B include the infrared absorption layers 61, 61A, and 61B on the infrared ray incident side and the infrared reflective layers 62, 62A, and 62B on the opposite side of the infrared ray incident side, and materials constituting the infrared absorption layers 61, 61A, and 61B, materials constituting the infrared reflective layers 62, 62A, and 62B, or the materials constituting the infrared absorption layers 61, 61A, and 61B and the materials constituting the infrared reflective layers 62, 62A, and 62B, in the temperature detection elements 15 are different in the temperature detection element unit. Furthermore, in the imaging device according to Example 9, the temperature detection elements 15A and 15B include the infrared absorption layers 61, 61A, and 61B on the infrared ray incident side and the infrared reflective layers 62, 62A, and 62B on the opposite side of the infrared ray incident side, and the areas, thicknesses, or areas and thicknesses of the infrared absorption layers 61, 61A, and 61B, the infrared reflective layers 62, 62A, and 62B, or the infrared absorption layers 61, 61A, and 61B and the infrared reflective layers 62, 62A, and 62B, in the temperature detection elements 15 are different in the temperature detection element unit. That is, specifically, as described in (Case a), (Case b), (Case c), (Case d), (Case e), (Case f), (Case g), (Case h), and (Case h).

Figure 25A:
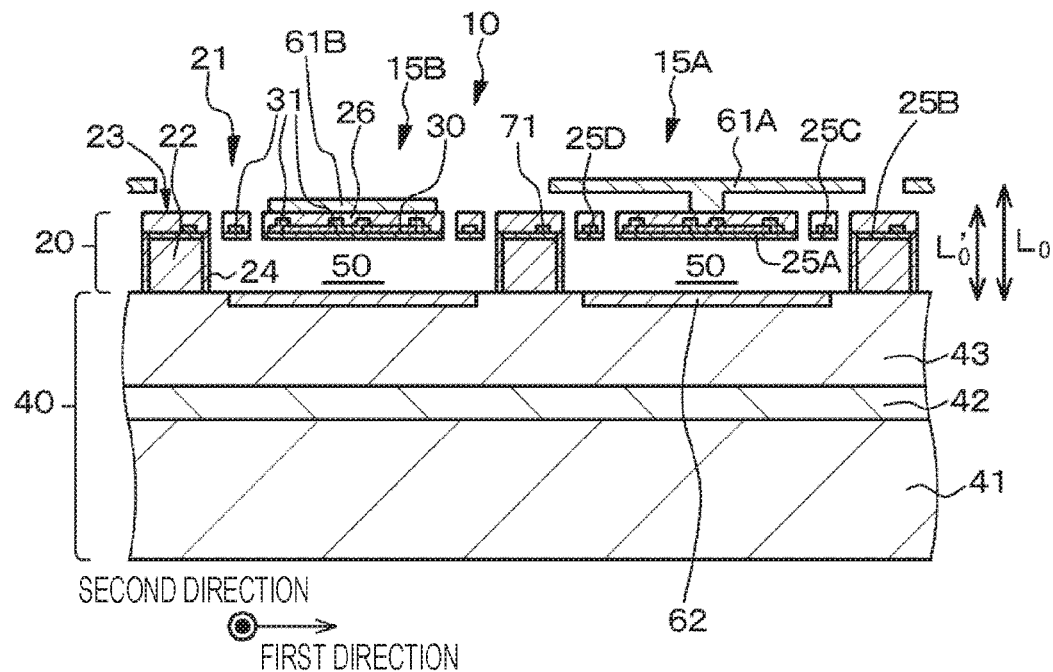
FIGS. 25A and 25B are schematic partial end views of an imaging device according to Example 9 and its modification.

More specifically, as FIG. 25A illustrates a schematic partial end view, the structures of the infrared absorption layers 61A and 61B in the temperature detection element 15A and the temperature detection element 15B are different. With the difference, the values $L_0$ and $L_0'$ in the temperature detection elements 15A and 15B can be changed, the wavelengths of the infrared ray detected by the temperature detection elements 15A and 15B can be made different, and the infrared ray absorption amounts of the temperature detection elements 15A and 15B can be made different.

Figure 25B:
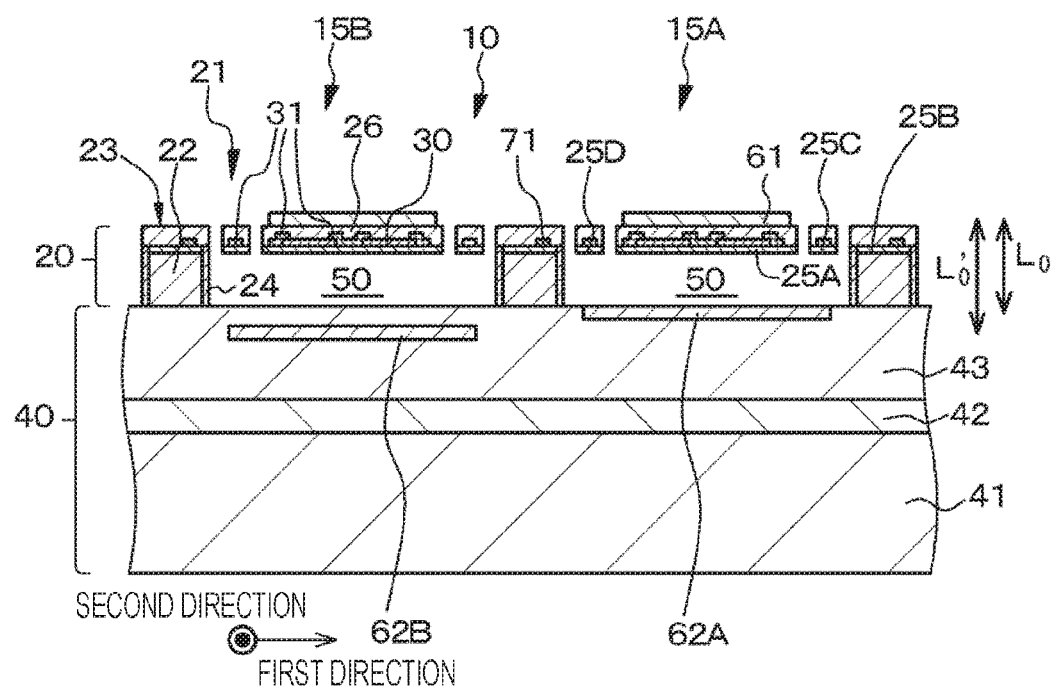

Alternatively, as FIG. 25B illustrates a schematic partial end view, the structures of the infrared absorption layers 61A and 61B in the temperature detection element 15A and the temperature detection element 15B are the same but the formed positions are different. With the difference, the values $L_0$ and $L_0'$ in the temperature detection elements 15A and 15B can be changed, and the wavelengths of the infrared ray detected by the temperature detection elements 15A and 15B can be made different.

Figure 26A:
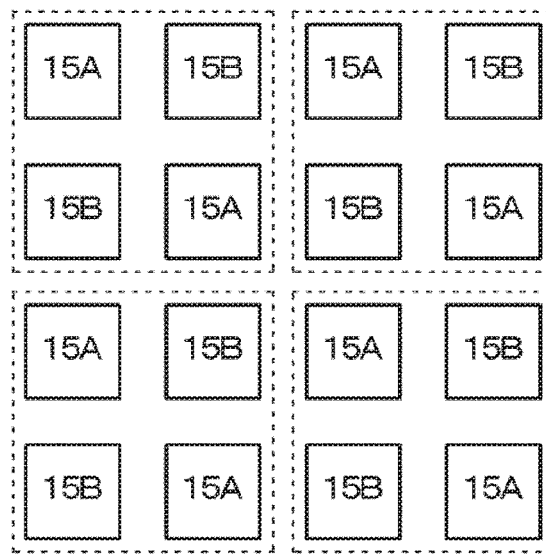
FIGS. 26A and 26B are diagrams schematically illustrating arrangement states of temperature detection elements in the imaging device according to Example 9.
Figure 26B:
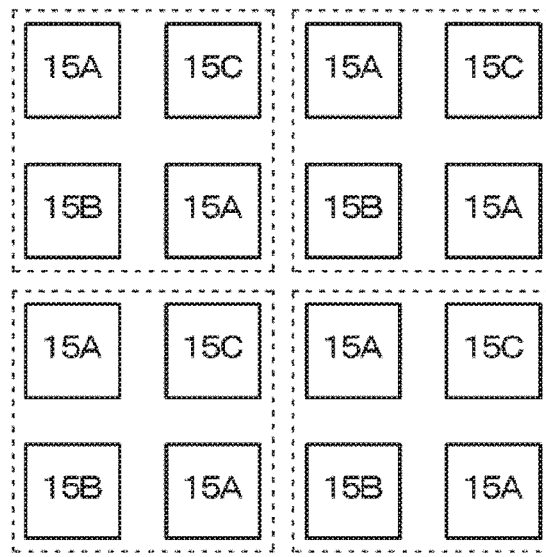

FIG. 26A illustrates arrangement of the temperature detection element 15A and the temperature detection element 15B in the case of configuring the temperature detection element unit from the two types of temperature detection element 15A and temperature detection element 15B. A temperature detection element unit including four temperature detection elements 15A and 15B configuring one pixel is surrounded by a dotted line. Note that a temperature detection element unit can also include two temperature detection elements 15A and 15B. Furthermore, FIG. 26B illustrates arrangement of the temperature detection element 15A, the temperature detection element 15B, and a temperature detection element 15C in the case of configuring the temperature detection element unit from three types of temperature detection element 15A, temperature detection element 15B, and temperature detection element 15C. A temperature detection element corresponding to an infrared wavelength that requires high spatial resolution is only required to be used as the temperature detection element 15A.

In the imaging device according to Example 9, the temperature detection element unit is formed such that the plurality of temperature detection elements is arranged in parallel, and the wavelengths of the infrared ray detected by the temperature detection elements are different in the temperature detection element unit or the infrared ray absorption amounts of the temperature detection elements are different in the temperature detection element unit. Therefore, wavelength spectral characteristics or sensitivity of the infrared ray can be changed for each temperature detection element. Then, for example, by combining the temperature detection elements having different sensitivity wavelengths in the same pixel, the temperature of the object can be measured with high accuracy from the ratio of signal intensities from the plurality of temperature detection elements. Alternatively, by using a temperature detection element unit in which a high-sensitivity temperature detection element and a low-sensitivity temperature detection element are combined, a dynamic range as the temperature detection element unit can be changed. That is, in a case where the infrared intensity is high, the low-sensitivity temperature detection element is simply activated, and in a case where the infrared intensity is low, the high-sensitivity temperature detection element is simply activated. Alternatively, in a case where the object (or environment) has changed from a low infrared intensity state to a high infrared intensity state, the high-sensitivity temperature detection element is simply switched to the low-sensitivity temperature detection element. In a case where the object (or environment) has changed from a high infrared intensity state to a low infrared intensity state, the low-sensitivity temperature detection element is simply switched to the high-sensitivity temperature detection element As the configurations and structures of the temperature detection elements 15A and 15B illustrated in FIGS. 25A and 25B, the configuration and structure of the temperature detection element described in Example 5 have been adopted. However, the configuration and structure are not limited thereto, and the configuration and structure of the imaging device according to Example 9 can be made similar to the configuration and structure of the imaging device described in any one of Example 1 to Example 8. Alternatively, the configuration and structure of the imaging device is not limited to the configuration and structure of the imaging device described any one of Example 1 to Example 8, and can be applied to imaging devices having other configurations and structures as long as the temperature detection element unit is formed such that the plurality of temperature detection elements is arranged in parallel, and the wavelengths of the infrared ray detected by the temperature detection elements are different in the temperature detection element unit or the infrared ray absorption amounts of the temperature detection elements are different in the temperature detection element unit.

Example 10

Example 10 relates to the imaging device having the fifth configuration.

As described above, in the case of arranging the differential integration circuit in the signal line to which a plurality of temperature detection elements arrayed in the second direction is connected, there are some cases where the time required to integrate the signals output from the temperature detection elements by the differential integration circuit is not sufficient.

Figure 28:
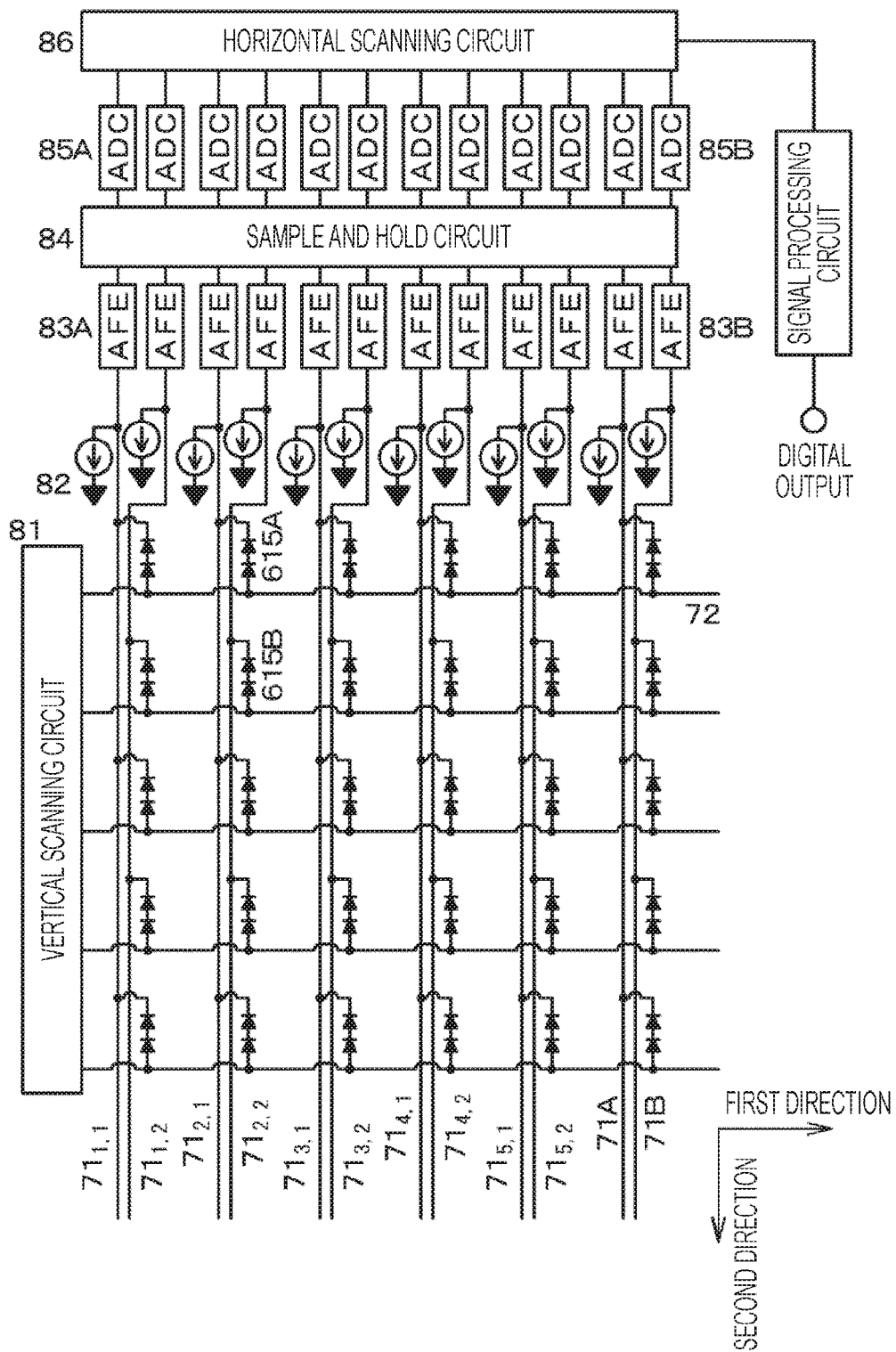
FIG. 28 is an equivalent circuit diagram of an imaging device according to Example 10.

To solve such a problem, the imaging device according to Example 10 includes, as illustrated as an equivalent circuit diagram in FIG. 28, $M_0 \times N_0$ (note that $M_0 \geq 2$ and $N_0 \geq 2$) temperature detection elements arrayed in a first direction and a second direction different from the first direction (specifically, in a two-dimensional matrix manner), and each configured to detect a temperature on the basis of an infrared ray, a plurality of drive lines 72 disposed along the first direction, $N_0 \times P_0$ (note that $P_0 \geq 2$) signal lines disposed along the second direction, a first drive circuit (specifically, a vertical scanning circuit 81) to which the plurality of drive lines 72 is connected, and a second drive circuit (specifically, a horizontal scanning circuit 86, or the like) to which the $N_0 \times P_0$ signal lines are connected. Then, each temperature detection element includes the first terminal portion (specifically, the pn junction diode 30 located at one end in the plurality of pn junction diodes 30) and the second terminal portion (specifically, the pn junction diode 30 located at the other end in the plurality of pn junction diodes 30), the first terminal portion of the each temperature detection element is connected to the drive line 72, and an (n, p)th signal line (note that $n=1, 2, \ldots,$ or $N_0$, and $p=1, 2, \ldots,$ or $P_0$) is connected to the second terminal portion of a $\{(q-1)P_0+p\}$th temperature detection element (note that $q=1, 2, 3, \ldots$) in a temperature detection element group including nth $N_0$ temperature detection elements disposed along the second direction.

In Example 10, more specifically, $P_0=2$ has been set. Therefore, the value of p is 1 or 2. That is, the number of signal lines is $2N_0$. The temperature detection element connected to an odd-numbered signal line 71A ($71_{1,1}$, $71_{2,1}$, $71_{3,1}$, or the like) is indicated by reference numeral 615A, and the temperature detection element connected to an even-numbered signal line 71B ($71_{1,2}$, $71_{2,2}$, $71_{3,2}$, or the like) is indicated by reference numeral 615B.

When p=1, the (n, 1)st signal line is connected to the second terminal portion of the $\{(q-1)P_0+1\}$st temperature detection element (note that $q=1, 2, 3, \ldots$) in the temperature detection element group including the nth $N_0$ temperature detection elements disposed along the second direction, that is, the second terminal portion of the odd-numbered temperature detection element 615A. Furthermore, when p=2, the (n, 2)nd signal line is connected to the second terminal portion of the $\{(q-1)P_0+2\}$nd temperature detection element (note that $q=1, 2, 3, \ldots$) in the temperature detection element group including the nth $N_0$ temperature detection elements disposed along the second direction, that is, the second terminal portion of the even-numbered temperature detection element 615B.

Here, in the imaging device according to Example 10, the signal lines 71A and 71B are connected to analog front ends (AFEs) 83a and 83b configuring the second drive circuit, the sample and hold circuit 84, and analog-digital conversion circuits (ADCs) 85a and 85b, and the analog front ends 83a and 83b include the differential integration circuit. The analog front ends 83a and 83b including the differential integration circuits and the analog-digital conversion circuits 85a and 85b can have known circuit configurations.

Thus, a group of temperature detection elements 615A and 615B arrayed along the second direction is divided into two groups (the odd-numbered temperature detection elements 615A arrayed along the second direction, and the even-numbered temperature detection elements 615B arrayed along the second direction), and the temperature detection elements 615A and 615B in the respective groups are connected to the signal lines 71A and 71B. That is, the temperature detection elements 615A and 615B arrayed along the second direction are connected to the two signal lines 71A and 71B. Therefore, the time required to integrate the signals output from the temperature detection elements by the differential integration circuits can be doubled because the differential integration circuits are arranged in parallel, and an imaging device with high sensitivity and less noise can be provided, as compared with a case where the temperature detection elements arrayed along the second direction are connected to one signal line. Such configuration and structure of the imaging device according to Example 10 can be applied to the imaging device described in Example 1 to Example 9. In some cases, the configuration and structure of such an imaging device according to Example 10 can be applied to an imaging device having configuration and structure other than the imaging device described in any one of Example 1 to Example 9 (for example, an imaging device that performs imaging on the basis of visible light).

The configurations and structures of the temperature detection elements 615A and 615B and the imaging device can be made similar to the configurations and structures of the temperature detection element 15 and the imaging device described in any one of Example 1 to Example 8. Alternatively, the configurations and structures of the temperature detection elements 615A and 615B can be made similar to the configurations and structures of the temperature detection elements 15A and 15B described in Example 9. Therefore, description of the temperature detection elements 615A and 615B and the imaging device is omitted.

Figure 29:
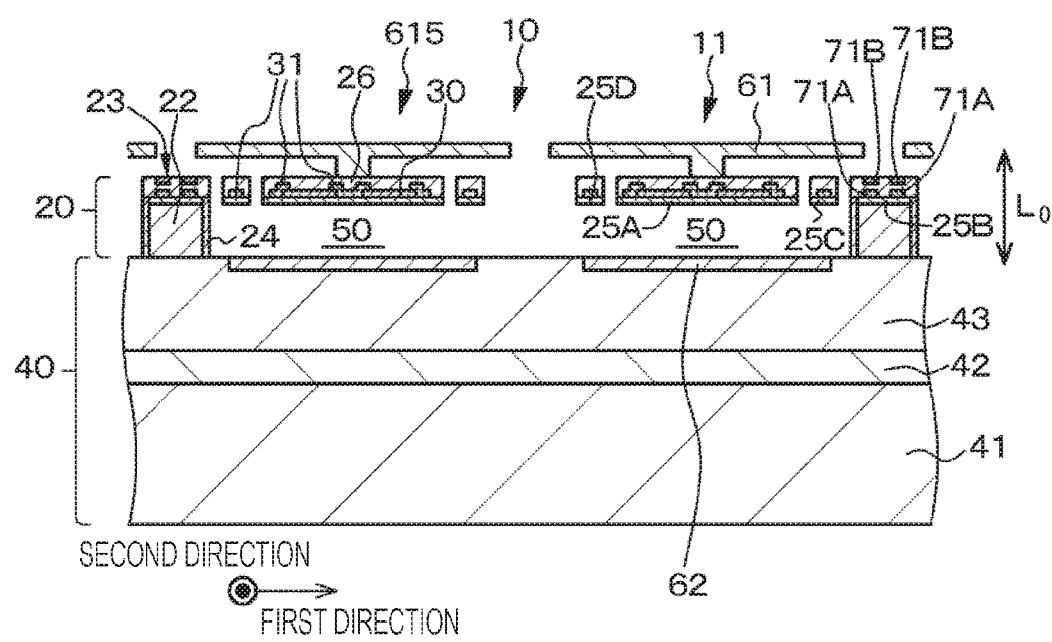
FIG. 29 is a schematic partial end view of a modification of the imaging device according to Example 10.
Figure 30:
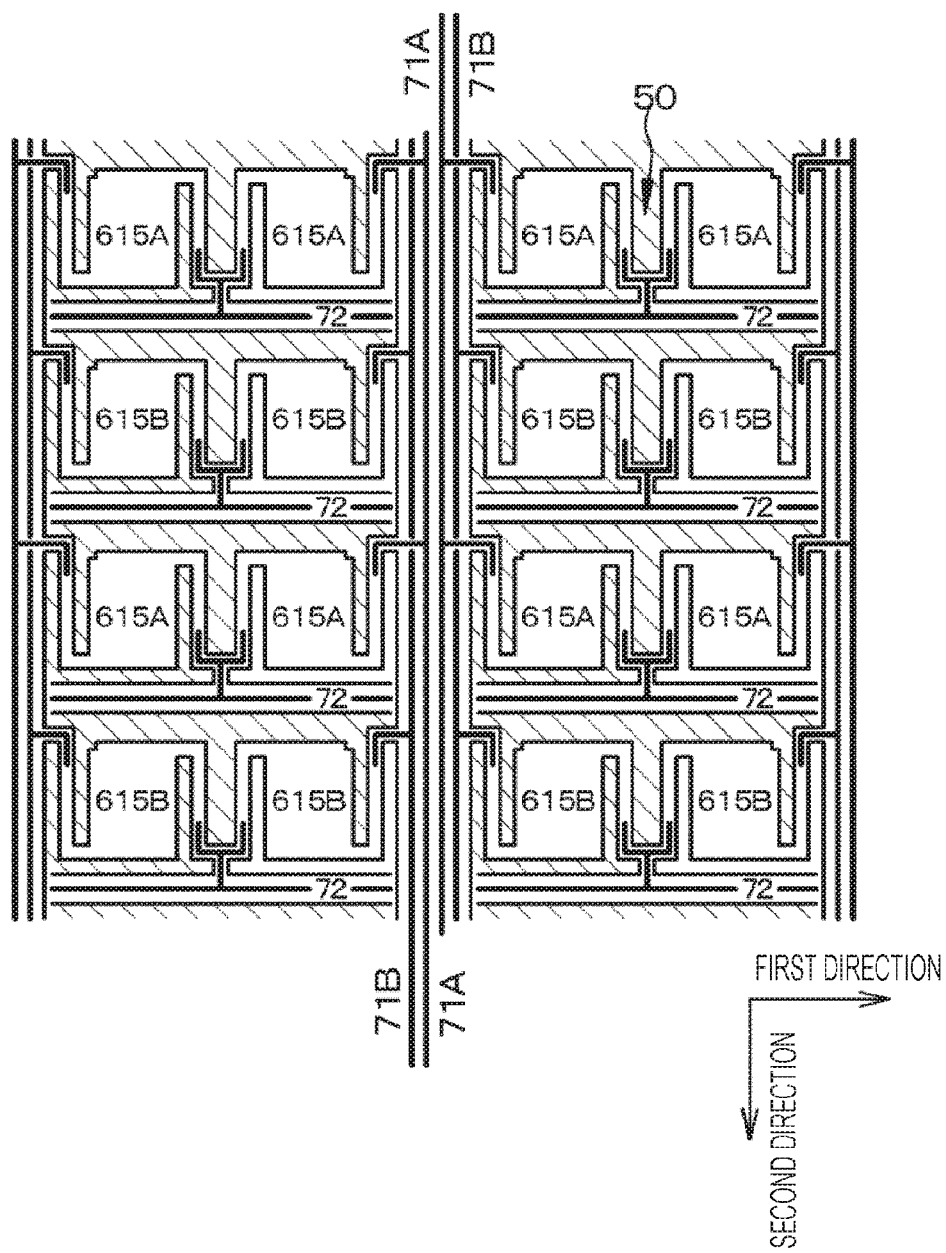
FIG. 30 is a diagram schematically illustrating an arrangement state of configuration elements of the modification of the imaging device according to Example 10 illustrated in FIG. 29.
Figure 32:
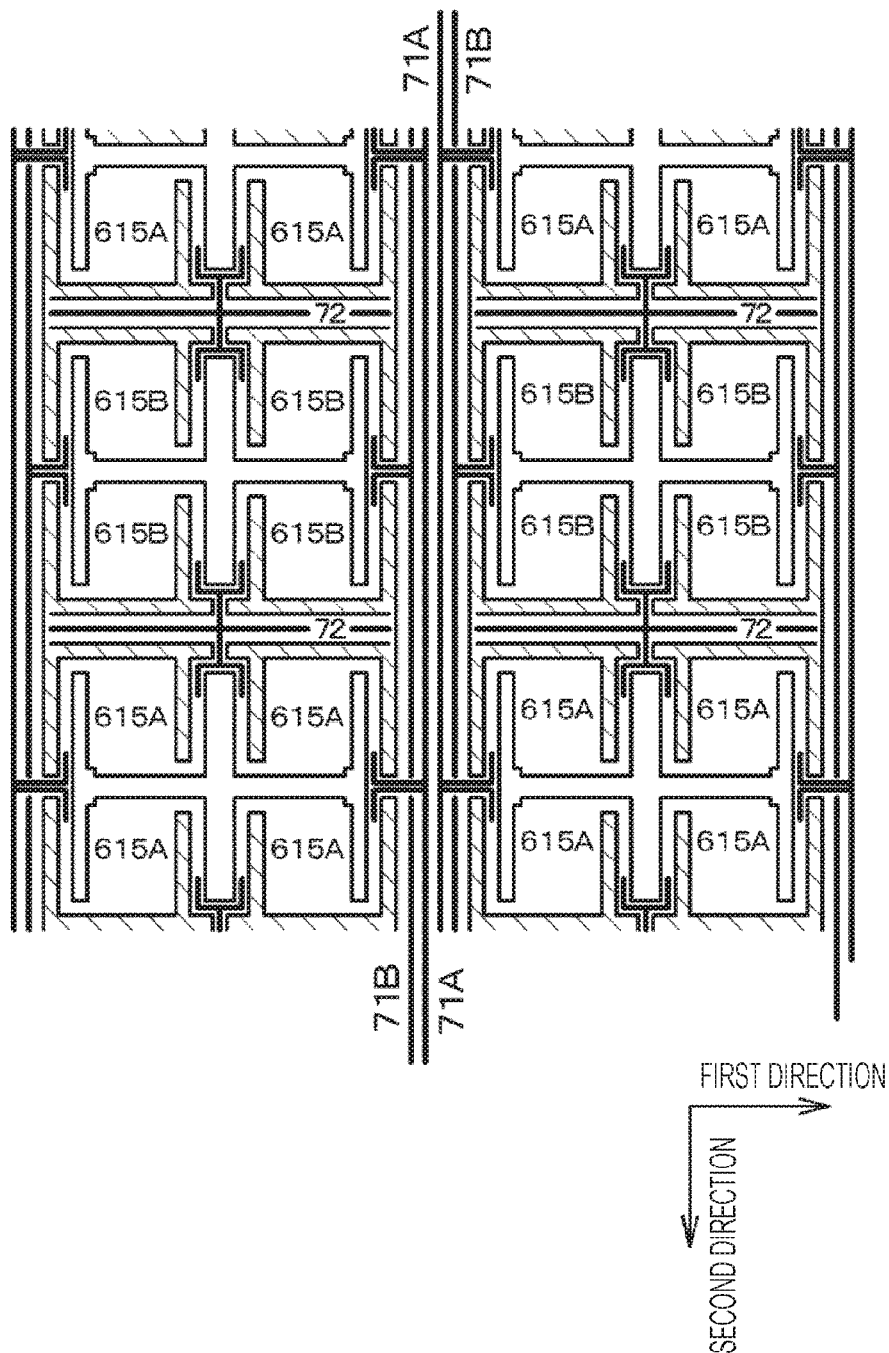
FIG. 32 is a diagram schematically illustrating an arrangement state of configuration elements of the another modification of the imaging device according to Example 10 illustrated in FIG. 31.

Note that, as FIG. 29 illustrates a schematic partial end view and FIG. 30 schematically illustrates an arrangement state of the configuration elements of the imaging device, the void 50 can have a structure shared by adjacent 2×k temperature detection elements 615 (note that k is an integer of 1 or larger and k=1 in the illustrated example), Note that, to clarify the void 50, the void 50 is hatched in FIG. 30. Furthermore, the signal lines 71A and 71B and the drive line 72 are illustrated as thick solid lines, and a part of the wire 31 is also illustrated as a thick solid line. FIG. 32 to be described below is similarly illustrated. To enhance the detection sensitivity of the temperature detection element 615, it is necessary to suppress heat dissipation via the first stud portion 25C and the second stud portion 25D as much as possible. In the example illustrated in FIG. 29, since a part of the first stud portion 25C is shared by two temperature detection elements adjacent along the first direction, heat dissipation through the first stud portion 25C can be suppressed. Note that the structure of the void 50 illustrated in FIGS. 29 and 30 can be applied to the imaging device described in Example 1 to Example 9.

Hereinafter, a modification of the imaging device according to Example 10 will be described.

Figure 31:
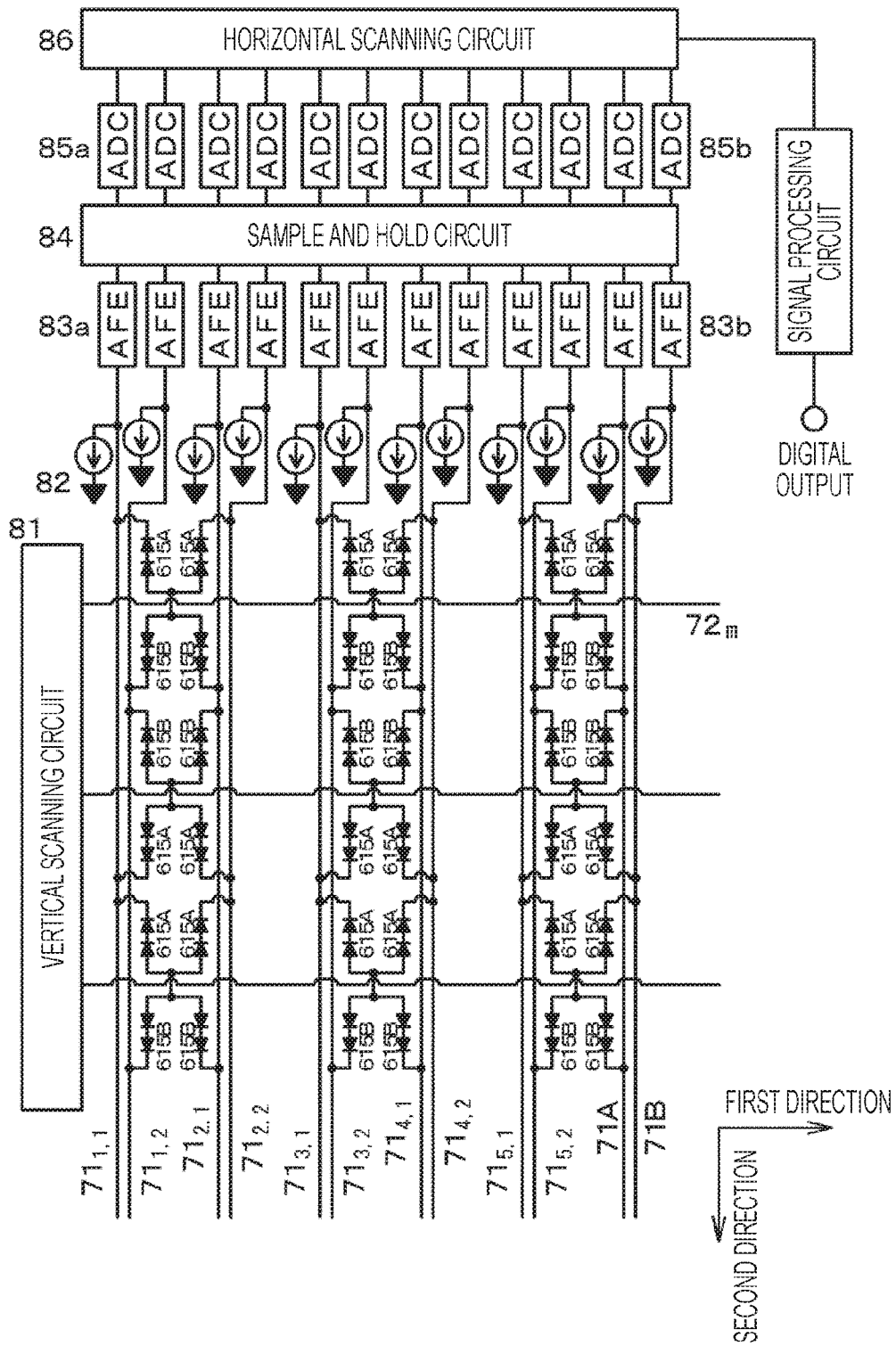
FIG. 31 is an equivalent circuit diagram of another modification of the imaging device according to Example 10.

As illustrated as the equivalent circuit diagram in FIG. 31, and as the arrangement state of the configuration elements being schematically illustrated in FIG. 32, in the modification of the imaging device according to Example 10, the number of the plurality of drive lines is $M_0/P_0$, and an mth drive line (note that m=1, 2, . . . , or $M_0/P_0$) is common to a temperature detection element group including $\{(m-1)P_0+p'\}$th $M_0$ temperature detection elements (note that all values of p'=1, 2, . . . , or $P_0$) disposed along the first direction.

In Example 10, more specifically, $P_0=2$ has been set, as described above. Therefore, the values of p' are 1 and 2. That is, the mth drive line $72_m$ is common to a temperature detection element group including $\{(m-1)P_0+p'\}$th $M_0$ temperature detection elements (specifically, all of $\{(m-1)P_0+1\}$th $M_0$ temperature detection elements and $\{(m-1)P_0+2\}$th $M_0$ temperature detection elements) disposed along the first direction.

Then, in the modification of the imaging device according to Example 10 illustrated in FIG. 31, the temperature detection elements 615A and 615B are disposed above the void 50 provided in the temperature detection element substrate (first substrate 21), the first connection portion (specifically, a part of the drive line 72) provided in the temperature detection element substrate (first substrate 21) and the first terminal portion (specifically, the pn junction diode 30 located at an end in the plurality of pn junction diodes 30) of the temperature detection elements 615A and 615B are connected via the first stud portion 25C (specifically, via the partly shared first stud portion 25C) and the second connection portion (specifically, a part of the signal lines 71A and 71B) provided in the temperature detection element substrate (first substrate 21) and the second terminal portion (specifically, the pn junction diode 30 located at the other end in the plurality of pn junction diodes 30) of the temperature detection elements 615A and 615B are connected via the second stud portion 25D (specifically, via the partly shared second stud portion 25D).

Alternatively, $P_0=2$, the respective second terminal portions of the two temperature detection elements 615A and 615B adjacent in the second direction are connected to the second connection portions (part of the signal lines 71A and 71B) provided in the temperature detection element substrate (first substrate 21) via one second stud portion 25D (specifically, the partly shared second stud portion 25D), and the respective first terminal portions of total of four temperature detection elements 615A and 615B of two temperature detection elements 615A or two temperature detection elements 615B adjacent in the first direction, and the two temperature detection elements 615A and 615B adjacent in the second direction, are connected to the first connection portion (a part of the drive line 72) provided in the temperature detection element substrate (first substrate 21) via one first stud portion 25C (the partly shared first stud portion 25C).

To enhance the detection sensitivity of the temperature detection element 615, it is necessary to suppress heat dissipation via the first stud portion 25C and the second stud portion 25D as much as possible. In the example illustrated in FIG. 31, since a part of the first stud portion 25C is shared by the four temperature detection elements adjacent along the first direction and the second direction, and a part of the second stud portion 25D is shared by the two temperature detection elements adjacent along the second direction, the heat dissipation via the first stud portion 25C and the second stud portion 25D can be suppressed. Note that the structure of the void 50 illustrated in FIG. 31 can be applied to the imaging device described in Example 1 to Example 9.

Example 11

Figure 33:
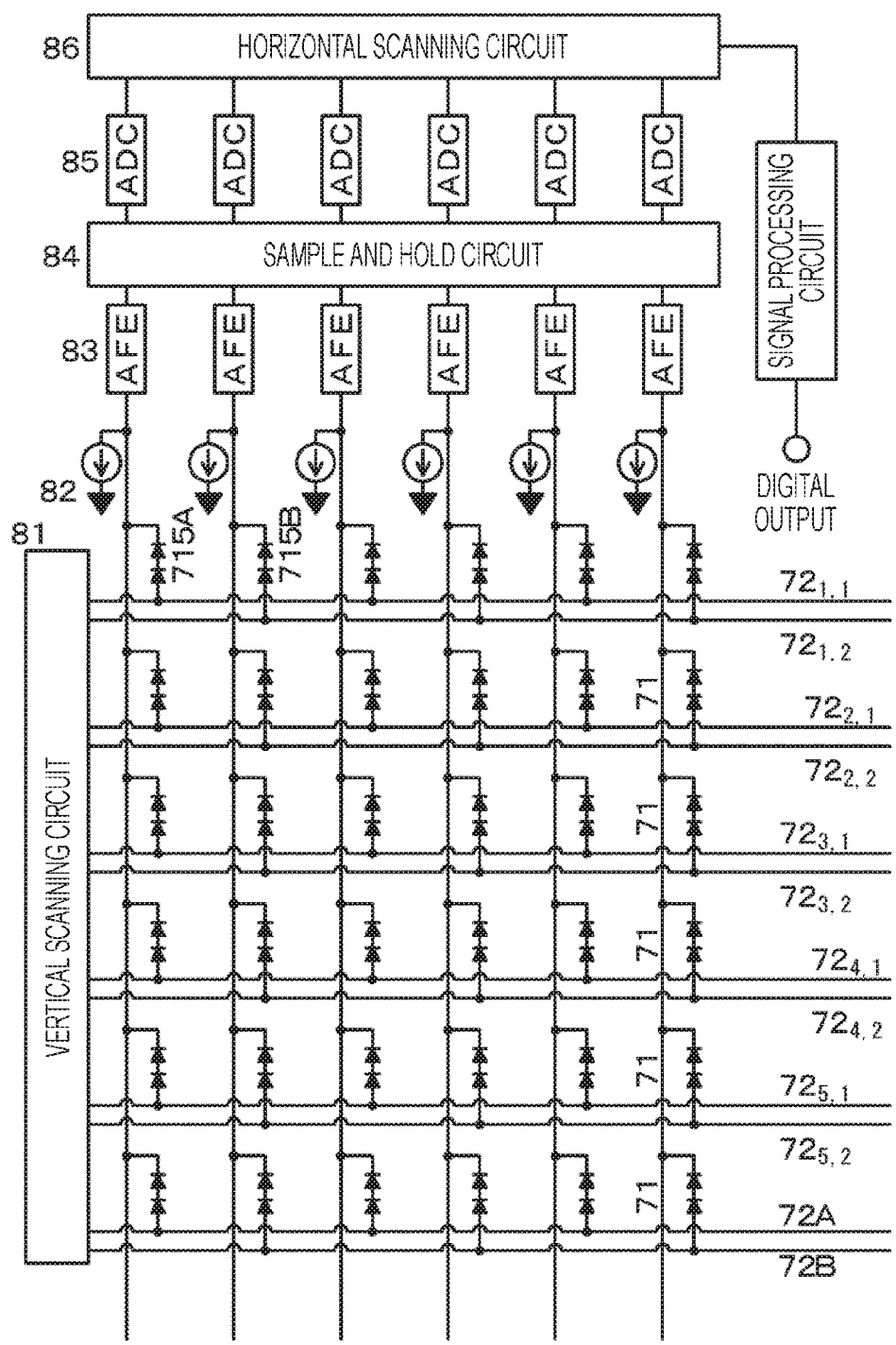
FIG. 33 is an equivalent circuit diagram of an imaging device according to Example 11.

Example 11 relates to the imaging device having the sixth configuration. The imaging device according to Example 11 includes, as illustrated as an equivalent circuit diagram in FIG. 33, $S_0 \times T_0$ (note that $S_0 \geq 2$ and $T_0 \geq 2$) temperature detection elements 715A and 715B arrayed in the first direction and the second direction different from the first direction (specifically, in a two-dimensional matrix manner), and each configured to detect a temperature on the basis of an infrared ray, $S_0 \times U_0$ (note that $U_0 \geq 2$) drive lines 72 disposed along the first direction, a plurality of signal lines 71 disposed along the second direction, a first drive circuit (specifically, the vertical scanning circuit 81) to which $S_0 \times U_0$ drive lines 72 are connected, and a second drive circuit (specifically, the horizontal scanning circuit 86, or the like) to which the plurality of signal lines 71 is connected. Then, each temperature detection element 715A or 715B includes the first terminal portion (specifically, the pn junction diode 30 located at one end in the plurality of pn junction diodes 30) and the second terminal portion (specifically, the pn junction diode 30 located at the other end in the plurality of pn junction diodes 30), the second terminal portion of the each temperature detection element 715A or 715B is connected to the signal line 71, and an (s, u)th drive line 72 (note that s=1, 2, . . . , or $S_0$ and u=1, 2, . . . , or $U_0$) is connected to the first terminal portion of the $\{(t-1)U_0+u\}$th temperature detection element 715A or 715B (note that t=1, 2, 3, . . . ) in the temperature detection element group including the sth $S_0$ temperature detection elements 715A or 715B disposed along the first direction.

In Example 11, more specifically, $U_0=2$ has been set. Therefore, the value u is 1 or 2. That is, the number of drive lines is $2S_0$. The temperature detection element connected to an odd-numbered drive line 72A ($72_{1,1}$, $72_{2,1}$, $72_{3,1}$, or the like) is indicated by reference numeral 715A, and the temperature detection element connected to an even-numbered drive line 72B ($72_{1,2}$, $72_{2,2}$, $72_{3,3}$, or the like) is indicated by reference numeral 715B.

When u=1, the (s, 1)st drive line is connected to the first terminal portion of the $\{(t-1)U_0+1\}$st temperature detection element (note that t=1, 2, 3, . . . ) in the temperature detection element group including the sth $S_0$ temperature detection elements disposed along the first direction, that is, the odd-numbered temperature detection element 715A. Furthermore, when u=2, the (s, 2)nd drive line is connected to the second terminal portion of the $\{(t-1)P_0+2\}$nd temperature detection element (note that t=1, 2, 3, . . . ) in the temperature detection element group including the sth $S_0$ temperature detection elements disposed along the first direction, that is, the even-numbered temperature detection element 715B.

As described above, a group of temperature detection elements 715A and 715B arrayed along the first direction is divided into two groups (the odd-numbered temperature detection elements 715A arrayed along the first direction, and the even-numbered temperature detection elements 715B arrayed along the first direction), and the temperature detection elements 715A and 715B in the respective groups are connected to the drive lines 72A and 72B. That is, the temperature detection elements 715A and 715B arrayed along the first direction are connected to the two drive lines 72A and 72B. Accordingly, the current density of the current flowing through the drive line can be reduced. As a result, the power consumption in driving the temperature detecting element can be reduced, and for example, the voltage drop in the drive line can be suppressed. Such configuration and structure of the imaging device according to Example 11 can be applied to the imaging device described in Example 1 to Example 10 In some cases, the configuration and structure of such an imaging device according to Example 11 can be applied to an imaging device having configuration and structure other than the imaging device described in any one of Example 1 to Example 10 (for example, an imaging device that performs imaging on the basis of visible light).

Example 12

Figure 34:
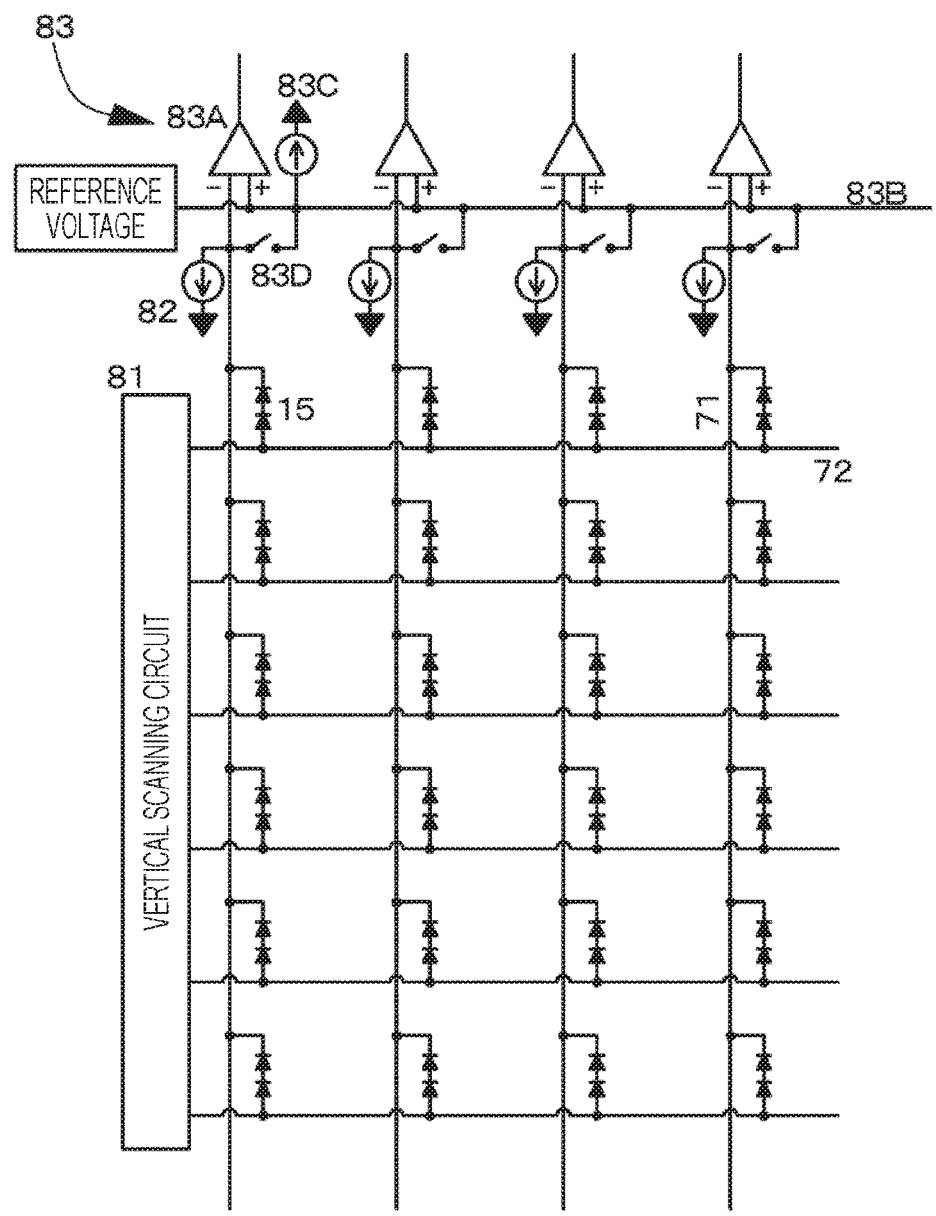
FIG. 34 is an equivalent circuit diagram of an imaging device according to Example 12.

Example 12 relates to a noise reduction method in an imaging devices of the present disclosure. The imaging device according to Example 12 is the imaging device described in any one of Example 1 to Example 11. That is, the imaging device according to Example 12 includes, as illustrated as an equivalent circuit diagram in FIG. 34,
- the temperature detection element 15 configured to detect a temperature on the basis of an infrared ray,
- the drive line 72 to which the temperature detection element 15 is connected, and
- the signal line 71 to which the temperature detection element 15 is connected, and further includes a first drive circuit to which the drive line 72 is connected, a second drive circuit to which the signal line 71 is connected, and a storage unit (for example, a nonvolatile memory (not illustrated)), and
- the signal line 71 is connected to a differential integration circuit 83A and the analog-digital conversion circuit 85 in the second drive circuit.

Here, in the imaging device according to any one of Example 1 to Example 12, the voltage in each signal line 71 is input to one input unit of the differential integration circuit 83A constituting the analog front end (AFE) 83. Furthermore, the reference voltage (reference voltage) is input to the other input unit of the differential integration circuit 83A through a wire 83B. The wire 83B is also connected to a constant current circuit 83C. Furthermore, a switch means 83D for short-circuiting each signal line 71 and the wire 83 is disposed between each signal line 71 and the wire 83B. Note that, with the configuration having the constant current circuit 83C disposed for each signal line, an error caused by voltage drop due to wire resistance can be reduced. That is, when the constant current circuit 83C is disposed for each signal line, current distribution of the wire 83B and current distribution of the drive line 72 can be made approximately equal. When the current distribution is made approximately equal, and the wire resistance values per length of the wire 83B and the drive line 72 are made approximately equal, the voltage drop due to a product of the wire resistance and the current can be made substantially equal for each column. The voltage drop of the wire 83B decreases a positive-side terminal voltage of the differential integration circuit 83A and the voltage drop of the drive line 72 decreases a negative-side terminal voltage of the differential integration circuit 83A, but equal voltage drops of the positive-side terminal and the negative-side terminal are offset by differential integration, and thus an error appearing in an output terminal of the differential integration circuit 83A is reduced.

In the noise reduction method of Example 12, first, the temperature detection element 15 is set to a deactivated state, and the differential integration circuit 83A is reset. That is, the switch means 83D is set to a "closed" state, the two input units of the differential integration circuit 83A are short-circuited, and the differential integration circuit 83A is reset, without selecting the temperature detection element 15 from the vertical scanning circuit 81.

Next, the temperature detection element 15 is set to the deactivated state, a constant current is caused to flow through the signal line 71 only for a time $TM_0$ that is the same time $TM_0$ in which the temperature detection element 15 is in an activated state, the voltage of the signal line 71 is integrated in the differential integration circuit 83A, an obtained integration value is converted into a digital value in the analog-digital conversion circuit 85, and the obtained digital value is stored in the storage device as an offset value.

Specifically, the switch means 83D is set to an "open" state to keep the temperature detection element 15 in the deactivated state, the constant current is caused to flow through the signal line 71 only for the time $TM_0$ that is the same time $TM_0$ in which the temperature detection element 15 is in the activated state, and the reference voltage (reference voltage) is input to the other input unit of the differential integration circuit 83A via the wire 83B. The voltage (in principle, the unchanged voltage value) of the signal line 71 is integrated in the differential integration circuit 83A. Then, after the time $TM_0$ has elapsed, the obtained integration value is converted into the digital value by the analog-digital conversion circuit 85, and the obtained digital value is stored in the storage device as an offset value. In this way, the reference voltage (reference voltage) is input to the other input unit of the differential integration circuit 83A, and the output of the inactive temperature detection element 15 is input to one input unit of the differential integration circuit 83A. Therefore, in the end, the integration value obtained in the differential integration circuit 83A is a value caused by characteristic variation in the differential integration circuit 83A (specifically, the variation in offset in the operational amplifier constituting the differential integration circuit).

Next, the temperature detection element 15 is actually activated. Here, the temperature detection element 15 is set to an operated state only for the time $TM_O$, the voltage of the signal line 71 is integrated in the differential integration circuit 83A, and the obtained integration value is converted into a digital value in the analog-digital conversion circuit 85. Then, the offset value is subtracted from the digital signal value.

Noise caused by the differential integration circuit 83A can be reduced in this way, or the characteristic variation of the differential integration circuit 83A can be suppressed, and so-called vertical streak fixed pattern noise can be reduced. The above processing is simply performed before reading out one imaging frame (one screen).

Example 13

Figure 35:
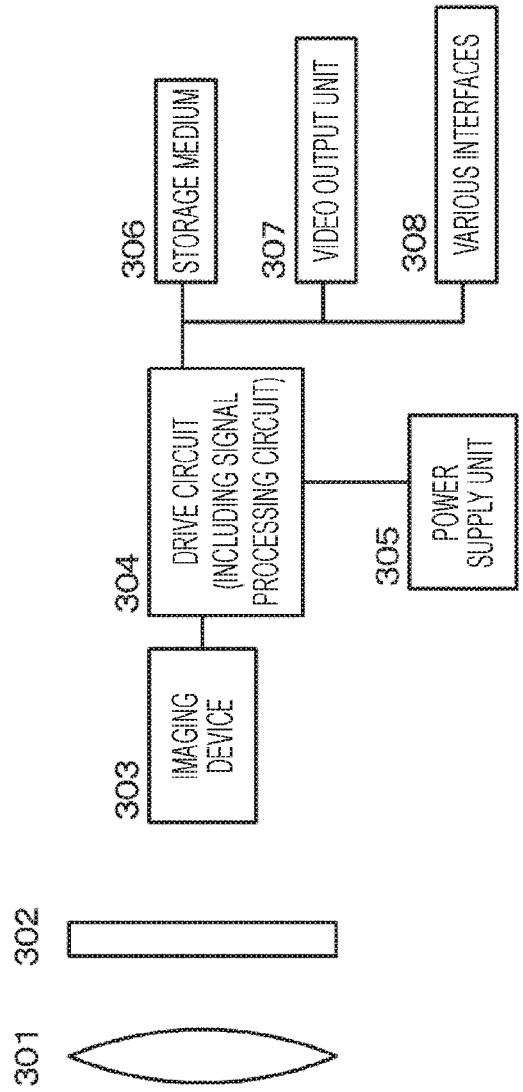
FIG. 35 is a conceptual diagram of an infrared camera including an imaging device of the present disclosure according to Example 13.

In Example 13, an example of applying the imaging device described in one of Example 1 to Example 12 to an infrared camera will be described. As illustrated as a conceptual diagram in FIG. 35, the infrared camera includes a lens 301, a shutter 302, an imaging device 303 described in one of Example 1 to Example 12, a drive circuit 304, a power supply unit 305, a storage medium 306, a video output unit 307, and various interfaces 308. The drive circuit 304 includes, for example, a signal processing circuit that corrects interpixel variation, corrects defective pixels, and removes various noises, in addition to the above-described various circuits. Since the configuration elements of the infrared camera having such a configuration can be well-known configuration elements except for the imaging device 303, detailed description is omitted.

The imaging device of the present disclosure has been described on the basis of the favorable examples, but the imaging device of the present disclosure is not limited to these examples. The configurations and structures of the imaging device and the temperature detection element described in the examples are examples and can be changed as appropriate. The materials configuring the imaging device and the temperature detection element, and the method of manufacturing the imaging device and the temperature detection element are also examples and can be changed as appropriate. In some cases, the formation of the infrared reflective layer may be omitted, and the top surface of the covering layer itself may function as an infrared reflective layer.

Following combinations can be exemplified as combinations of (the signal line connection portion and the drive line connection portion) described in Examples.

(the signal line connection portion described in Example 1 and the drive line connection portion described in Example 2)
(the signal line connection portion described in Example 1 and the drive line connection portion described in Example 3)
(the signal line connection portion described in Example 1 and the drive line connection portion described in Example 4)
(the signal line connection portion described in Example 2 and the drive line connection portion described in Example 3)
(the signal line connection portion described in Example 2 and the drive line connection portion described in Example 4)
(the signal line connection portion described in Example 3 and the drive line connection portion described in Example 4)
(the drive line connection portion described in Example 1 and the signal line connection portion described in Example 2)
(the drive line connection portion described in Example 1 and the signal line connection portion described in Example 3)
(the drive line connection portion described in Example 1 and the signal line connection portion described in Example 4)
(the drive line connection portion described in Example 2 and the signal line connection portion described in Example 3)
(the drive line connection portion described in Example 2 and the signal line connection portion described in Example 4)
(the drive line connection portion described in Example 3 and the signal line connection portion described in Example 4)

In some cases, the following configuration and structure can be adopted. That is, each temperature detection element is connected to the analog front end constituting the drive circuit via the signal line and the signal line connection portion (in some cases, only the signal line connection portion). Here, the analog front end is formed in a region of the second substrate, the region being located immediately below the temperature detection element. Then, the output of the analog front end is sent to the drive circuit via an output line as an alternative to the signal line described in Example 1 to Example 4. Note that a connection portion for connecting the output line and the drive circuit is only required to be made similar to configuration and structure as the drive line connection portion, for example.

Alternatively, each temperature detection element is connected to the analog front end constituting the drive circuit and the analog-digital conversion circuit via the signal line and the signal line connection portion (in some cases, only the signal line connection portion). Here, the analog front end and the analog-digital conversion circuit are formed in a region of the second substrate, the region being located immediately below the temperature detection element. Then, the output of the analog-digital conversion circuit is sent to a circuit constituting the drive circuit via the output line as an alternative to the signal line described in Example 1 to Example 4. Note that a connection portion for connecting the output line and the circuit constituting the drive circuit is only required to be made similar to the configuration and structure of the drive line connection portion, for example.

Figure 37:
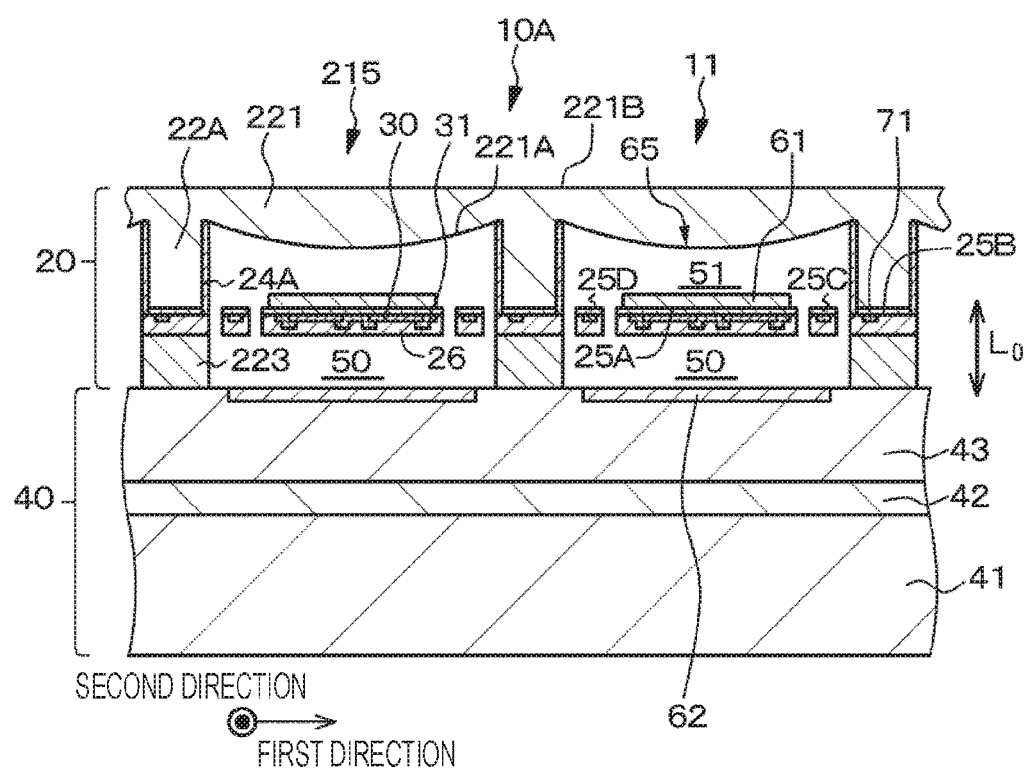
FIG. 37 is a schematic partial end view of the still another modification of the imaging device according to Example 6.

For example, a light condensing element including a lens may be disposed on the infrared ray incident side of the imaging device. For example, FIG. 37 illustrates an example in which a light condensing element (lens) 65 is provided on the side of the first surface 221A of the first substrate 221 in the modification of Example 6 illustrated in FIG. 19B. In [Process-630] of Example 6, such a light condensing element 65 can be formed at the same time with removing the sacrificial layer 97 on the basis of an etching method (see FIG. 47C), and further, changing etchant to remove a part of the second silicon layer 93 on the basis of the etching method (see FIG. 47D), and providing the cavity 51 between the diaphragm portion 25A and the second silicon layer. That is, when a part of the second silicon layer 93 is removed on the basis of an etching method, the etchant enters the second silicon layer 93 from the vicinity of the partition wall 223, but by appropriately setting etching conditions, a portion of the second silicon layer 93 near the partition wall 223 can be etched more than a portion of the second silicon layer 93 distant from the partition wall 223. As a result, the light condensing element (lens) 65 can be provided on the first surface 221A side of the first substrate 221 (second silicon layer 93).

Figure 38A:
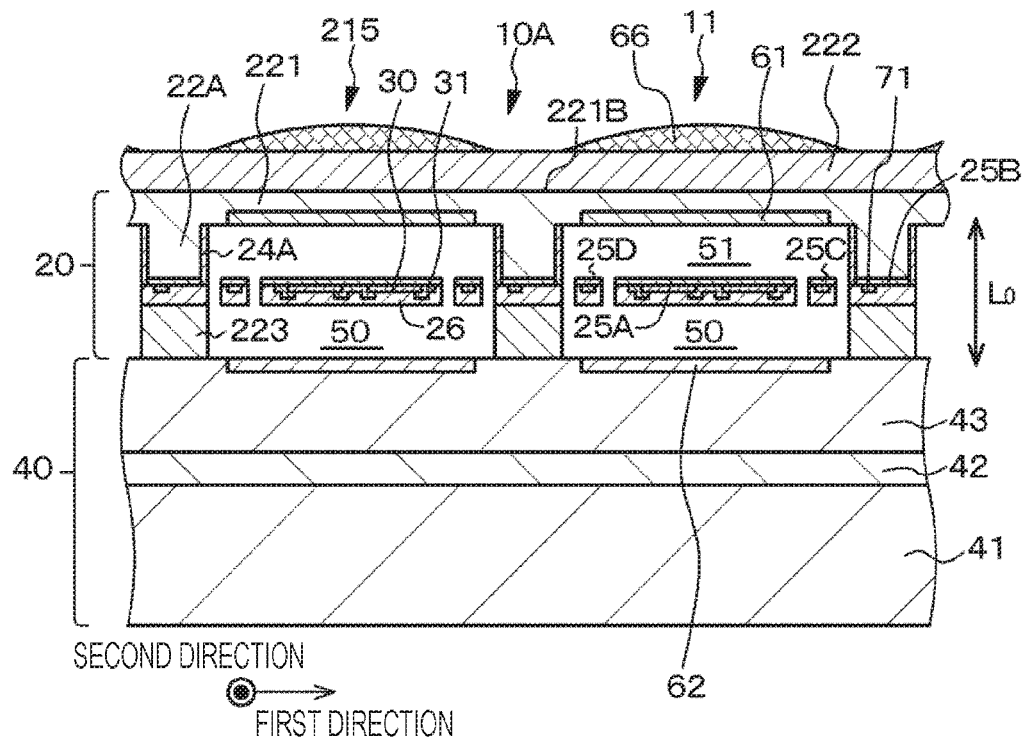
FIGS. 38A and 38B are schematic partial end views of still another modification of the imaging device according to Example 6.
Figure 38B:
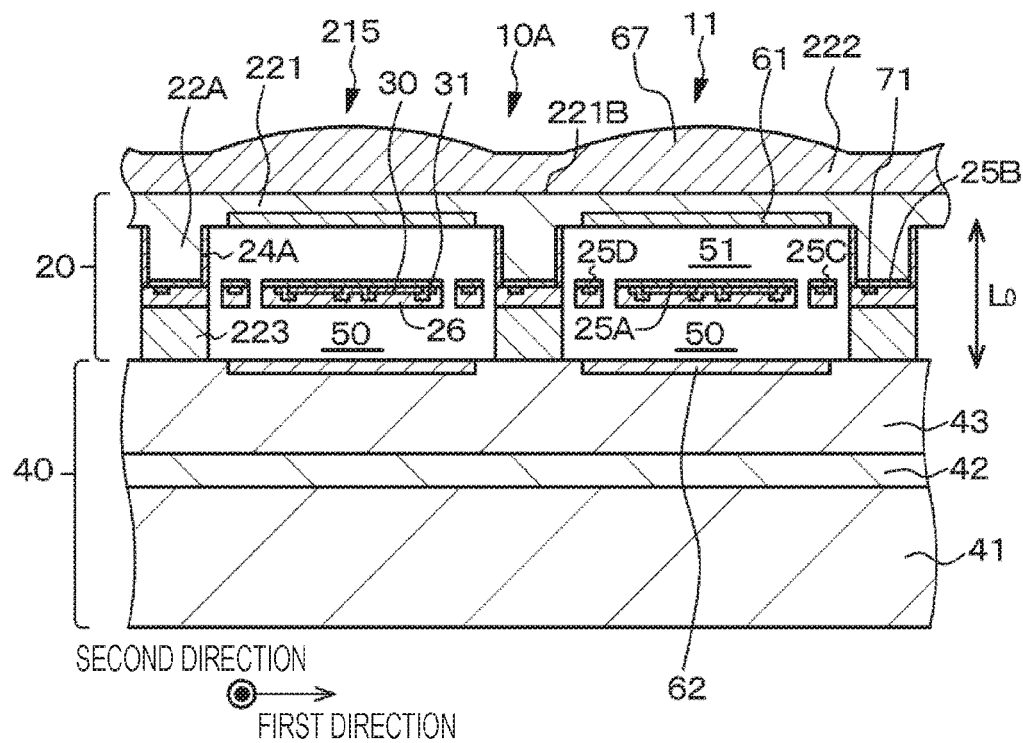
Figure 39A:
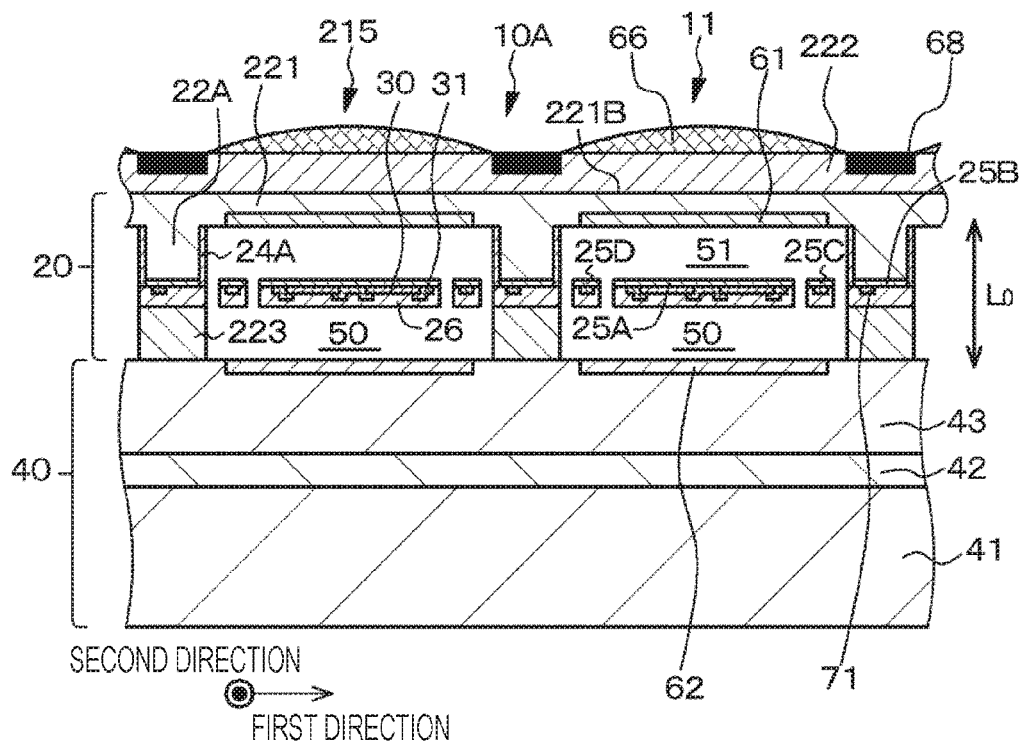
FIGS. 39A and 39B are schematic partial end views of still another modification of the imaging device according to Example 6.
Figure 39B:
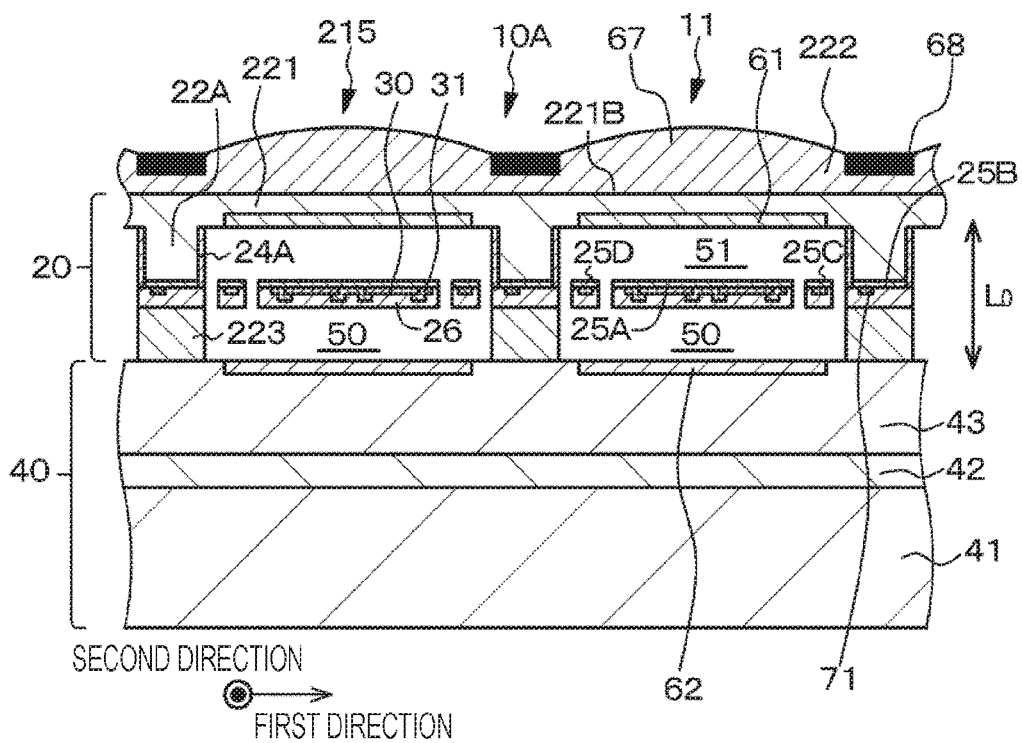

Alternatively, for example, in the modification of Example 6 illustrated in FIG. 20, light condensing elements (lenses) 66 and 67 may be provided on the infrared ray incident side of the protective substrate 222 including a silicon semiconductor substrate attached to the surface of the first substrate 221 (the second surface 221B of the first substrate 221) (see FIGS. 38A and 38B). The example illustrated in FIG. 38A is an example in which the light condensing element 66 includes a member (for example, a resist material) different from the protective substrate 222, and the example illustrated in FIG. 38B is an example in which the light condensing element 67 is formed by etching the protective substrate 222. These light condensing elements can be formed by, for example, a method similar to a well-known on-chip micro lens forming method. A protective substrate including a material that transmits an infrared ray such as $CaF_2$, $BaF_2$, $Al_2O_3$, or ZnSe can be adopted, for example, instead of the protective substrate 222 including a silicon semiconductor substrate. Furthermore, as illustrated in FIGS. 39A and 39B, a light shielding portion 68 may be provided on the infrared ray incident side of the imaging device and may suppress incidence of an infrared ray on an adjacent temperature detection element. The light shielding portion 68 can be formed by forming a groove in the protective substrate 222, for example, and embedding the groove with a metal material or an alloy material. Needless to say, the light condensing elements 66 and 67 and the light shielding portion 68 can be appropriately applied to other examples.

Figure 40:
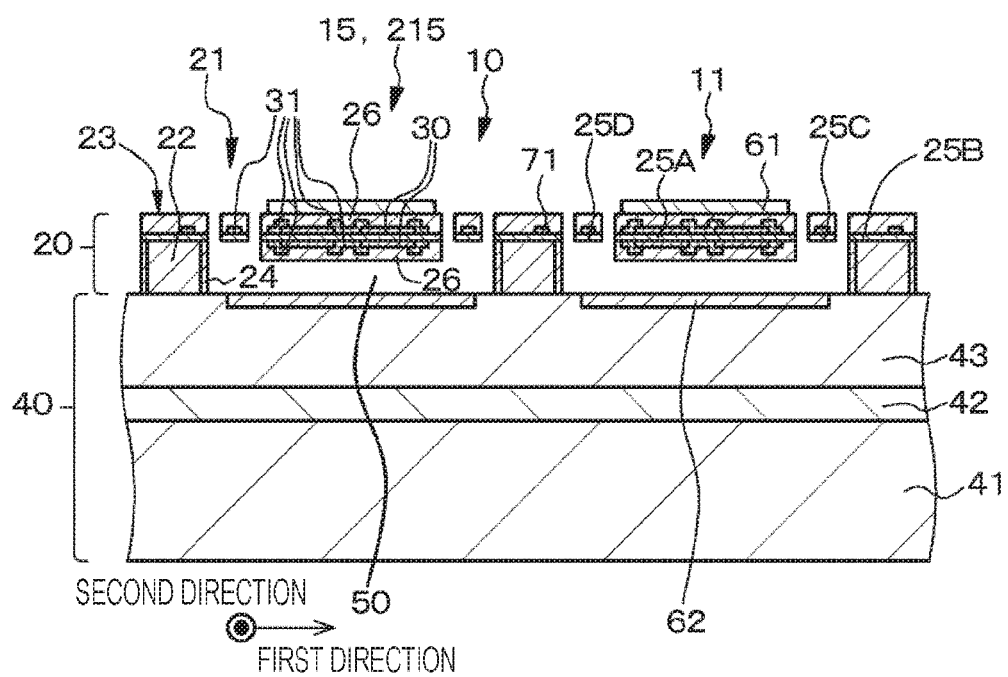
FIG. 40 is a schematic partial end view of an imaging device (an imaging device having a fourth configuration) in which the temperature detection elements constituting the imaging devices according to Example 5 and Example 6 are combined up and down.

Furthermore, as the imaging device having the fourth configuration, the temperature detection element unit can include two temperature detection elements (the temperature detection elements described in each example) disposed up and down along the incidence of an infrared ray. FIG. 40 illustrates an example in which the modification of Example 1 illustrated in FIG. 17A and Example 6 illustrated in FIG. 18A are combined. Needless to say, the present example can be applied to other examples. Specifically, such an imaging device includes a temperature detection element unit configured to detect a temperature on the basis of an infrared ray, in which
the temperature detection element unit includes two temperature detection elements disposed up and down along incidence of the infrared ray, and
in the temperature detection element unit, wavelengths of the infrared ray detected by the temperature detection elements are the same or different, or infrared ray absorption amounts of the temperature detection elements are different. Note that the two temperature detection elements may be connected to the same drive line and signal line, or may be connected to different drive lines and signal lines.

Furthermore, the temperature detection element can include one of the temperature detection elements constituting the imaging device of the present disclosure, or an imaging device in which the temperature detection elements constituting the imaging device of the present disclosure are arrayed in one dimensional manner can be adopted. That is, broadly, an imaging device in which J (note that J≥1) temperature detection elements constituting the imaging device of the present disclosure are arrayed in one dimensional manner, in other words, the imaging device of the present disclosure provided with J (note that J≥1) temperature detection elements in one dimensional manner can be adopted. Specifically, J (note that J≥1) temperature detection elements 15 or 215 arrayed in the first direction are provided, and
J drive lines 72 and J signal lines 71 disposed along the first direction and connected with the respective temperature detection elements 15 and 215 are provided, in which
the first structure 20 includes the temperature detection element array region 11 provided with the temperature detection element 15 or 215 and the peripheral region 12 surrounding the temperature detection element array region 11,
the signal lines 71 are electrically connected with the drive circuit via the signal line connection portion 100 in the peripheral region 12, and
the drive lines 72 are electrically connected with the drive circuit via the drive line connection portion 110 in the peripheral region 12.

Figure 36:
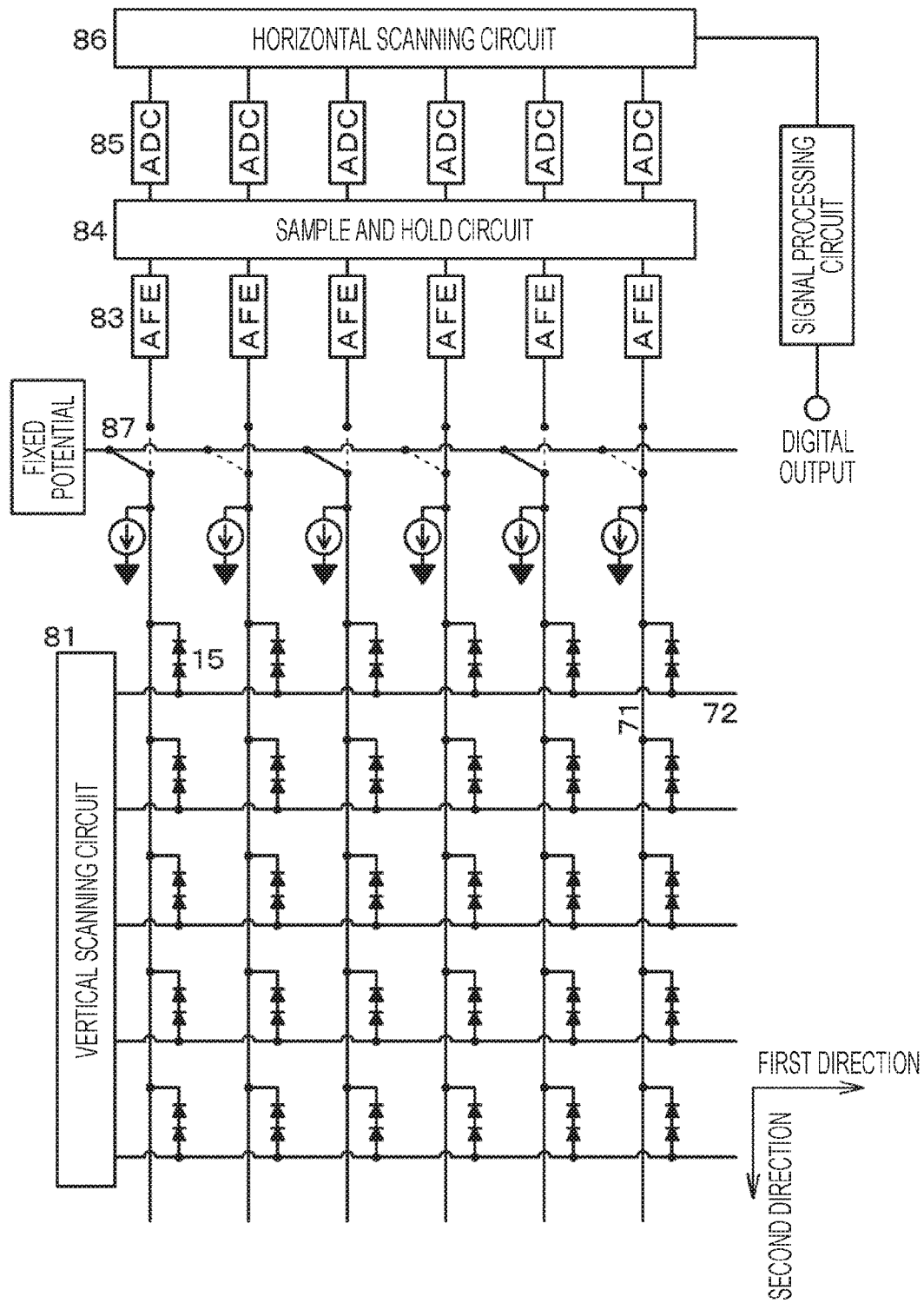
FIG. 36 is an equivalent circuit diagram of a modification of the imaging device according to Example 9.

The imaging device described in Example 9 is provided with a temperature detection element unit including a plurality of temperature detection elements. Here, in a case where one temperature detection element needs to operate in the temperature detection element unit in some cases, as illustrated as an equivalent circuit diagram in FIG. 36, a switch means 87 that controls a conductive state between the differential integration circuit and the signal line 71 is simply provided between the AFE 83 (specifically, the differential integration circuit) and the signal line 71. Furthermore, in this case, the switch means 87 favorably switches the signal line 71 to the fixed potential to make the conduction state between the differential integration circuit and the signal line 71 non-conductive. As a result, the power consumption of the imaging device can be reduced. Note that such a circuit configuration can also be applied to other examples. That is, by thinning the temperature detecting elements to activate, the resolution is reduced but the power consumption of the imaging device can be reduced. Similarly, in Example 11, for example, by operating one of the odd-numbered drive lines or the even-numbered drive lines (or operating the drive lines in a plurality of sets of drive lines) and thinning the temperature detection element to activate, the power consumption of the imaging device can be reduced although the resolution is decreased. Furthermore, the amount of readout data can be reduced, and a data output rate can be increased. In a case where high resolution is required, all the temperature detection elements are simply activated.

Figure 41A:
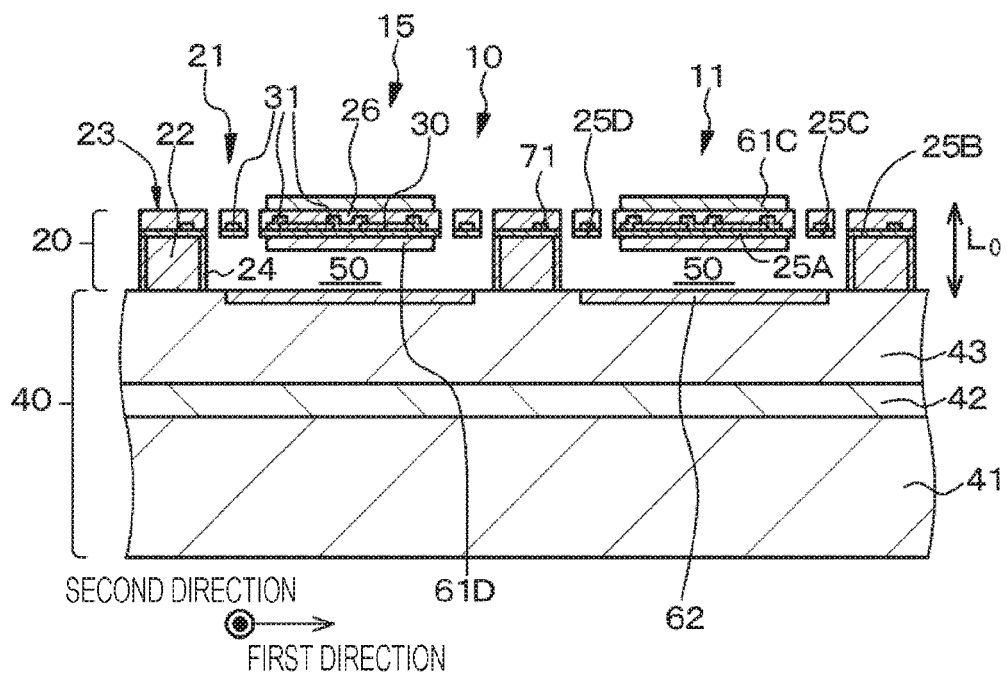
FIGS. 41A and 41B are schematic partial end views of imaging devices of another modification of Example 5 and still another modification of Example 6.

As FIG. 41A illustrates a schematic partial end view of the imaging device of the modification of Example 1 illustrated in FIG. 17A, a configuration in which the first infrared absorption layer 61C is formed on the side of the temperature detection element 15, where an infrared ray enters, the infrared reflective layer 62 is formed in the region of the covering layer 43, the region being located at a bottom portion of the void 50, and the second infrared absorption layer 61D is formed on the side of the temperature detection element 15, the side facing the void 50 can be adopted. In the illustrated example, the first infrared absorption layer 61C is formed on the insulating film 26 formed on the temperature detection element 15, and the second infrared absorption layer 61D is formed on the surface of the temperature detection element 15, the surface facing the void 50 (more specifically, on the surface of the diaphragm portion 25A, the surface facing the void 50). Since not only does the infrared absorption layer 61C or 61D absorb the infrared ray but also transmits part of the infrared ray and reflects part of the infrared ray, the sensitivity can be further improved by adopting a structure in which transmission and reflection are reduced. That is, with such a configuration, part of the infrared ray transmitted through the first infrared absorption layer 61C is further absorbed by the second infrared absorption layer 61D. Therefore, the transmission can be reduced. Furthermore, the infrared ray reflected by the first infrared absorption layer 61C and the infrared ray reflected by the second infrared absorption layer 61D are canceled with opposite phases, and can reduce the reflection. Furthermore, the infrared ray reflected by the second infrared absorption layer 61D and the infrared ray reflected by the infrared reflective layer 62 are canceled with opposite phases and can reduce the reflection. Note that $$0.75 \times \lambda_{IR}/4 \le L_1 \le 1.25 \times \lambda_{IR}/4, \text{ and}$$

$$0.75 \times \lambda_{IR}/4 \le L_2 \le 1.25 \times \lambda_{IR}/4$$

are favorably satisfied where the wavelength of the infrared ray to be absorbed by the first infrared absorption layer 61C and the second infrared absorption layer 61D is $\lambda_{IR}$, the optical distance between the first infrared absorption layer 61C and the second infrared absorption layer 61D is $L_1$, and the optical distance between the second infrared absorption layer 61D and the infrared reflective layer 62 is $L_2$. It goes without saying that the configuration including the first infrared absorption layer 61C and the second infrared absorption layer 61D can be appropriately applied to the imaging device of Example 1 and the imaging devices of the other examples.

Figure 41B:
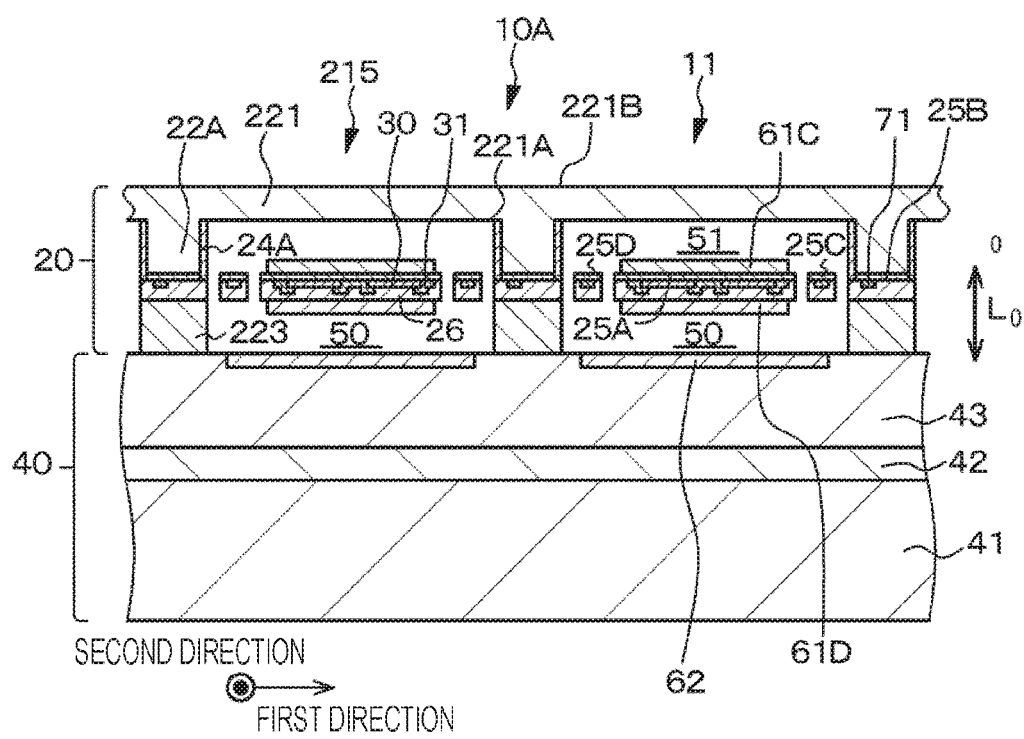

Alternatively, as FIG. 41B illustrates a schematic partial end view of the imaging device of the modification of Example 6 illustrated in FIG. 19B, a configuration in which the first infrared absorption layer 61C is formed on the side of the temperature detection element 215, where an infrared ray enters; the infrared reflective layer 62 is formed in the region of the covering layer 43, the region being located at a bottom portion of the void 50; and the second infrared absorption layer 61D is formed on the side of the temperature detection element 215, the side facing the void 50, can be adopted. The infrared reflective layer 62 is formed on the part of the portion of the covering layer 43, the portion being located at the bottom portion of the void 50. The first infrared absorption layer 61C is provided on the first surface side of the first substrate 221. Specifically, the first infrared absorption layer 61 is provided on the infrared ray incident side of the diaphragm portion 25A. The second infrared absorption layer 61D is formed on the insulating film 26 formed on the temperature detection element 215 to face the void 50. Since not only does the infrared absorption layer 61C or 61D absorb the infrared ray but also transmits part of the infrared ray and reflects part of the infrared ray, the sensitivity can be further improved by adopting a structure in which transmission and reflection are reduced. That is, with such a configuration, part of the infrared ray transmitted through the first infrared absorption layer 61C is further absorbed by the second infrared absorption layer 61D. Therefore, the transmission can be reduced. Furthermore, the infrared ray reflected by the first infrared absorption layer 61C and the infrared ray reflected by the second infrared absorption layer 61D are canceled with opposite phases, and can reduce the reflection. Furthermore, the infrared ray reflected by the second infrared absorption layer 61D and the infrared ray reflected by the infrared reflective layer 62 are canceled with opposite phases and can reduce the reflection. Moreover, in these cases, $$0.75 \times \lambda_{IR}/4 \le L_1 \le 1.25 \times \lambda_{IR}/4, \text{ and}$$

$$0.75 \times \lambda_{IR}/4 \le L_2 \le 1.25 \times \lambda_{IR}/4$$

are favorably satisfied where the wavelength of the infrared ray to be absorbed by the first infrared absorption layer 61C and the second infrared absorption layer 61D is $\lambda_{IR}$, the optical distance between the first infrared absorption layer 61C and the second infrared absorption layer 61D is $L_1$, and the optical distance between the second infrared absorption layer 61D and the infrared reflective layer 62 is $L_2$. It goes without saying that the configuration including the first infrared absorption layer 61C and the second infrared absorption layer 61D can be appropriately applied to the imaging device of Example 6 and the imaging devices of the other examples.

The signal processing circuit can include fixed pattern noise correction processing by measuring noise in advance, noise reduction processing based on a noise model, and resolution correction processing based on a lens imaging model. Furthermore, it is also possible to synthesize an image obtained from an infrared camera and an image captured on the basis of normal visible light. Hereinafter an outline of various types of signal processing will be described but the signal processing is not limited to the processing.

An example of the fixed pattern noise correction processing includes, for example, processing of generating difference data according to a difference between fixed pattern noise data obtained in a previous imaging frame and fixed pattern noise data obtained in an imaging frame of this time, and adding the difference data and the fixed pattern noise data obtained in the previous imaging frame to obtain a new fixed pattern noise data.

Furthermore, an example of the noise reduction processing using an infinite impulse response (IIR) filter includes noise reduction processing including
    first process of calculating an average value of signal values of reference pixels in the vicinity of a correction target pixel by IIR filter processing,
    second process of calculating a variance value of the signal values of reference pixels in the vicinity of a correction target pixel by IIR filter processing,
    third process of inputting the average value and the variance value of the reference pixels, and executing edge preserving smoothing processing applying the average value and the variance value, and
    fourth process of updating an IIR filter coefficients to be applied in the first and second processes according to a signal value of the pixels constituting an image.

Furthermore, an example of the resolution correction processing includes a method of acquiring a filter for blur correction set to each of a plurality of image heights, and correcting a pixel value of a pixel in an image height to be corrected using the acquired filter. Here, the correction can be processing of applying a filter set to an image height adjacent to the image height to be corrected to the pixel value of the pixel to be corrected, calculating a coefficient from a positional relationship between the image height to the corrected and the adjacent image height, and calculating a pixel value after correction using the pixel value after filter application and the coefficient. Alternatively, the correction can be processing of calculating the coefficient from the positional relationship between the image height to be corrected and the adjacent image height, generating a filter to be applied to the pixel value of the pixel to be corrected using the filter set to the image height adjacent to the image height to be corrected and the coefficient, and calculating the pixel value after correction using the generated filter and the pixel value of the pixel to be corrected. Moreover, the coefficient of the filter can be a coefficient obtained by calculating point spread function (PSF) data from a plurality of image points on a first image height, averaging the PSF data, approximating the averaged PSF data by a predetermined function, and calculating from the approximated PSF data. For the calculation of the coefficient of the filter, the Wiener filter can be used.

A semiconductor temperature sensor element using temperature characteristics of a transistor may be formed (may be incorporated) in the first substrate or the second substrate. Note that the semiconductor temperature sensor element is favorably formed in a region of the second substrate, the region being located below the temperature detection element, and is favorably formed in a region of the first substrate, the region being adjacent to the temperature detection element. Alternatively, a temperature detection element having the same configuration and structure as the temperature detection element that detects a temperature on the basis of an infrared ray (note that the temperature detection element does not include an infrared absorption layer or does not include an infrared absorption layer and an infrared reflective layer, or includes an infrared absorption layer having a smaller area than the infrared absorption layer included in the temperature detection element) may be disposed as a temperature reference temperature detection element, adjacent to the temperature detection element that detects a temperature on the basis of an infrared ray. By obtaining a difference between the temperature measured by the temperature detection element adjacent to the temperature reference temperature detection element and the temperature measured by the temperature reference temperature detection element, a true temperature measured by the temperature detection element adjacent to the temperature reference temperature detection element can be obtained. Furthermore, the temperature detection element can include a temperature detection element unit provided with a plurality of temperature detection elements provided with infrared absorption layers having different areas. With the configuration, the temperature detection range and the sensitivity can be changed, the temperature detection range can be expanded, and the infrared ray absorption wavelength can be changed.

Note that the present disclosure can have the following configurations.

[A01] <<Imaging Device>>

An imaging device including:
a first structure and a second structure, in which
the first structure includes
a first substrate,
a temperature detection element provided on the first substrate and configured to detect a temperature on the basis of an infrared ray, and
a signal line and a drive line connected to the temperature detection element,
the second structure includes
a second substrate, and
a drive circuit provided on the second substrate and covered with a covering layer,
the first substrate and the second substrate are stacked,
the signal line is electrically connected with the drive circuit via a signal line connection portion,
the drive line is electrically connected with the drive circuit via a drive line connection portion,
the signal line connection portion includes a first signal line connection portion formed in the first structure and a second signal line connection portion formed in the second structure, and
the drive line connection portion includes a first drive line connection portion formed in the first structure and a second drive line connection portion formed in the second structure.

[A02] <<Imaging Device: First Mode>>

The imaging device according to [A01], in which
the first signal line connection portion includes a first A connection hole formed in the first structure,
the second signal line connection portion includes a first B connection hole formed in the second structure,
the first drive line connection portion includes a second A connection hole formed in the first structure,
the second drive line connection portion includes a second B connection hole formed in the second structure,
the first A connection hole and the first B connection hole are integrally connected to configure a first connection hole, and
the second A connection hole and the second B connection hole are integrally connected to configure a second connection hole.

[A03] <<Imaging Device: Second Mode>>

The imaging device according to [A01], in which
the first signal line connection portion includes a first A connection hole formed in the first structure, and a first A connection end portion provided on a surface of the first structure, the surface facing the second structure, and connected to the first A connection hole,
the second signal line connection portion includes a first B connection hole formed in the second structure, and a first B connection end portion provided on a surface of the second structure, the surface facing the first structure, and connected to the first B connection hole,
the first drive line connection portion includes a second A connection hole formed in the first structure, and a second A connection end portion provided on the surface of the first structure, the surface facing the second structure, and connected to the second A connection hole,
the second drive line connection portion includes a second B connection hole formed in the second structure, and a second B connection end portion provided on the surface of the second structure, the surface facing the first structure, and connected to the second B connection hole,
the first A connection end portion and the first B connection end portion are connected,
the second A connection end portion and the second B connection end portion are connected,
the first A connection hole and the first B connection hole configure a first connection hole, and
the second A connection hole and the second B connection hole configure a second connection hole.

[A04] <<Imaging Device: Second A Mode>>

The imaging device according to [A03], in which
the first A connection end portion, the first B connection end portion, the second A connection end portion, and the second B connection end portion include a metal layer or an alloy layer,
the first A connection end portion and the first B connection end portion are bonded, and the second A connection end portion and the second B connection end portion are bonded.

[A05] <<Imaging Device: Second B Mode>>

The imaging device according to [A03], in which the first A connection end portion and the first B connection end portion are connected via a first bonding material layer, and the second A connection end portion and the second B connection end portion are connected via a second bonding material layer.

[A06] The imaging device according to any one of [A02] to [A05], in which the first A connection hole includes a first A connection hole first segment connected to the signal line and extending in a direction away from the second structure, a first A connection hole second segment extending in a direction approaching the first B connection hole, and a first A connection hole third segment connecting the first A connection hole first segment and the first A connection hole second segment, and the second A connection hole includes a second A connection hole first segment connected to the drive line and extending in a direction away from the second structure, a second A connection hole second segment extending in a direction approaching the second B connection hole, and a second A connection hole third segment connecting the second A connection hole first segment and the second A connection hole second segment.

[A07] The imaging device according to any one of [A02] to [A06], in which a capacitance of the first connection hole is larger than a capacitance of the second connection hole.

[A08] The imaging device according to any one of [A02] to [A07], in which an average cross-sectional area of the first connection hole is larger than an average cross-sectional area of the second connection hole.

[A09] The imaging device according to any one of [A02] to [A07], in which a number of the first connection holes is larger than a number of the second connection holes.

[A10] The imaging device according to any one of [A02] to [A07], in which a length of the first connection hole is longer than a length of the second connection hole.

[A11] The imaging device according to any one of [A02] to [A07], in which the first connection hole includes a first core portion and a first outer peripheral portion (first outer peripheral layer) disposed between a sidewall of the first connection hole and the first core portion, the second connection hole includes a second core portion including a same material as a material that configures the first core portion, and a second outer peripheral portion (second outer peripheral layer) disposed between a sidewall of the second connection hole and the second core portion, and including a same material as a material that configures the first outer peripheral portion, and the first outer peripheral portion is thinner than the second outer peripheral portion.

[A12] The imaging device according to any one of [A02] to [A07], in which the first connection hole includes a first core portion and a first outer peripheral portion (first outer peripheral layer) disposed between a sidewall of the first connection hole and the first core portion, the second connection hole includes a second core portion, and a second outer peripheral portion (second outer peripheral layer) disposed between a sidewall of the second connection hole and the second core portion, and a value of a relative dielectric constant of a material that configures the first outer peripheral portion is larger than a value of a relative dielectric constant of a material that configures the second outer peripheral portion.

[A13] The imaging device according to any one of [A01] to [A12], further including:

a plurality of temperature detection elements arrayed in a first direction and a second direction different from the first direction; and a plurality of drive lines disposed along the first direction and connected with the respective plurality of the temperature detection elements and a plurality of signal lines disposed along the second direction and connected with the respective plurality of the temperature detection elements, in which the first structure includes a temperature detection element array region provided with the temperature detection elements and a peripheral region surrounding the temperature detection element array region, the signal lines are electrically connected with the drive circuit via the signal line connection portion in the peripheral region, and the drive lines are electrically connected with the drive circuit via the drive line connection portion in the peripheral region.

[A14] The imaging device according to any one of [A01] to [A12], further including:

J (note that J≥1) temperature detection elements arrayed in a first direction; and J drive lines and J signal lines disposed along the first direction and connected with the respective temperature detection elements, in which the first structure includes a temperature detection element array region provided with the temperature detection elements and a peripheral region surrounding the temperature detection element array region, the signal lines are electrically connected with the drive circuit via the signal line connection portion in the peripheral region, and the drive lines are electrically connected with the drive circuit via the drive line connection portion in the peripheral region.

[A15] The imaging device according to any one of [A01] to [A14], in which a void is provided between the temperature detection element and the covering layer.

[A16] The imaging device according to [A15], in which an infrared absorption layer is formed on a side where the infrared ray enters, and an infrared reflective layer is formed in a region of the covering layer, the region being located at a bottom portion of the void.

[A17] The imaging device according to any one of [A01] to [A16], in which the temperature detection element includes a pn junction diode, a bolometer element, a thermopile element, a metal film resistance element, a metal oxide resistance element, a ceramic resistance element, or a thermistor element.

[A18] The imaging device according to any one of [A01] to [A17], in which
the drive circuit includes at least an analog front end, an analog-digital conversion circuit, a horizontal scanning circuit, and a vertical scanning circuit,
each signal line is connected to the horizontal scanning circuit via the analog front end and the analog-digital conversion circuit, and
each drive line is connected to the vertical scanning circuit.

[B01] An imaging device including a first structure and a second structure, in which
the first structure includes
a first substrate,
a temperature detection element provided on the first substrate, and which detects a temperature on the basis of an infrared ray, and
a drive line and a signal line connected to the temperature detection element,
the second structure includes
a second substrate, and
a drive circuit provided on the second substrate and covered with a covering layer,
the first substrate is bonded with the covering layer,
a void is provided between the temperature detection element and the covering layer, and
the drive line and the signal line are electrically connected with the drive circuit.

[B02] <<Imaging Device Having First Configuration>>
The imaging device according to any one of [A01] to [A18], in which a void is provided between the temperature detection element and the covering layer.

[B03] The imaging device according to any one of [A01] to [B02], in which
a partition wall is formed in a portion of the first substrate, the portion being located between the temperature detection element and the temperature detection element, and
a bottom portion of the partition wall is bonded with the covering layer.

[B04] The imaging device according to [B03], in which
an exposed surface of the covering layer, the exposed surface being exposed to the void, includes at least one type of material layer selected from a group including an insulating material layer, a metal material layer, an alloy material layer, and a carbon material layer, and
a sidewall of the partition wall includes at least one type of material layer selected from a group including an insulating material layer, a metal material layer, an alloy material layer, and a carbon material layer.

[B05] The imaging device according to [B03], in which an exposed surface of the covering layer, the exposed surface being exposed to the void, includes at least one type of material layer selected from a group including an insulating material layer, a metal material layer, an alloy material layer, and a carbon material layer.

[B06] The imaging device according to [B03] or [B05], in which a sidewall of the partition wall includes at least one type of material layer selected from a group including an insulating material layer, a metal material layer, an alloy material layer, and a carbon material layer.

[B07] The imaging device according to any one of [B03] to [B06], in which
an infrared absorption layer is formed on a side of the temperature detection element, where an infrared ray enters, and
an infrared reflective layer is formed in a region of the covering layer, the region being located at a bottom portion of the void.

[B08] The imaging device according to [B07], in which the infrared absorption layer is formed above the temperature detection element.

[B09] The imaging device according to [B07] or [B08], in which
the infrared reflective layer is formed on a top face of the covering layer or inside the covering layer.

[B10] The imaging device according to any one of [B07] to [B09], in which
an optical distance $L_0$ between the infrared absorption layer and the infrared reflective layer satisfies $$0.75 \times \lambda_{IR}/2 \leq L_0 \leq 1.25 \times \lambda_{IR}/2$$

or $$0.75 \times \lambda_{IR}/4 \leq L_0 \leq 1.25 \times \lambda_{IR}/4$$

where a wavelength of an infrared ray to be absorbed by the infrared absorption layer is $\lambda_{IR}$.

[B11] The imaging device according to any one of [B03] to [B06], in which
a first infrared absorption layer is formed on a side of the temperature detection element, where an infrared ray enters,
an infrared reflective layer is formed in a region of the covering layer, the region being located at a bottom portion of the void, and
a second infrared absorption layer is formed on a side of the temperature detection element, the side facing the void.

[B12] The imaging device according to [B11], in which $$0.75 \times \lambda_{IR}/4 \leq L_1 \leq 1.25 \times \lambda_{IR}/4, \text{ and}$$

$$0.75 \times \lambda_{IR}/4 \leq L_2 \leq 1.25 \times \lambda_{IR}/4$$

are satisfied where a wavelength of an infrared ray to be absorbed by the first infrared absorption layer and the second infrared absorption layer is $\lambda_{IR}$, an optical distance between the first infrared absorption layer and the second infrared absorption layer is $L_1$, and an optical distance between the second infrared absorption layer and the infrared reflective layer is $L_2$.

[B13] The imaging device according to any one of [B01] to [B04], in which
a partition wall is formed between a portion of the first substrate, the portion being located between the temperature detection element and the temperature detection element, and the covering layer, independently of the first substrate, and
a bottom portion of the partition wall is bonded with the covering layer.

[B14] The imaging device according to [B13], in which
an exposed surface of the covering layer, the exposed surface being exposed to the void, includes at least one type of material layer selected from a group including an insulating material layer, a metal material layer, an alloy material layer, and a carbon material layer, and
the partition wall includes at least one type of material layer selected from a group including an insulating material layer, a metal material layer, an alloy material layer, and a carbon material layer.

[B15] The imaging device according to [B13], in which an exposed surface of the covering layer, the exposed surface being exposed to the void, includes at least one type of material layer selected from a group including an insulating material layer, a metal material layer, an alloy material layer, and a carbon material layer.

[B16] The imaging device according to [B13] or [B15], in which
the partition wall includes at least one type of material layer selected from a group including an insulating material layer, a metal material layer, an alloy material layer, and a carbon material layer.

[B17] The imaging device according to any one of [B13] to [B16], in which
an infrared absorption layer is formed on a side of the temperature detection element, where an infrared ray enters, and
an infrared reflective layer is formed in a region of the covering layer, the region being located at a bottom portion of the void.

[B18] The imaging device according to [B17], in which the infrared reflective layer is formed on a top face of the covering layer or inside the covering layer.

[B19] The imaging device according to [B17] or [B18], in which
an optical distance $L_0$ between the infrared absorption layer and the infrared reflective layer satisfies $$0.75 \times \lambda_{IR}/2 \leq L_0 \leq 1.25 \times \lambda_{IR}/2$$

or $$0.75 \times \lambda_{IR}/4 \leq L_0 \leq 1.25 \times \lambda_{IR}/4$$

where a wavelength of an infrared ray to be absorbed by the infrared absorption layer is $\lambda_{IR}$.

[B20] The imaging device according to any one of [B13] to [B16], in which
a first infrared absorption layer is formed on a side of the temperature detection element, where an infrared ray enters,
an infrared reflective layer is formed in a region of the covering layer, the region being located at a bottom portion of the void, and
a second infrared absorption layer is formed on a side of the temperature detection element, the side facing the void.

[B21] The imaging device according to [B20], in which $$0.75 \times \lambda_{IR}/4 \leq L_1 \leq 1.25 \times \lambda_{IR}/4, \text{ and}$$

$$0.75 \times \lambda_{IR}/4 \leq L_2 \leq 1.25 \times \lambda_{IR}/4$$

are satisfied where a wavelength of an infrared ray to be absorbed by the first infrared absorption layer and the second infrared absorption layer is $\lambda_{IR}$, an optical distance between the first infrared absorption layer and the second infrared absorption layer is $L_1$, and an optical distance between the second infrared absorption layer and the infrared reflective layer is $L_2$.

[B22] The imaging device according to any one of [B13] to [B19], in which a protective substrate is disposed on a surface side of the first substrate, where an infrared ray enters.

[B23] The imaging device according to any one of [B01] to [B04], further including:
a temperature detection element unit configured to detect a temperature on the basis of the infrared ray, in which
the temperature detection element unit includes two temperature detection elements disposed up and down along incidence of the infrared ray, and
in the temperature detection element unit, wavelengths of the infrared ray detected by the temperature detection elements are the same or different, or infrared ray absorption amounts of the temperature detection elements are different.

[B24] The imaging device according to any one of [B01] to [B22], in which a heat conductive layer is formed in the covering layer.

[B25] The imaging device according to any one of [B01] to [B24], in which
a temperature control layer is formed in the covering layer, and
the imaging device further includes a temperature detection means.

[B26] The imaging device according to [B25], in which the temperature control layer functions as a heater.

[B27] The imaging device according to [B26], in which the temperature control layer also serves as a wire.

[B28] The imaging device according to any one of [B25] to [B27], in which the drive circuit controls the temperature control layer on the basis of a temperature detection result of the temperature detection means.

[B29] The imaging device according to any one of [B25] to [B28], in which the first structure includes a temperature detection element array region provided with the temperature detection element and a peripheral region surrounding the temperature detection element array region, and
the temperature control layer is formed in the temperature detection element array region.

[B30] The imaging device according to any one of [B25] to [B28], in which the temperature control layer is formed in a region of the covering layer, where an orthogonal projection image of the temperature detection element array region exists.

[B31] The imaging device according to any one of [B01] to [B28], in which
the drive circuit includes an analog-digital conversion circuit, and
the analog-digital conversion circuit is not disposed in a region of the drive circuit, where an orthogonal projection image of the temperature detection element array region exists.

[B32] The imaging device according to any one of [B01] to [B31], in which a plurality of temperature detection elements is provided, and the void is shared by adjacent 2×k temperature detection elements (note that k is an integer of 1 or more).

[B33] <<Imaging Device Having Second Configuration>>
An imaging device including:
a temperature detection element unit configured to detect a temperature on the basis of an infrared ray, in which
the temperature detection element unit includes a plurality of temperature detection elements arranged in parallel, and
wavelengths of the infrared ray detected by the temperature detection elements are different in the temperature detection element unit.

[B34] The imaging device according to [B33], in which
each of the temperature detection elements includes an infrared absorption layer on an infrared ray incident side and an infrared reflective layer on an opposite side of the infrared ray incident side,
optical distances $L_0$ between the infrared absorption layers and the infrared reflective layers in the temperature detection elements are different in the temperature detection element unit, and the optical distances $L_0$ in the temperature detection elements satisfy $$0.75 \times \lambda_{IR}/2 \leq L_0 \leq 1.25 \times \lambda_{IR}/2$$

or $$0.75 \times \lambda_{IR}/4 \leq L_0 \leq 1.25 \times \lambda_{IR}/4$$

where a wavelength of an infrared ray to be absorbed by the infrared absorption layer constituting the temperature detection element is $\lambda_{IR}$.

[B35] The imaging device according to [B33] or [B34], in which
each of the temperature detection elements includes an infrared absorption layer on an infrared ray incident side and an infrared reflective layer on an opposite side of the infrared ray incident side, and
materials constituting the infrared absorption layers, materials, configurations, and structures constituting the infrared reflective layers, or the materials, configurations, and structures constituting the infrared absorption layers and the materials, configurations, and structures constituting the infrared reflective layers, in the temperature detection elements are different in the temperature detection element unit.

[B36] <<Imaging Device Having Third Configuration>>
An imaging device including:
a temperature detection element unit configured to detect a temperature on the basis of an infrared ray, in which
the temperature detection element unit includes a plurality of temperature detection elements arranged in parallel, and
infrared ray absorption amounts of the temperature detection elements are different in the temperature detection element unit.

[B37] The imaging device according to [B36], in which
each of the temperature detection elements includes an infrared absorption layer on an infrared ray incident side and an infrared reflective layer on an opposite side of the infrared ray incident side, and
materials constituting the infrared absorption layers, materials constituting the infrared reflective layers, or the materials constituting the infrared absorption layers and the materials constituting the infrared reflective layers, in the temperature detection elements are different in the temperature detection element unit.

[B38] The imaging device according to [B36] or [B37], in which
each of the temperature detection elements includes an infrared absorption layer on an infrared ray incident side and an infrared reflective layer on an opposite side of the infrared ray incident side, and
the infrared absorption layers, the infrared reflective layers, or areas, thicknesses, or the areas and thicknesses, of the infrared absorption layers and the infrared reflective layers, in the temperature detection elements are different in the temperature detection element unit.

[B39] The imaging device according to any one of [B01] to [B38], in which each signal line is connected to an analog front end and an analog-digital conversion circuit in the drive circuit.

[B40] The imaging device according to [B39], in which
the analog front end includes a differential integration circuit, and
a switch means that controls a conductive state between the differential integration circuit and the signal line is provided between the differential integration circuit and the signal line.

[B41] The imaging device according to [B40], in which, to make the conduction state between the differential integration circuit and the signal line non-conductive, the switch means sets the signal line to a fixed potential.

[B42] <<Imaging Device Having Fourth Configuration>>
An imaging device according including:
a temperature detection element unit configured to detect a temperature on the basis of an infrared ray, in which
the temperature detection element unit includes two temperature detection elements disposed up and down along incidence of the infrared ray, and
in the temperature detection element unit, wavelengths of the infrared ray detected by the temperature detection elements are the same or different, or infrared ray absorption amounts of the temperature detection elements are different.

[B43] <<Imaging Device Having Fifth Configuration>>
An imaging device including:
$M_0 \times N_0$ (note that $M_0 \geq 2$ and $N_0 \geq 2$) temperature detection elements arrayed in a first direction and a second direction different from the first direction, and each configured to detect a temperature on the basis of an infrared ray;
a plurality of drive lines disposed along the first direction;
$N_0 \times P_0$ (note that $P_0 \geq 2$) signal lines disposed along the second direction;
a first drive circuit to which the plurality of drive lines is connected; and
a second drive circuit to which the $N_0 \times P_0$ signal lines are connected, in which
each of the temperature detection elements includes a first terminal portion and a second terminal portion,
the first terminal portion of the each temperature detection element is connected to a drive line, and
an (n, p)th signal line (note that n=1, 2, . . . , or $N_0$, and p=1, 2, . . . , or $P_0$) is connected to the second terminal portion of a $\{(q-1)P_0+p\}$th temperature detection element (note that q=1, 2, 3, . . . ) in a temperature detection element group including nth $N_0$ temperature detection elements disposed along the second direction.

[B44] The imaging device according to [B43], in which
the number of the plurality of drive lines is $M_0/P_0$, and
an mth drive line (note that m=1, 2, . . . , or $M_0/P_0$) is common to a temperature detection element group including $\{(m-1)P_0+p'\}$th $M_0$ temperature detection elements (note that all values of p'=1, 2, . . . , or $P_0$) disposed along the first direction.

[B45] The imaging device according to [B43] or [B44], in which
each signal line is connected to an analog front end and an analog-digital conversion circuit in the second drive circuit, and
the analog front end includes a differential integration circuit.

[B46] The imaging device according to [B43] or [B44], in which each signal line is connected to an analog front end and an analog-digital conversion circuit in the second drive circuit.

[B47] The imaging device according to [B46], in which the analog front end includes a differential integration circuit.

[B48] The imaging device according to any one of [B43] to [B47], in which
the temperature detection element is disposed above a void provided in a temperature detection element substrate,
a first connection portion provided in the temperature detection element substrate and the first terminal portion of the temperature detection element are connected via a first stud portion (support leg or long beam), and a second connection portion provided in the temperature detection element substrate and the second terminal portion of the temperature detection element are connected via a second stud portion (support leg or long beam).

[B49] The imaging device according to [B48], in which $$P_0=2,$$

respective second terminal portions of two temperature detection elements adjacent in the second direction are connected to the second connection portion provided in the temperature detection element substrate via one second stud portion (support leg or long beam), and respective first terminal portions of total of four temperature detection elements, of two temperature detection elements adjacent in the first direction and two temperature detection elements adjacent in the second direction, are connected to the first connection portion provided in the temperature detection element substrate via one first stud portion (support leg or long beam).

[B50] <<Imaging Device Having Sixth Configuration>>
An imaging device including:
$S_0 \times T_0$ (note that $S_0 \geq 2$ and $T_0 \geq 2$) temperature detection elements arrayed in a first direction and a second direction different from the first direction, and each configured to detect a temperature on the basis of an infrared ray;
$S_0 \times U_0$ (note that $U_0 \geq 2$) drive lines disposed along the first direction;
a plurality of signal lines disposed along the second direction;
a first drive circuit to which the $S_0 \times U_0$ drive lines are connected; and
a second drive circuit to which the plurality of signal lines is connected, in which
each of the temperature detection elements includes a first terminal portion and a second terminal portion,
the second terminal portion of the each temperature detection element is connected to a signal line, and
an (s, u)th drive line (note that s=1, 2, ..., or $S_0$ and u=1, 2, ..., or $U_0$) is connected to the first terminal portion of a $\{(t-1)U_0+u\}$th temperature detection element (note that t=1, 2, 3, ...) in a temperature detection element group including sth $S_0$ temperature detection elements disposed along the first direction.

[B51] The imaging device according to [B50], in which each signal line is connected to an analog front end and an analog-digital conversion circuit in the second drive circuit.

[B52] The imaging device according to any one of [B01] to [B51], in which the temperature detection element includes a pn junction diode, a bolometer element, a thermopile element, a metal film resistance element, a metal oxide resistance element, a ceramic resistance element, or a thermistor element.

[B53] The imaging device according to any one of [B01] to [B52], further including a light condensing element.

[B54] The imaging device according to any one of [B01] to [B53], further including a light shielding portion.

[B55] The imaging device according to any one of [B01] to [B54], in which a semiconductor temperature sensor element is formed on the first substrate, the second substrate, or the first substrate and the second substrate.

[B56] The imaging device according to any one of [B01] to [B55], in which a temperature reference temperature detection element is disposed adjacent to the temperature detection element.

[B57] The imaging device according to [B56], in which the temperature reference temperature detection element does not include the infrared absorption layer, or does not include the infrared absorption layer and the infrared reflective layer.

[C01] <<Noise Reduction Method in Imaging Device>>
A noise reduction method in an imaging device, the imaging device including
  a temperature detection element configured to detect a temperature on the basis of an infrared ray,
  a drive line to which the temperature detection element is connected,
  a signal line to which the temperature detection element is connected, and
  a first drive circuit to which the drive line is connected, a second drive circuit to which the signal line is connected, and a storage device, and
  the signal line being connected to a differential integration circuit and an analog-digital conversion circuit in the second drive circuit,
the noise reduction method including the processes of:
setting the temperature detection element to be in a deactivated state and resetting the differential integration circuit;
then setting the temperature detection element to be in a deactivated state, causing a constant current to flow in the signal line only for a time $TM_0$ that is same as a time $TM_0$ in which the temperature detection element is in an activated state, integrating a voltage of the signal line in the differential integration circuit, converting an obtained integration value into a digital value in the analog-digital conversion circuit, and storing the obtained digital value as an offset value in a storage device; and
setting the temperature detection element to be in an operation state only for the time $TM_0$, integrating the voltage of the signal line in the differential integration circuit, converting an obtained integration value into a digital value in the analog-digital conversion circuit to obtain a digital signal value, and then subtracting the offset value from the digital signal value.

REFERENCE SIGNS LIST 10, 10A Imaging device
11 Temperature detection element array region
13 Central region
12, 14 Surrounding region
15, 215, 15A, 15B, 15C, 615A, 615B, 715A, 715B Temperature detection element
20 First structure
21, 221 First substrate (temperature detection element substrate)
221A Second surface of first substrate
222 Protective substrate
21B, 221B Second surface of first substrate
22 Silicon layer
22A Protrusion extending from silicon layer
23, 223 Partition wall
24 Sidewall of partition wall
24A Sidewall of protrusion
25A Diaphragm portion (fictitious portion or fictitious thin layer portion)
25B Insulating material layer 25C First stud portion
25D Second stud portion
26, 27 Insulating film
30 pn junction diode
31 Wire
40 Second structure
41 Second substrate
41' Lower surface of second substrate
42 Layer where drive circuit is formed
42' Various wires or wire layer provided in layer where drive circuit is formed
43 Covering layer (interlayer insulating layer)
50 Void
51 Cavity
61, 61A, 61B, 61C, 61D Infrared absorption layer
62, 62A, 62B Infrared reflective layer
63 Heat conductive layer
64 Temperature control layer (heater)
65, 66, 67 Light condensing element (lens)
68 Light shielding portion
71, 71A, $71_{1,1}$, $71_{2,1}$, $71_{3,1}$, 71B, $71_{1,2}$, $71_{2,2}$, $71_{3,2}$ Signal line
72, 72A, $72_{1,1}$, $72_{2,1}$, $72_{3,1}$, 72B, $72_{1,2}$, $72_{2,2}$, $72_{3,3}$ Drive line
73 Contact hole
81 Vertical scanning circuit
82 Constant current circuit
83, 83a, 83b Analog front end (AFE)
83A Differential integration circuit
83B Wire
83C Constant current circuit
83D Switch means
84 Sample and hold circuit
85, 85a, 85b Analog-digital conversion circuit (ADC)
86 Horizontal scanning circuit
90 SOI substrate
91 First silicon layer
92 $SiO_2$ layer
93 Second silicon layer
94 First sacrificial layer
95 Second sacrificial layer
96 Support substrate
97 Sacrificial layer
100 Signal line connection portion
$100_1$, $110_1$ Core portion
$100_2$, $110_2$ Outer peripheral portion (outer peripheral layer)
$100_3$, $110_3$ Sidewall of connection hole
100' First connection hole
101 First signal line connection portion
102 First A connection hole
103 First A connection hole first segment
104 First A connection hole second segment
105 First A connection hole third segment
106 Second signal line connection portion
107 First B connection hole
110 Drive line connection portion
110' Second connection hole
111 First drive line connection portion
112 Second A connection hole
113 Second A connection hole first segment
114 Second A connection hole second segment
115 Second A connection hole third segment
116 Second drive line connection portion
117 Second B connection hole
121, 122 Connection wire
123 Solder ball
124 Solder resist layer
132 First A connection hole
133 First A connection end portion
135 First B connection hole
136 First B connection end portion
137 First bonding material layer
142 Second A connection hole
143 Second A connection end portion
145 Second B connection hole
146 Second B connection end portion
147 Second bonding material layer
301 Lens
302 Shutter
303 Imaging device
304 Drive circuit
305 Power supply unit
306 Storage medium
307 Video output unit
308 Various interfaces

The invention claimed is:

1. An imaging device comprising:
a first structure; and a second structure, wherein the first structure includes
a first substrate,
a temperature detection element provided on the first substrate and configured to detect a temperature on a basis of an infrared ray, and
a signal line and a drive line connected to the temperature detection element, and
the second structure includes
a second substrate, and
a drive circuit provided on the second substrate and covered with a covering layer, wherein
the first substrate and the second substrate are stacked,
the signal line is electrically connected with the drive circuit via a signal line connection portion,
the drive line is electrically connected with the drive circuit via a drive line connection portion,
the signal line connection portion includes a first signal line connection portion formed in the first structure and a second signal line connection portion formed in the second structure,
the drive line connection portion includes a first drive line connection portion formed in the first structure and a second drive line connection portion formed in the second structure,
the first signal line connection portion includes a first A connection hole formed in the first structure,
the second signal line connection portion includes a first B connection hole formed in the second structure,
the first drive line connection portion includes a second A connection hole formed in the first structure,
the second drive line connection portion includes a second B connection hole formed in the second structure,
the first A connection hole and the first B connection hole are integrally connected to configure a first connection hole,
the second A connection hole and the second B connection hole are integrally connected to configure a second connection hole, wherein
the first connection hole includes a first core portion and a first outer peripheral portion disposed between a sidewall of the first connection hole and the first core portion,
the second connection hole includes a second core portion including a same material as a material that configures the first core portion, and a second outer peripheral portion disposed between a sidewall of the second connection hole and the second core portion, and including a same material as a material that configures the first outer peripheral portion, and the first outer peripheral portion is thinner than the second outer peripheral portion.

2. The imaging device according to claim 1, wherein the first signal line connection portion includes a first A connection end portion provided on a surface of the first structure, the surface of the first structure facing the second structure, and connected to the first A connection hole, the second signal line connection portion includes a first B connection end portion provided on a surface of the second structure, the surface of the second structure facing the first structure, and connected to the first B connection hole, the first drive line connection portion includes a second A connection end portion provided on the surface of the first structure, the surface of the first structure facing the second structure, and connected to the second A connection hole, the second drive line connection portion includes a second B connection end portion provided on the surface of the second structure, the surface of the second structure facing the first structure, and connected to the second B connection hole, the first A connection end portion and the first B connection end portion are connected, and the second A connection end portion and the second B connection end portion are connected.

3. The imaging device according to claim 2, wherein the first A connection end portion, the first B connection end portion, the second A connection end portion, and the second B connection end portion include a metal layer or an alloy layer, the first A connection end portion and the first B connection end portion are bonded, and the second A connection end portion and the second B connection end portion are bonded.

4. The imaging device according to claim 2, wherein the first A connection end portion and the first B connection end portion are connected via a first bonding material layer, and the second A connection end portion and the second B connection end portion are connected via a second bonding material layer.

5. The imaging device according to claim 1, wherein the first A connection hole includes a first A connection hole first segment connected to the signal line and extending in a direction away from the second structure, a first A connection hole second segment extending in a direction approaching the first B connection hole, and a first A connection hole third segment connecting the first A connection hole first segment and the first A connection hole second segment, and the second A connection hole includes a second A connection hole first segment connected to the drive line and extending in the direction away from the second structure, a second A connection hole second segment extending in a direction approaching the second B connection hole, and a second A connection hole third segment connecting the second A connection hole first segment and the second A connection hole second segment.

6. The imaging device according to claim 1, wherein a capacitance of the first connection hole is larger than a capacitance of the second connection hole.

7. The imaging device according to claim 1, wherein an average cross-sectional area of the first connection hole is larger than an average cross-sectional area of the second connection hole.

8. The imaging device according to claim 1, wherein a number of the first connection holes is larger than a number of the second connection holes.

9. The imaging device according to claim 1, wherein a length of the first connection hole is longer than a length of the second connection hole.

10. The imaging device according to claim 1, wherein a value of a relative dielectric constant of a material that configures the first outer peripheral portion is larger than a value of a relative dielectric constant of a material that configures the second outer peripheral portion.

11. The imaging device according to claim 1, further comprising:

a plurality of temperature detection elements arrayed in a first direction and a second direction different from the first direction;

a plurality of drive lines disposed along the first direction and connected with the respective plurality of the temperature detection elements and a plurality of signal lines disposed along the second direction and connected with the respective plurality of the temperature detection elements, wherein the first structure includes a temperature detection element array region provided with the respective plurality of the temperature detection elements and a peripheral region surrounding the temperature detection element array region, the plurality of signal lines are electrically connected with the drive circuit via the signal line connection portion in the peripheral region, and the plurality of drive lines are electrically connected with the drive circuit via the drive line connection portion in the peripheral region, wherein the plurality of temperature detection elements includes the temperature detection element, the plurality of signal lines includes the signal line, and the plurality of drive lines includes the drive line.

12. The imaging device according to claim 1, further comprising:

J (note that J≥1) temperature detection elements arrayed in a first direction; and J drive lines and J signal lines disposed along the first direction and connected with the respective temperature detection elements, wherein the first structure includes a temperature detection element array region provided with the plurality of temperature detection elements and a peripheral region surrounding the temperature detection element array region, the plurality of signal lines are electrically connected with the drive circuit via the signal line connection portion in the peripheral region, and the plurality of drive lines are electrically connected with the drive circuit via the drive line connection portion in the peripheral region.

13. The imaging device according to claim 1, wherein a void is provided between the temperature detection element and the covering layer.

14. The imaging device according to claim 13, wherein
an infrared absorption layer is formed on a side where the infrared ray enters, and
an infrared reflective layer is formed in a region of the covering layer, the region being located at a bottom portion of the void.

15. The imaging device according to claim 1, wherein the temperature detection element includes a pn junction diode, a bolometer element, a thermopile element, a metal film resistance element, a metal oxide resistance element, a ceramic resistance element, or a thermistor element.

16. The imaging device according to claim 1, wherein
the drive circuit includes at least an analog front end, an analog-digital conversion circuit, a horizontal scanning circuit, and a vertical scanning circuit,
the signal line is connected to the horizontal scanning circuit via the analog front end and the analog-digital conversion circuit, and
the drive line is connected to the vertical scanning circuit.

* * * * *